US012195308B2

(12) United States Patent
Kudara et al.

(10) Patent No.: US 12,195,308 B2
(45) Date of Patent: Jan. 14, 2025

(54) LATTICE STRUCTURE AND WORK MACHINE

(71) Applicant: KOBELCO CONSTRUCTION MACHINERY CO., LTD., Hiroshima (JP)

(72) Inventors: Kazufumi Kudara, Hiroshima (JP); Teppei Maedo, Hiroshima (JP); Takunori Yamaguchi, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 502 days.

(21) Appl. No.: 17/620,309

(22) PCT Filed: Jul. 3, 2020

(86) PCT No.: PCT/JP2020/026176
§ 371 (c)(1),
(2) Date: Dec. 17, 2021

(87) PCT Pub. No.: WO2021/002452
PCT Pub. Date: Jan. 7, 2021

(65) Prior Publication Data

US 2022/0259017 A1 Aug. 18, 2022

(30) Foreign Application Priority Data

Jul. 4, 2019 (JP) ................................ 2019-125103

(51) Int. Cl.
*B66C 23/28* (2006.01)
*B66C 23/64* (2006.01)
*E04H 12/10* (2006.01)

(52) U.S. Cl.
CPC ............ *B66C 23/286* (2013.01); *B66C 23/64* (2013.01); *E04H 12/10* (2013.01)

(58) Field of Classification Search
CPC ............... E04C 3/08; E04C 2003/0486; E04B 2001/1975; E04H 12/10; B66C 23/283; B66C 23/286; B66C 23/70
See application file for complete search history.

(56) References Cited

U.S. PATENT DOCUMENTS 3,323,660 A * 6/1967 Allin, Sr. ................ B66C 23/70 212/177
3,511,388 A * 5/1970 Markwardt ............ B66C 23/70 403/186

(Continued)

FOREIGN PATENT DOCUMENTS

CN 105271018 A 1/2016
DE 1261300 B * 2/1968

(Continued)

OTHER PUBLICATIONS

International Search Report mailed on Oct. 6, 2020 in PCT/JP2020/026176 filed on Jul. 3, 2020, (3 pages).

(Continued)

*Primary Examiner* — Christine T Cajilig
(74) *Attorney, Agent, or Firm* — Oblon, McClelland, Maier & Neustadt, L.L.P.

(57) ABSTRACT

In a working machine, a plurality of diagonal members includes a plurality of first diagonal members for connecting a first main member and a second main member with each other, the first diagonal members including a first nearest diagonal member located nearest to a first connector connected to an end of the first main member. A first reinforcement part extends from the first nearest diagonal member to the second main member or a second connector in a first specific direction for connecting the first nearest diagonal member and, the second main member or the second connector connected to an end of the second main member with each other.

15 Claims, 38 Drawing Sheets

(56) References Cited

U.S. PATENT DOCUMENTS

| | | | | |
|---|---|---|---|---|
| 4,489,659 | A * | 12/1984 | Kamohara | F16B 17/004 403/205 |
| 5,199,586 | A | 4/1993 | Pech et al. | |
| 5,406,767 | A * | 4/1995 | Pech | B66C 23/70 52/645 |
| 5,487,479 | A | 1/1996 | Pech et al. | |
| 2001/0004823 | A1* | 6/2001 | Cronin | E04C 3/04 52/651.1 |
| 2013/0168522 | A1 | 7/2013 | Daas et al. | |
| 2014/0339188 | A1* | 11/2014 | Brzoska | B66C 23/708 212/348 |
| 2015/0232305 | A1* | 8/2015 | Li | B66C 23/18 403/119 |
| 2016/0264384 | A1* | 9/2016 | Roodenburg | B66C 23/365 |
| 2017/0268185 | A1* | 9/2017 | Thrall | E01D 6/00 |
| 2017/0275143 | A1 | 9/2017 | Orlean et al. | |
| 2019/0084811 | A1 | 3/2019 | Hamaguchi et al. | |

FOREIGN PATENT DOCUMENTS

| | | | |
|---|---|---|---|
| DE | 1910263 | A1 * | 9/1969 |
| DE | 3027427 | A1 * | 10/1981 |
| JP | 49-138559 | U | 11/1974 |
| JP | 58-65850 | A | 4/1983 |
| JP | 62-20342 | B2 | 5/1987 |
| JP | 5-208795 | A | 8/1993 |
| JP | 6-239590 | A | 8/1994 |
| JP | 6-255987 | A | 9/1994 |
| JP | 11-278792 | A | 10/1999 |
| JP | 2000-169084 | A | 6/2000 |
| JP | 2015-155352 | A | 8/2015 |
| JP | 2019-34826 | A | 3/2019 |

OTHER PUBLICATIONS

Singapore Written Opinion and Search Report issued on Dec. 1, 2022 in the Singapore Patent Application No. 11202112707W, 13 pages.

Australian Examination Report issued on Feb. 9, 2023 in the Australian Patent Application No. 2020300245, 3 pages.

Extended European Search Report issued Jul. 1, 2022 in European Patent Application No. 20835292.2, 7 pages.

* cited by examiner

LATTICE STRUCTURE AND WORK MACHINE

TECHNICAL FIELD

The present invention relates to a lattice structure constituting a portion of a working machine.

BACKGROUND ART

A lattice structure having a light weight and high strength is generally adopted for a working tiltable member to be mounted on a working machine of a large type, such as a large crane. Besides, a long tiltable member is composed of a plurality of lattice structures detachably coupled to each other for transportation thereof.

For instance, Patent Literature 1 discloses sectional boom members which are couplable to each other for use in a crane. Each of the boom members includes a plurality of lattice structures (a “boom butt”, a “boom insertion section”, and a “boom top” in Patent Literature 1) couplable to each other. Each of the lattice structures includes: a plurality of main members (“chords” in Patent Literature 1); a plurality of diagonal members (“lattice elements” in Patent Literature 1) each extending so as to be inclined with respect to a longitudinal direction of the lattice structure for connecting two main members among the plurality of main members with each other; and a plurality of connectors respectively connected to ends of the main members. The lattice structure has a plurality of triangular configurations (lattice configurations) continuously formed by the main members and the diagonal members to achieve a light weight and high strength. As shown in FIG. 2 of Patent Literature 1, the connectors (“female connectors” in Patent Literature 1) of the lattice structure are connected to corresponding connectors (“male connectors” in Patent Literature 1) of another adjacent lattice structure, respectively. Consequently, the two lattice structures are coupled to each other.

Meanwhile, as shown in FIG. 2 of Patent Literature 1, a pair of connectors (the female connector and the male connector) composing a coupling unit for coupling the two lattice structures to each other are aligned in the longitudinal direction of each of the lattice structures. Further, two diagonal members arranged across the coupling unit have their respective ends at a distance therebetween, the distance being larger than at least the length of the pair of connectors. Thus, the distance between the ends of the two diagonal members increases. In this respect, the aforementioned triangular configurations (lattice configurations) discontinue in the coupling unit and therearound. As a result, the strength in the coupling unit and therearound becomes lower than the strength in a portion where the lattice configurations are continuous. Accordingly, buckling deformation is likely to occur in the coupling unit and therearound in a direction perpendicular to the longitudinal direction of each of the lattice structures.

Available countermeasures for suppressing lowering in the buckling strength in the coupling unit and therearound cover a configuration further including, for example as shown in FIG. 2 of Patent Literature 1, a reinforcement pipe extending in a direction perpendicular to an axial direction of each of the main members at a position adjacent to the coupling unit for connecting two main members. A lattice structure disclosed in each of Patent Literatures 2 to 5 also adopts the same configuration.

However, in the configuration shown in FIG. 2 of Patent Literature 1, the reinforcement pipe has an end connected to the main member in a state of being arranged between the connector and the end of the diagonal member. Hence, a distance between the ends of the two diagonal members, i.e., a distance between the end of the diagonal member of the one lattice structure and the end of the diagonal member of the another lattice structure, needs to be longer than a distance between corresponding ends in a configuration including no reinforcement pipe. The configuration disclosed in each of Patent Literatures 2 to 5 faces the same problem.

CITATION LIST

Patent Literature

Patent Literature 1: Japanese Unexamined Patent Publication No HEI 5-208795

Patent Literature 2: Japanese Unexamined Patent Publication No. 2015-155352

Patent Literature 3: Japanese Unexamined Patent Publication No HEI 6-255987

Patent Literature 4: Japanese Unexamined Patent Publication No HEI 6-239590

Patent Literature 5: Japanese Unexamined Patent Publication No. 2019-34826

SUMMARY OF INVENTION

The present invention has an object of providing a lattice structure and a working machine including the lattice structure, the lattice structure including a reinforcement part, such as a reinforcement pipe, for suppressing lowering in buckling strength in a coupling unit for coupling two lattice structures to each other, and being capable of suppressing an increase in a distance between ends of two diagonal members located nearest to the coupling unit, i.e., a distance between an end of a diagonal member of one lattice structure and an end of a diagonal member of another lattice structure.

Provided is a lattice structure constituting a portion of a working machine and detachably couplable to another lattice structure adjacent to the lattice structure. The lattice structure includes: a plurality of main members extending in a longitudinal direction of the lattice structure and arranged at intervals in a direction perpendicular to the longitudinal direction; a plurality of diagonal members each extending so as to be inclined with respect to the longitudinal direction, each of the diagonal members connecting two main members among the plurality of main members with each other; a plurality of connectors respectively connected to ends of the main members in the longitudinal direction thereof; and at least one reinforcement part. The main members include a first main member and a second main member. The connectors include a first connector connected to an end of the first main member and a second connector connected to an end of the second main member. The diagonal members include a plurality of first diagonal members connecting the first main member and the second main member with each other, the first diagonal members including a first nearest diagonal member located nearest to the first connector. The at least one reinforcement part includes a first reinforcement part extending from the first nearest diagonal member to the second main member or the second connector in a first specific direction for connecting the first nearest diagonal member, and the second main member or the second connector with each other.

DESCRIPTION OF EMBODIMENTS

Hereinafter, embodiments of the present invention will be described with reference to the accompanying drawings.

Working Machine

Figure 1:
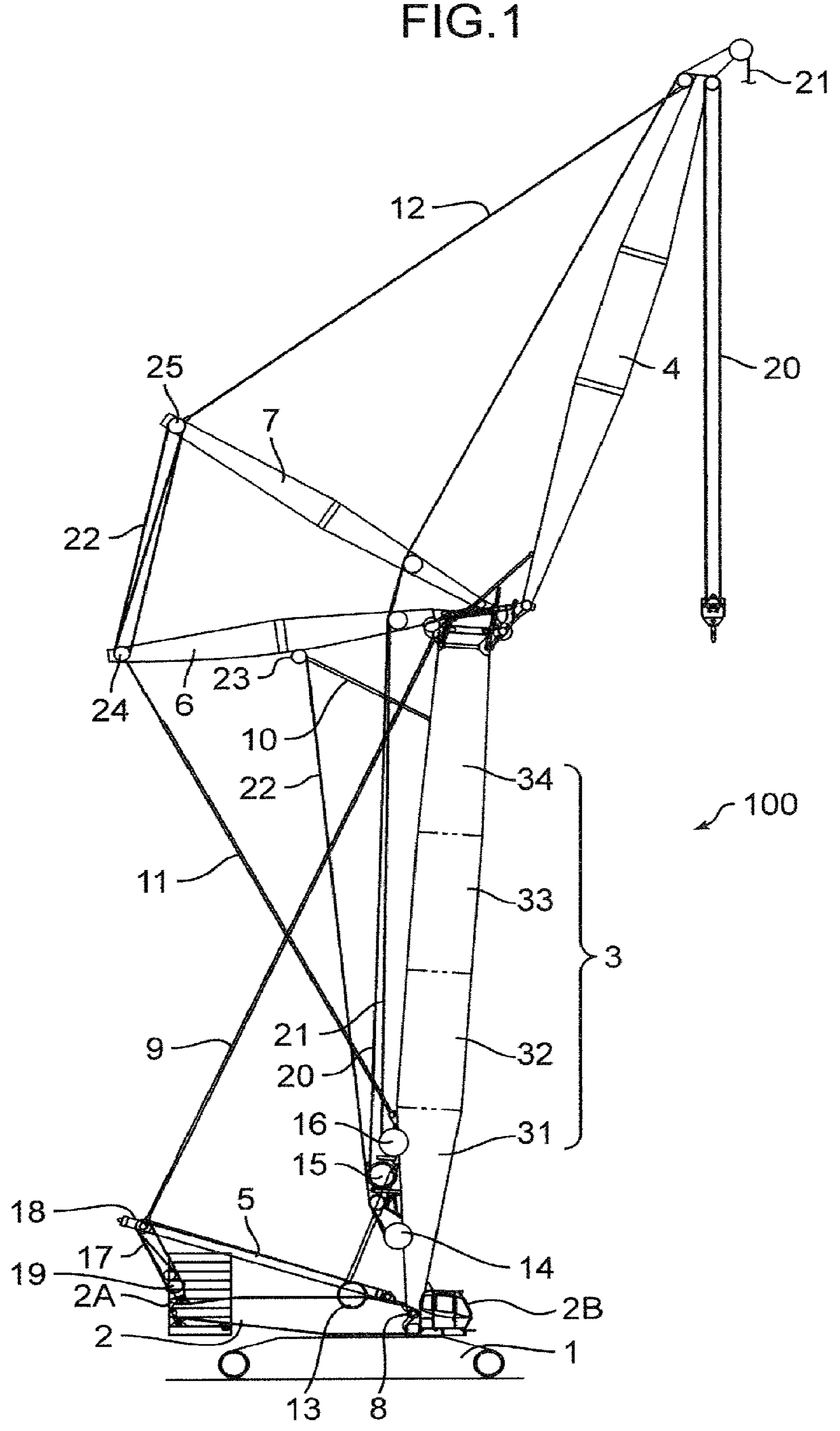
FIG. 1 is a sideview of a working machine according to embodiments of the present invention.

FIG. 1 is a sideview of a crane 100 serving as a working machine according to the embodiments of the present invention. As shown in FIG. 1, the crane 100 includes: a lower traveling body 1 serving as a base body; an upper slewing body 2 slewably supported on the lower traveling body 1; a lattice boom 3; a jib 4; a mast 5; a rear strut 6; and a front strut 7. The upper slewing body 2 has a rear portion on which a counterweight 2A for adjusting the balance of the crane 100 is mounted, and a front end on which a cab 2B serving as an operator seat device is mounted.

The lattice boom 3 has a lower end constituting a boom foot 8, and is supported on a slewing frame of the upper slewing body 2 rotatably about the lower end in a raising and lowering direction. The lattice boom 3 includes a plurality of lattice structures coupled to each other. The lattice structures include a first boom member 31, a second boom member 32, a third boom member 33, and a fourth boom member 34 arranged in this order from a proximal end of the lattice boom.

The first boom member 31 serves as a proximal boom member and has a proximal end including the boom foot 8 and a distal end opposite the proximal end. The boom foot 8 is connected to a front portion of the upper slewing body 2 rotatably in the raising and lowering direction.

The second to fourth boom members 32, 33, 34 are arranged in this order from a position closer to the first boom member 31, and the boom members adjacent to each other in the arrangement direction (i.e., a longitudinal direction of the lattice boom 3) are detachably couplable to each other. Each of the second and third boom members 32, 33 serves as an intermediate boom member, and has a proximal end detachably connectable to the boom member adjacent to the proximal end, and a distal end detachably connectable to the boom member adjacent to the distal end. The fourth boom member 34 serves as a distal boom member, and has a proximal end detachably connectable to the distal end of the third boom member 33, and a distal end also serving as the distal end of the lattice boom 3 opposite the proximal end.

The jib 4 is rotatably connected to the distal end of the lattice boom 3, that is, rotatably connected to the distal end of the fourth boom member 34. The mast 5, the rear strut 6, and the front strut 7 are members for rotating the jib 4.

The mast 5 has a proximal end supported on the upper slewing body 2 rotatably in the same direction as the raising and lowering direction of the boom 3, and a distal end opposite the proximal end. The distal end is connected to the distal end of the boom 3 via a pair of left and right boom guide lines 9.

The rear strut 6 and the front strut 7 are rotatably supported at the distal end of the lattice boom 3. The rear strut 6 is held in a posture extending out from the distal end of the lattice boom 3 toward a boom raising direction (on a left side in FIG. 1) by a pair of left and right backstops 10 and a link 11. The front strut 7 is connected to the jib 4 via a pair of left and right jib guy lines 12 rotatably in cooperation with (integrally with) the jib 4.

A plurality of winches are mounted on the upper slewing body 2. The winches include a boom raising and lowering winch 13, a jib raising and lowering winch 14, a main winch 15, and an auxiliary winch 16.

The boom raising and lowering winch 13 winds up and out a boon raising and lowering rope 17 to rotate the mast 5, thereby raising and lowering the lattice boom 3. The boom raising and lowering rope 17 extends over sheave blocks 18, 19 respectively provided at a rotational end of the mast 5 and a rear end of the upper slewing body 2.

The jib raising and lowering winch 14 winds up and out a jib raising and lowering rope 22 extending between the rear strut 6 and the front strut 7 to rotate the front strut 7, thereby raising and lowering the jib 4. The jib raising and lowering rope 22 is supported on a guide sheave 23 provided at an intermediate portion of the rear strut 6 in a longitudinal direction thereof, and extends over sheave blocks 24, 25 respectively provided at a rotational end of the rear strut 6 and a rotational end of the front strut 7.

The main winch 15 performs hoisting and lowering of a hanged load to be hanged from a distal end of the jib 4 via a main rope 20, and the auxiliary winch 16 performs hoisting and lowering of a hanged load to be hanged from the distal end of the jib 4 via an auxiliary rope 21.

In the crane 100 described heretofore, each of the first to fourth boom members 31 to 34 composing the lattice boom 3 serves as a lattice structure basically having a common configuration. Under the circumstances, a basic configuration of each of the second boom member 32 and the third boom member 33 adjacent thereto representatively among the first to fourth main members 31 to 34, and a configuration for detachably coupling the second boom member 32 and the third boom member 33 to each other will be described with reference to the drawings.

Lattice Structure According to First Embodiment

Figure 2:
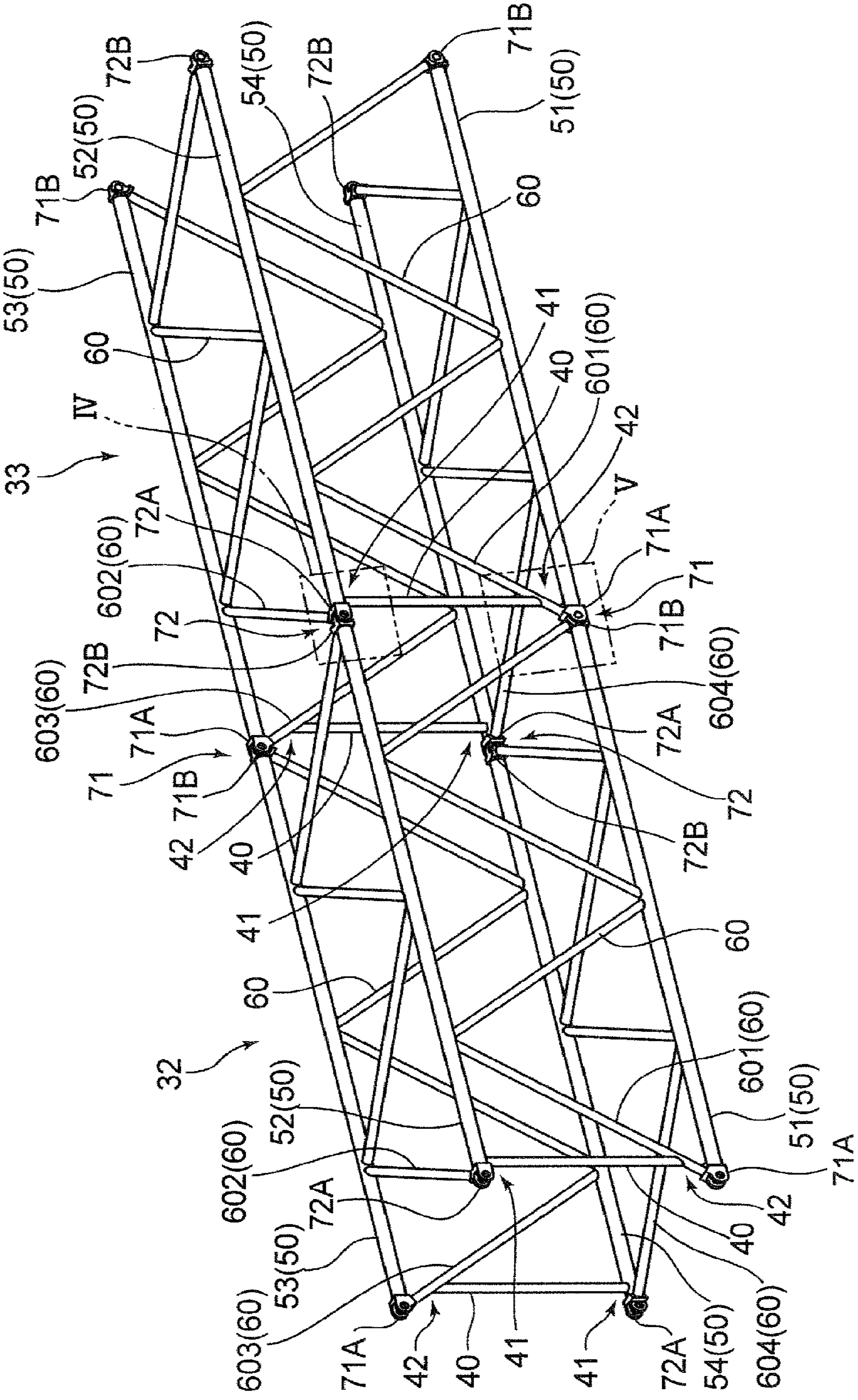
FIG. 2 is a perspective view of a lattice structure according to a first embodiment of the present invention and another lattice structure coupled to the lattice structure.
Figure 3:
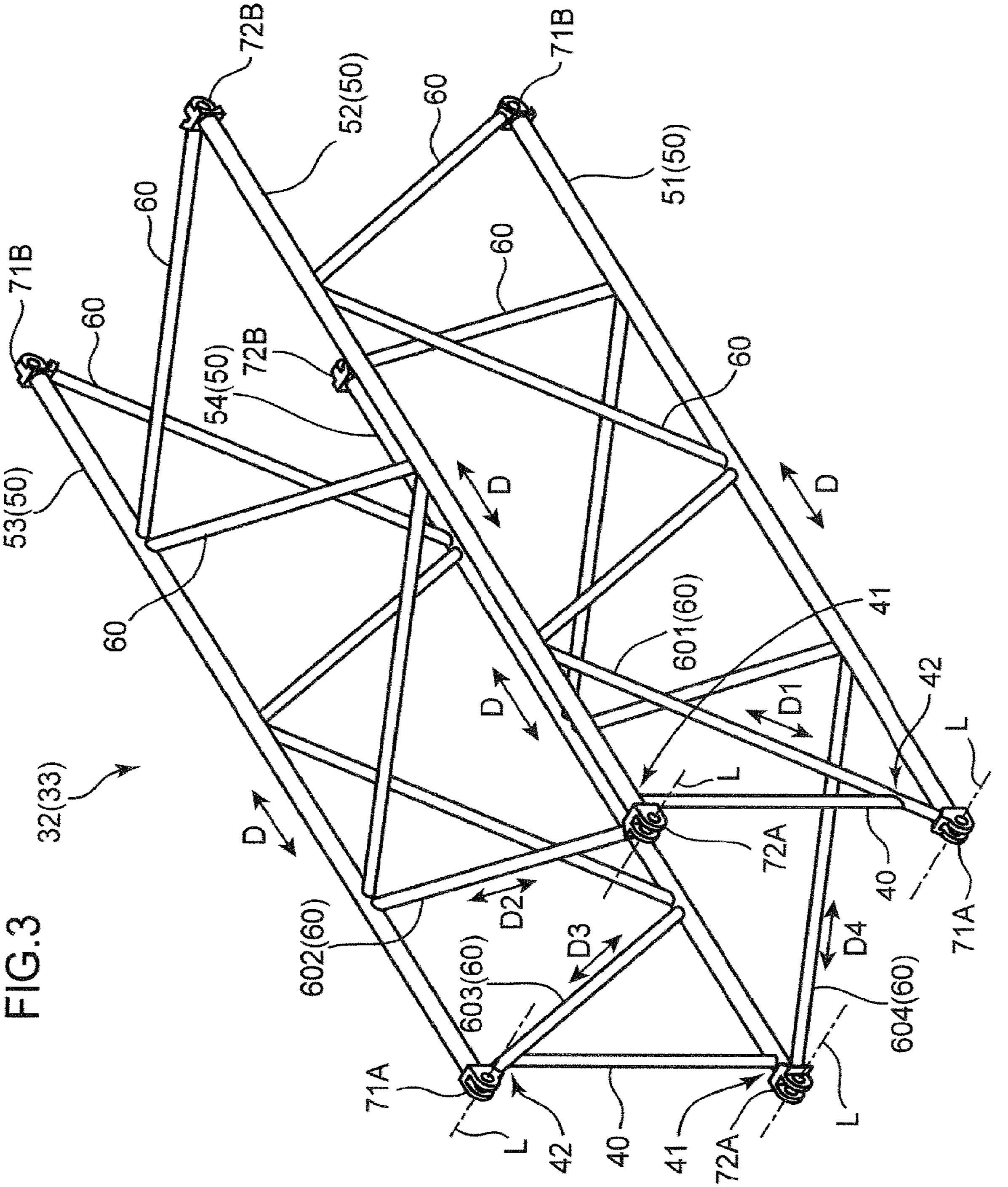
FIG. 3 is a perspective view of the lattice structure in FIG. 2

FIG. 2 is a perspective view of a lattice structure 33 (third boom member 33) according to a first embodiment of the present invention and another lattice structure 32 (second boom member 32) coupled to the lattice structure 33. These lattice structures 32, 33 form a lattice structure coupled body. FIG. 3 is a perspective view of one of the lattice structures 32, 33 in FIG. 2.

As shown in FIGS. 2 and 3, each of the lattice structures 32, 33 includes four main members 50, a plurality of connectors, a plurality of diagonal members 60, and a plurality of reinforcement parts 40. The lattice structure 32 and the lattice structure 33 have the same configuration.

Main Member

Each of the four main members 50 is a linearly extending pipe (main pipe), and has one end in a longitudinal direction D (axial direction D) thereof and another end opposite the one end in the longitudinal direction D. The four main members 50 are arranged at intervals in a direction perpendicular to a longitudinal direction of the lattice structure (a radial direction of the main member 50). Each of the main members 50 is arranged so as to extend along the longitudinal direction of the lattice boom 3, that is, along the longitudinal direction of each of the lattice structures 32, 33. Specifically, each of the main members 50 is arranged in a posture parallel to the longitudinal direction of each of the lattice structures 32, 33.

The four main members 50 include a first main member 51, a second main member 52, a third main member 53, and a fourth main member 54. The first to fourth main members 50 are arranged, in this order, at positions corresponding to four vertices of a rectangular shape (specifically, e.g., square) when the lattice structure is viewed in the longitudinal direction thereof. In each of the lattice structures 32, 33, the four main members 50 are arranged in parallel to one another, but the arrangement thereof is not limited thereto.

Connector

Figure 4:
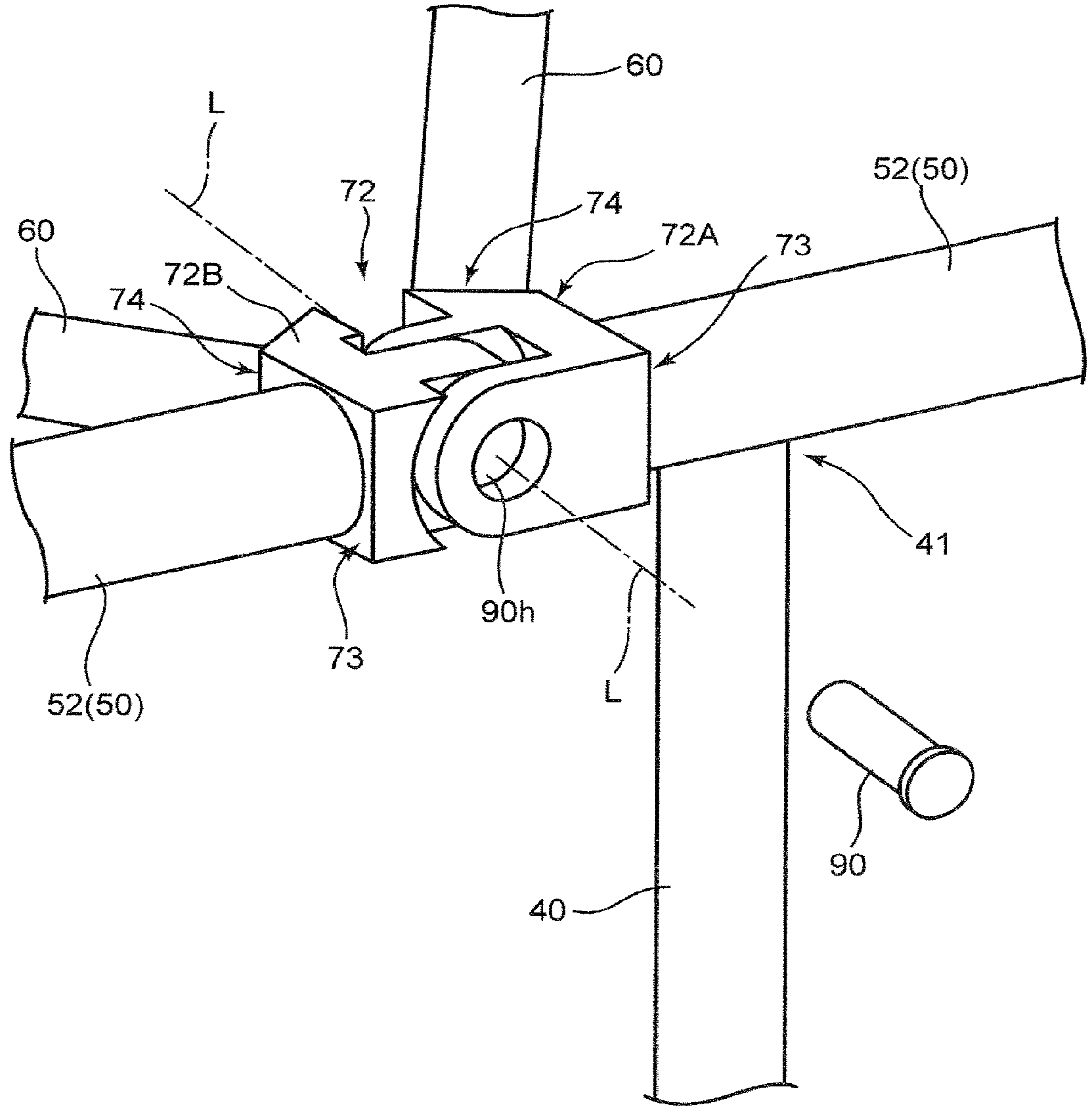
FIG. 4 is an enlarged view of a portion in a framed box IV in FIG. 2.
Figure 5:
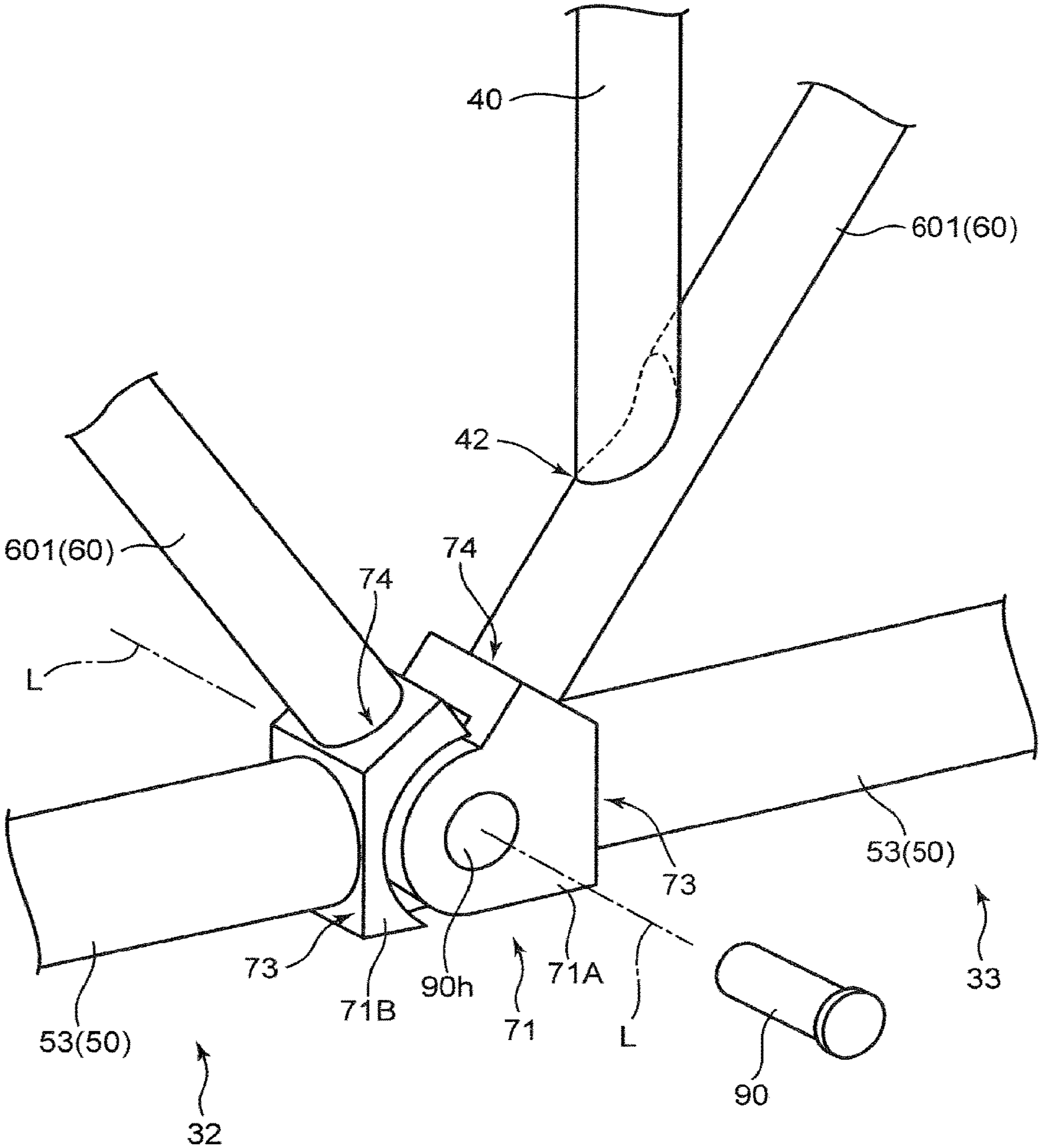
FIG. 5 is an enlarged view of a portion in a framed box V in FIG. 2.

FIG. 4 is an enlarged view of a portion in a framed box IV in FIG. 2. FIG. 5 is an enlarged view of a portion in a framed box V in FIG. 2. As shown in FIG. 2 to FIG. 5, each of the connectors is connected to one of the one end and the another end of each of the four main members 50. Specifically, one of a female connector and a male connector is connected to the one end (left end in FIGS. 2, 3) of each of the four main members 50, and the other of the female connector and the male connector is connected to the another end (right end in FIGS. 2, 3) of each of the four main members 50.

In the specific examples shown in FIG. 4 and FIG. 5, the first main member 51 has one end to which a first female connector 71A is connected, and another end to which a first male connector 71B is connected. The second main member 52 has one end to which a second female connector 72A is connected, and another end to which a second male connector 72B is connected. The third main member 53 has one end to which a third female connecter 71A having the same shape as the first connector 71A is connected, and another end to which a third male connector 71B having the same shape as the first connector 71B is connected. The fourth main member 54 has one end to which a fourth female connecter 72A having the same shape as the second connector 72A is connected, and another end to which a fourth male connector 72B having the same shape as the second connector 72B is connected.

As shown in FIG. 3, central axes L of pin insertion holes (axial directions L of pins) of the first connectors 71A, 71B, those of the second connectors 72A, 72B, those of the third connectors 71A, 71B, and those of the fourth connectors 72A, 72B are parallel to one another.

As shown in FIG. 5, the female connector 71A and the male connector 71B are rotatably connected to each other by a pin 90. These connectors 71A, 71B compose a coupling unit 71 for the adjacent lattice structures 32, 33. Each of the connectors 71A, 71B has an insertion hole 90*h* in which the pin 90 is inserted. The connector 71A has a main member joint 73 for joining the main member 50 thereto and a diagonal member joint 74 for joining the diagonal member 60 thereto. Similarly, the connector 71B has a main member joint 73 for joining the main member 50 thereto and a diagonal member joint 74 for joining the diagonal member 60 thereto.

In the embodiment, as shown in FIG. 5, a plane parallel to the longitudinal direction of the main member 50 connected to the connector 71A and the longitudinal direction of the diagonal member 60 connected to the connector 71A, and a plane parallel to the longitudinal direction of the main member 50 connected to the connector 71B and the longitudinal direction of the diagonal member 60 connected to the connector 71B are parallel to each other and perpendicular to the axial direction L of the pin 90 (central axis L of the insertion hole 90*h*).

As shown in FIG. 4, the female connector 72A and the male connector 72B are rotatably connected to each other by a pin 90. These connectors 72A, 72B compose a coupling unit 72 for the adjacent lattice structures 32, 33. Each of the connectors 72A, 72B has an insertion hole 90*h* in which the pin 90 is inserted. The connector 72A has a main member joint 73 for joining the main member 50 thereto and a diagonal member joint 74 for joining the diagonal member 60 thereto. Similarly, the connector 72B has a main member joint 73 for joining the main member 50 thereto and a diagonal member joint 74 for joining the diagonal member 60 thereto.

In the embodiment, as shown in FIG. 4, a plane parallel to the longitudinal direction of the main member 50 connected to the connector 72A and the longitudinal direction of the diagonal member 60 connected to the connector 72A, and a plane parallel to the longitudinal direction of the main member 50 connected to the connector 72B and the longitudinal direction of the diagonal member 60 connected to the connector 72B are parallel to each other and parallel to the axial direction L of the pin 90 (central axis L of the insertion hole 90*h*).

In the embodiment, each of the connectors has only the single main member joint 73 and the single diagonal member joint 74.

Diagonal Member

Each of the diagonal members 60 is a pipe (diagonal pipe) linearly extending so as to be inclined with respect to the longitudinal direction of the lattice structure, and has one end in a longitudinal direction (axial direction) thereof and another end opposite the one end in the longitudinal direction. Each diagonal member 60 connects two adjacent main members 50 among the four main members 50 with each other.

Specifically, the diagonal members 60 include, for example, a plurality of first diagonal members 60 connecting the first main member 51 and the second main member 52 with each other. The first diagonal members 60 connect the first main member 51 and the second main member 52 with each other in a zigzag manner. The diagonal members 60 further include a plurality of second diagonal members 60 connecting the third main member 53 and the fourth main member 54 with each other. The second diagonal members 60 connect the third main member 53 and the fourth main member 54 with each other in a zigzag manner. Similarly, a part of the diagonal members 60 among the diagonal members 60 connects the second and third main members 52, 53 with each other, and another part of the diagonal members 60 among the diagonal members 60 connects the fourth and first main members 54, 51 with each other.

Nearest Diagonal Member

In the lattice structure according to the embodiment, the diagonal members 60 include four nearest diagonal members 601 to 604 located near the one end (left end in FIG. 3) of the lattice structure in the longitudinal direction thereof.

The nearest diagonal member 601 (serving as an exemplary first nearest diagonal member) is the diagonal member 60 located nearest to the first connector 71A among the first diagonal members 60 connecting the first main member 51 and the second main member 52 with each other. The nearest diagonal member 601 has one end connected to the first connector 71A and another end connected to the second main member 52. In this way, the nearest diagonal member 601 connects the first main member 51 and the second main member 52 with each other. The nearest diagonal member 601 is inclined in a direction D1 at an angle to the longitudinal direction of the lattice structure so that a distance between the one end of the nearest diagonal member 601 and the first connector 71A is shorter than a distance between the another end of the nearest diagonal member 601 and the second connector 72A.

The nearest diagonal member 602 is a diagonal member 60 located nearest to the second connector 72A among the diagonal members 60 connecting the second main member 52 and the third main member 53 with each other. The nearest diagonal member 602 has one end connected to the second connector 72A and another end connected to the third main member 53. In this way, the nearest diagonal member 602 connects the second main member 52 and the third main member 53 with each other. The nearest diagonal member 602 is inclined in a direction D2 at an angle to the longitudinal direction of the lattice structure so that a distance between the one end of the nearest diagonal member 602 and the second connector 72A is shorter than a distance between the another end of the nearest diagonal member 602 and the third connector 71A.

The nearest diagonal member 603 (serving as an exemplary second nearest diagonal member) is a diagonal member 60 located nearest to the third connector 71A among the second diagonal members 60 connecting the third main member 53 and the fourth main member 54 with each other. The nearest diagonal member 603 has one end connected to the third connector 71A and another end connected to the fourth main member 54. In this way, the nearest diagonal member 603 connects the third main member 53 and the fourth main member 54 with each other. The nearest diagonal member 603 is inclined in a direction D3 at an angle to the longitudinal direction of the lattice structure so that a distance between the one end of the nearest diagonal member 603 and the third connector 71A is shorter than a distance between the another end of the nearest diagonal member 603 and the fourth connector 72A.

The nearest diagonal member 604 is a diagonal member 60 located nearest to the fourth connector 72A among the diagonal members 60 connecting the fourth main member 54 and the first main member 51 with each other. The nearest diagonal member 604 has one end connected to the fourth connector 72A and another end connected to the first main member 51. In this way, the nearest diagonal member 604 connects the fourth main member 54 and the first main member 51 with each other. The nearest diagonal member 604 is inclined in a direction D4 at an angle to the longitudinal direction of the lattice structure so that a distance between the one end of the nearest diagonal member 604 and the fourth connector 72A is shorter than a distance between the another end of the nearest diagonal member 604 and the first connector 71A.

Similarly, four nearest diagonal members, like the four nearest diagonal members 601 to 604, are arranged near another end of the lattice structure in the longitudinal direction thereof as well.

Reinforcement Part

In the embodiment, each of the reinforcement parts 40 is a linearly extending pipe (reinforcement pipe). The reinforcement parts 40 include two reinforcement parts 40, i.e., a first reinforcement part 40 and a second reinforcement part 40.

The first reinforcement part 40 has one end 42 and another end 41 in a longitudinal direction (axial direction) thereof. The one end 42 of the first reinforcement part 40 is connected to the nearest diagonal member 601 and the another end 41 of the first reinforcement part 40 is connected to the second main member 52. The first reinforcement part 40 extends from the nearest diagonal member 601 to the second main member 52 in the longitudinal direction thereof for connecting the nearest diagonal member 601 and the second main member 52 with each other. Specifically, the longitudinal direction of the first reinforcement part 40 indicates a direction (exemplary first specific direction) perpendicular to the longitudinal direction of the lattice structure. The first reinforcement part 40 is arranged in a posture extending in a direction perpendicular to the central axis L of the pin insertion hole (axial direction L of the pin) of the second connector 72A and intersecting the longitudinal direction of the second main member 52. More specifically, the first reinforcement part 40 is arranged in a posture extending in a direction perpendicular to the central axis L of the pin insertion hole (axial direction L of the pin) of the second connector 72A and perpendicular to the longitudinal direction of the second main member 52. The another end 41 of the first reinforcement part 40 is connected to the second main member 52 at a position in a portion of the second main member 52 that is adjacent to the second connector 72A.

The second reinforcement part 40 has one end 42 and another end 41 in a longitudinal direction (axial direction) thereof. The one end 42 of the second reinforcement part 40 is connected to the nearest diagonal member 603 and the another end 41 of the second reinforcement part 40 is connected to the fourth main member 54. The second reinforcement part 40 extends from the nearest diagonal member 603 to the fourth main member 54 in the longitudinal direction thereof for connecting the nearest diagonal member 603 and the fourth main member 54 with each other. Specifically, the longitudinal direction of the second reinforcement part 40 indicates a direction (exemplary second specific direction) perpendicular to the longitudinal direction of the lattice structure. The second reinforcement part 40 is arranged in a posture extending in a direction perpendicular to the central axis L of the pin insertion hole (axial direction L of the pin) of the fourth connector 72A and intersecting the longitudinal direction of the fourth main member 54. More specifically, the second reinforcement part 40 is arranged in a posture extending in a direction perpendicular to the central axis L of the pin insertion hole (axial direction L of the pin) of the fourth connector 72A and perpendicular to the longitudinal direction of the fourth main member 54. The another end 41 of the second reinforcement part 40 is connected to the fourth main member 54 at a position in a portion of the fourth main member 54 that is adjacent to the fourth connector 72A.

The lattice structure according to the embodiment where the one end 42 of the first reinforcement part 40 is connected to the nearest diagonal member 601 as described above eliminates the need to arrange the end of the first reinforcement part 40 between the end of the nearest diagonal member 601 and the first connector 71A. Accordingly, the end of the nearest diagonal member 601 can be nearer to the first connector 71A. This configuration, even including the first reinforcement part 40, can suppress an increase in the distance between the ends of the two diagonal members 60, i.e., the distance between the end of the nearest diagonal member 601 of the lattice structure 32 and the end of the nearest diagonal member 601 of the lattice structure 33, as shown in FIG. 5.

In the embodiment, the one end of the nearest diagonal member 601 is connected to the first connector 71A and the another end of the nearest diagonal member 601 is connected to the second main member 52 so that the nearest diagonal member 601 connects the first main member 51 and the second main member 52 with each other. Moreover, the one end of the nearest diagonal member 603 is connected to the third connector 71A and the another end of the nearest diagonal member 603 is connected to the fourth main member 54 so that the nearest diagonal member 603 connects the third main member 53 and the fourth main member 54 with each other.

In this aspect, an ideal lattice configuration is attainable in the coupling unit 71 of the lattice structure. This configuration can consequently suppress lowering in the stiffness of the lattice structure in the coupling unit 71 and therearound.

In the embodiment, the longitudinal direction of the first reinforcement part 40 is perpendicular to the longitudinal direction of the lattice structure, and the longitudinal direction of the second reinforcement part 40 is perpendicular to the longitudinal direction of the lattice structure.

In this aspect, each of the longitudinal direction of the first reinforcement part 40 and the longitudinal direction of the second reinforcement part 40 is perpendicular to the longitudinal direction of the lattice structure, and approximates to a direction in which the buckling deformation of the lattice structure may occur. Accordingly, the buckling strength is further effectively improved.

In the embodiment, the first and second main members 51, 52 respectively disposed, among the four vertices of the quadrangular shape, at positions corresponding to two adjacent vertices are supported by the nearest diagonal member 601 and the first reinforcement part 40, and the third and fourth main members 53, 54 respectively disposed at positions corresponding to remaining two vertices among the four vertices are supported by the nearest diagonal member 603 and the second reinforcement part 40. Accordingly, the portions of the lattice structure corresponding to the respective opposite sides of the quadrangular shape thereof are reinforced in a good balance.

Furthermore, in the embodiment, the longitudinal direction of the reinforcement part 40 is perpendicular to the axial direction L of the pin 90 (central axis L of the pin insertion hole of the connector). Thus, the reinforcement part 40 can effectively improve the buckling strength. Specifically, when the boom 3 receives a compressive load in a longitudinal direction thereof, the main member 50 of the lattice structure rotates about the pin 90 relative to the main member 50 of the another lattice structure in the coupling unit for coupling the lattice structure and the another lattice structure to each other. Hence, the buckling deformation is likely to occur in the coupling unit 71 and therearound. In the embodiment, the reinforcement part 40 connects the nearest diagonal member 601 (603) and the main member 52 (54) with each other so that the longitudinal direction of the reinforcement part is perpendicular to the axial direction of the pin 90. The reinforcement part 40 arranged in the aforementioned manner can effectively suppress such deformation of the main member 50 of the lattice structure as to rotate about the pin 90 relative to the main member 50 of the another lattice structure when the boom 3 receives the compressive load. Consequently, the buckling deformation is effectively suppressed.

Lattice Structure According to Second Embodiment

Figure 6:
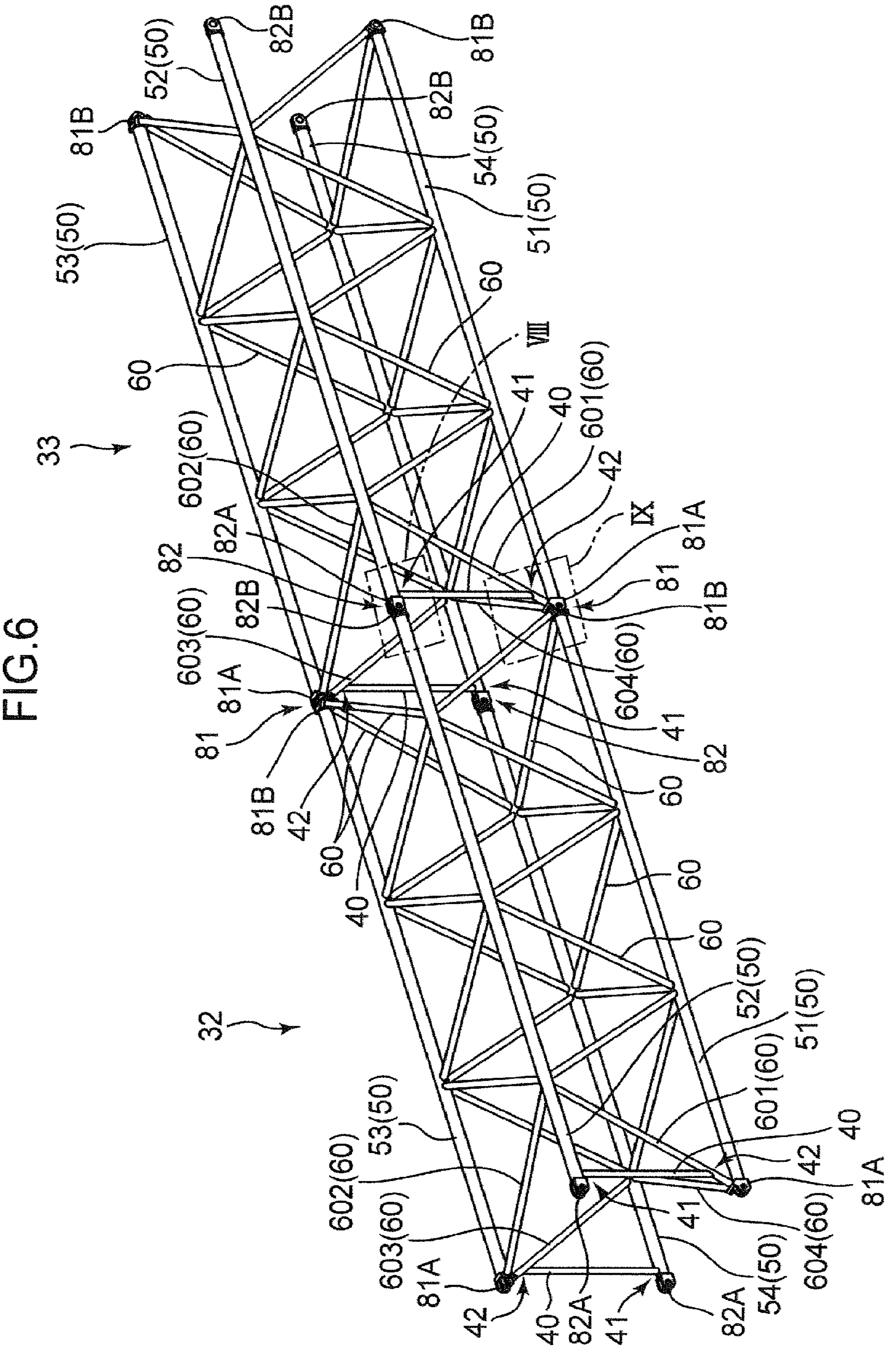
FIG. 6 is a perspective view of a lattice structure according to a second embodiment of the present invention and another lattice structure coupled to the lattice structure.
Figure 7:
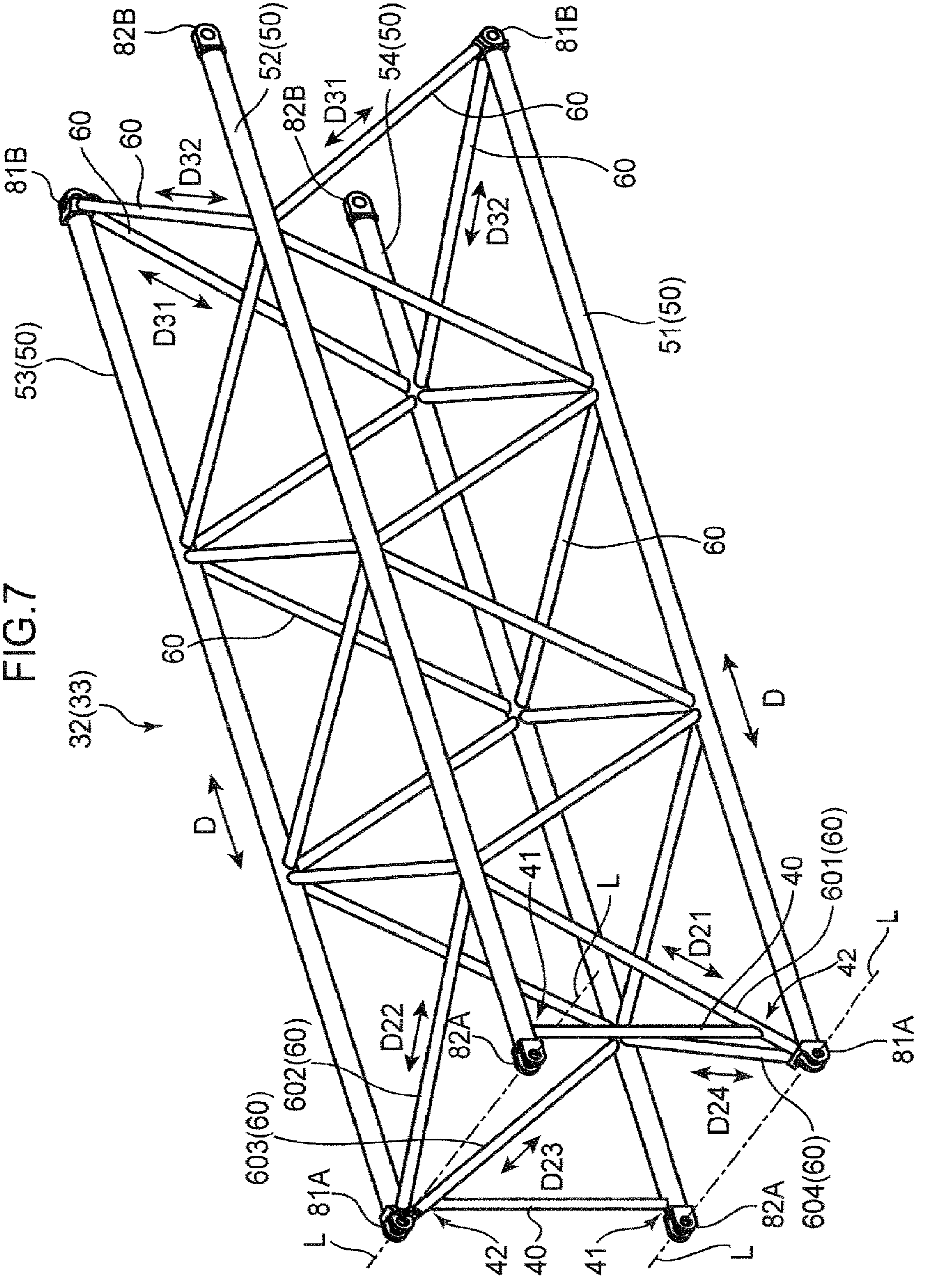
FIG. 7 is a perspective view of the lattice structure in FIG. 6.

FIG. 6 is a perspective view of a lattice structure 33 according to a second embodiment of the present invention, and another lattice structure 32 coupled to the lattice structure 33. FIG. 7 is a perspective view of one of the lattice structures 32, 33 in FIG. 6.

In the second embodiment shown in FIG. 6 and FIG. 7, each of the lattice structures 32, 33 includes four main members 50, a plurality of connectors, a plurality of diagonal members 60, and a plurality of reinforcement parts 40. The lattice structure 32 and the lattice structure 33 have the same configuration. Specifically, a basic configuration of the lattice structure according to the second embodiment is similar to that in the first embodiment.

Figure 8:
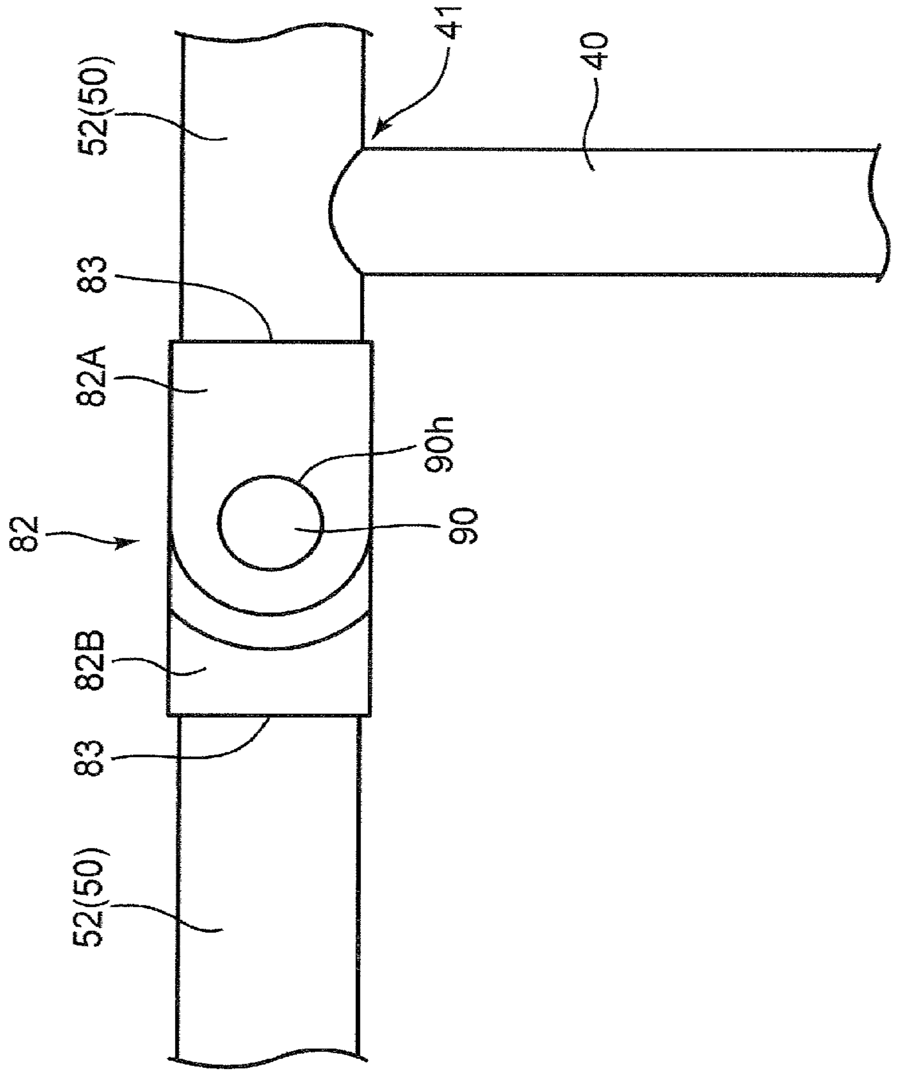
FIG. 8 is an enlarged view of a portion in a framed box VIII in FIG. 6.
Figure 9:
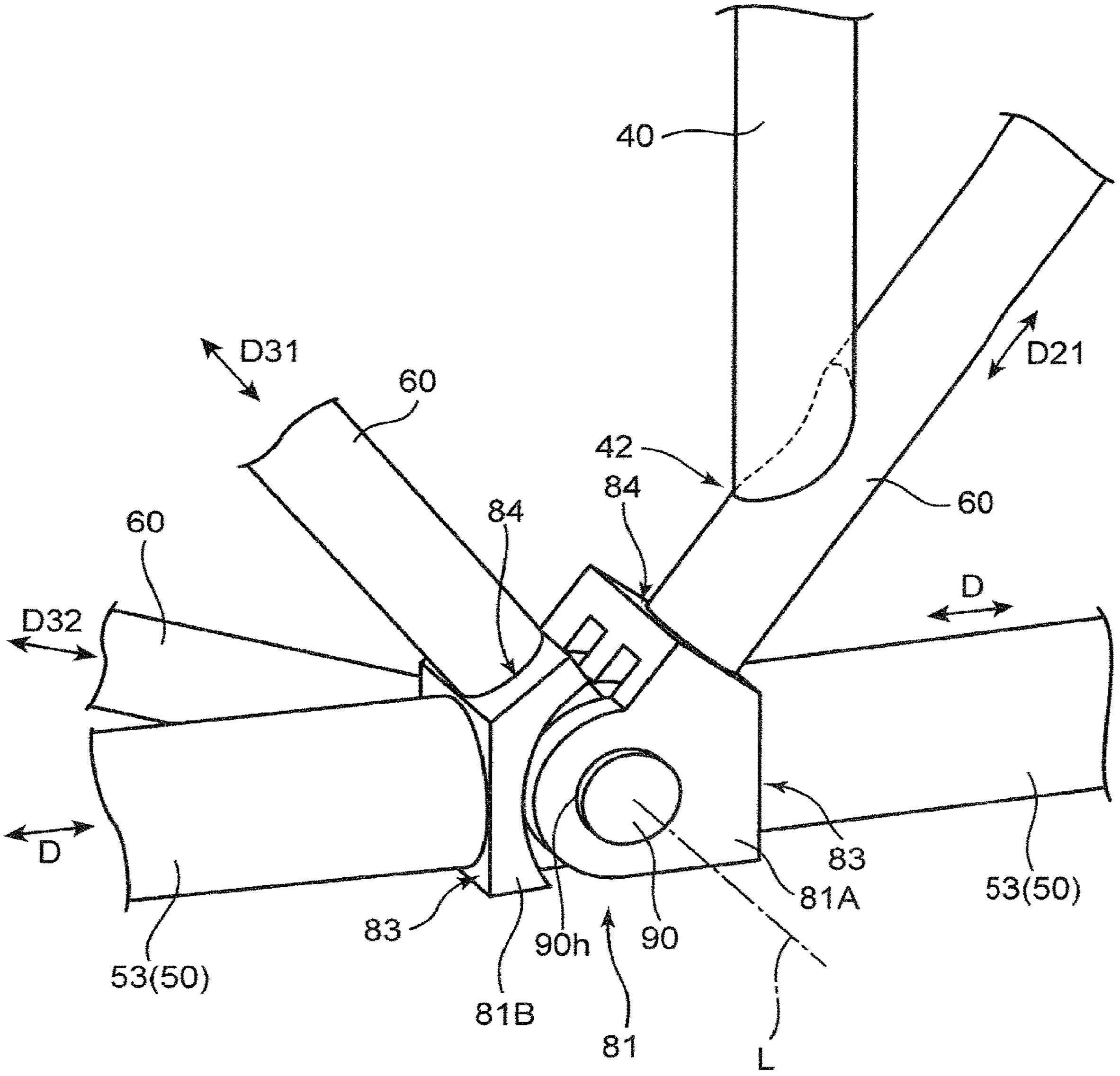
FIG. 9 is an enlarged view of a portion in a framed box IX in FIG. 6.
Figure 10:
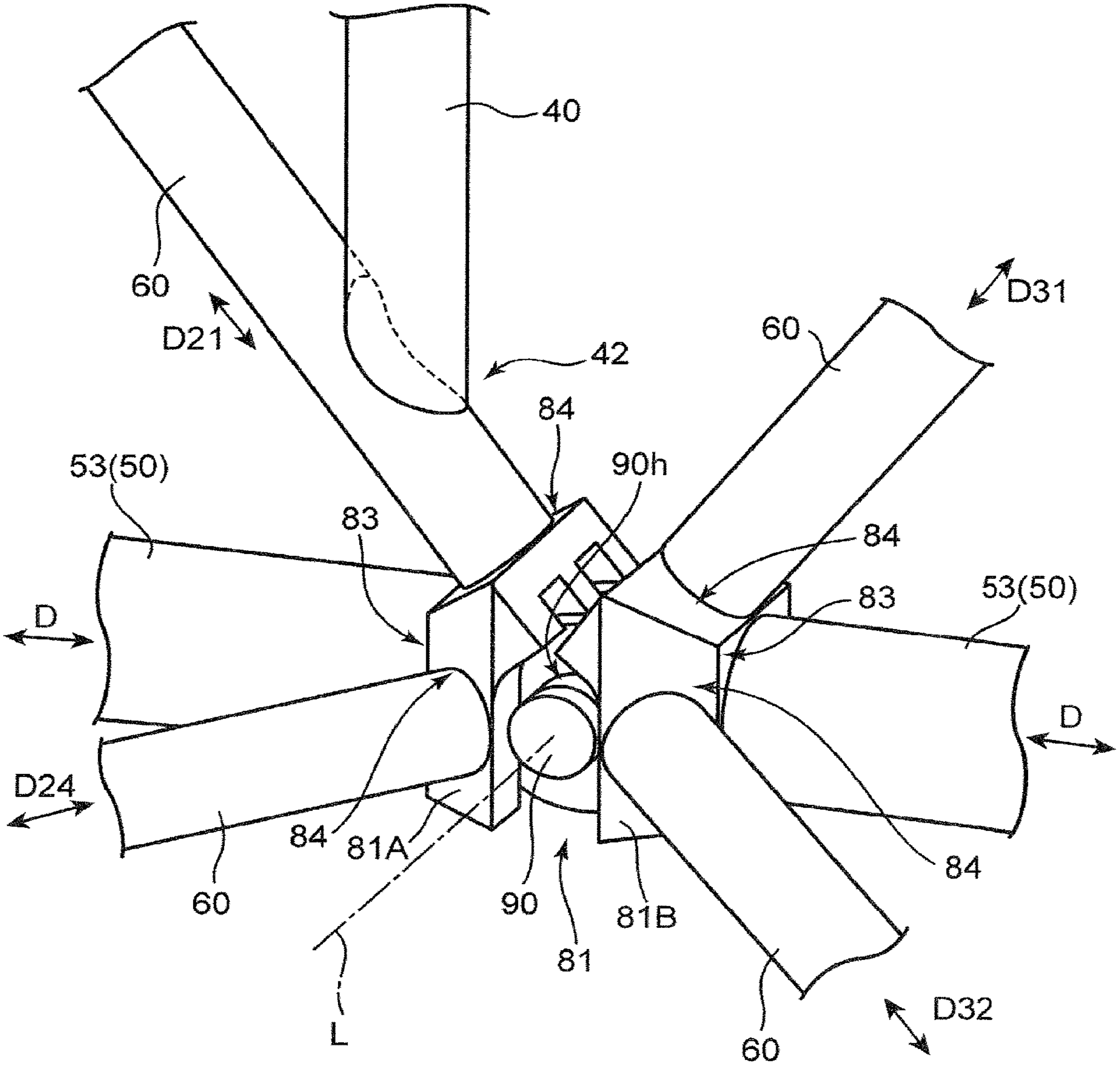
FIG. 10 shows a backside of the portion shown in FIG. 9.

FIG. 8 is an enlarged view of a portion in a framed box VIII in FIG. 6. FIG. 9 is an enlarged view of a portion in a framed box IX in FIG. 6. FIG. 10 shows a backside of the portion shown in FIG. 9.

Each of the four main members 50 is a linearly extending pipe (main pipe) in the second embodiment as well. As shown in FIG. 6 to FIG. 10, each of the connectors is connected to one of one end and another end of each of the four main members 50. Specifically, one of a female connector and a male connector is connected to the one end (left end in FIGS. 6, 7) of each of the four main members 50, and the other of the female connector and the male connector is connected to the another end (right end in FIGS. 6, 7) of each of the four main members 50.

In the specific examples shown in FIG. 8 to FIG. 10, a first main member 51 has one end to which a first female connector 81A is connected, and another end to which a first male connector 81B is connected. A second main member 52 has one end to which a second female connector 82A is connected, and another end to which a second male connector 82B is connected. A third main member 53 has one end to which a third female connector 81A having the same shape as the first connector 81A is connected, and another end to which a third male connector 81B having the same shape as the first connector 81B is connected. A fourth main member 54 has one end to which a fourth female connecter 82A having the same shape as the second connector 82A is connected, and another end to which a fourth male connector 82B having the same shape as the second connector 82B is connected.

As shown in FIG. 7, central axes L of pin insertion holes (axial directions L of pins) of the first connectors 81A, 81B, those of the second connectors 82A, 82B, those of the third connectors 81A, 81B, and those of the fourth connectors 82A, 82B are parallel to one another.

As shown in FIG. 9 and FIG. 10, the female connector 81A and the male connector 81B are rotatably connected to each other by a pin 90. These connectors 81A, 81B compose a coupling unit 81 for the adjacent lattice structures 32, 33. Each of the connectors 81A, 81B has an insertion hole 90*h* in which the pin 90 is inserted. The connector 81A has a main member joint 83 for joining the main member 50 thereto and two diagonal member joints 84 for respectively joining corresponding two diagonal members 60 thereto. Similarly, the connector 81B has a main member joint 83 for joining the main member 50 thereto and two diagonal member joints 84 for respectively joining corresponding two diagonal members 60 thereto.

In the embodiment, as shown in FIG. 9 and FIG. 10, a plane parallel to a longitudinal direction D of the main member 50 connected to the connector 81A and a longitudinal direction D21 of one of the diagonal members 60 connected to the connector 81A, and a plane parallel to the longitudinal direction D of the main member 50 connected to the connector 81B and a longitudinal direction D31 of the one of the diagonal members 60 connected to the connector 81B are parallel to each other and perpendicular to the axial direction L of the pin 90 (central axis L of the insertion hole 90*h*).

Besides, a plane parallel to the longitudinal direction D of the main member 50 connected to the connector 81A and a longitudinal direction D22 of the other of the diagonal members 60 connected to the connector 81A, and a plane parallel to the longitudinal direction D of the main member 50 connected to the connector 81B and a longitudinal direction D32 of the other of the diagonal members 60 connected to the connector 81B are parallel to each other and parallel to the axial direction L of the pin 90 (central axis L of the insertion hole 90*h*).

As shown in FIG. 8, the female connector 82A and the male connector 82B are rotatably connected to each other by a pin 90. These connectors 82A, 82B compose a coupling unit 82 for the adjacent lattice structures 32, 33. Each of the connectors 82A, 82B has an insertion hole 90*h* in which the pin 90 is inserted. The connector 82A has a main member joint 83 for joining the main member 50 thereto while having no diagonal member joint for joining the diagonal members 60 thereto. Similarly, the connector 82B has a main member joint 83 for joining the main member 50 thereto while having no diagonal member joint for joining the diagonal members 60 thereto. In other words, only the main member 50 is connected to each of the female connector 82A and the male connector 82B.

Diagonal Member

Each of the diagonal members 60 is a pipe (diagonal pipe) linearly extending so as to be inclined with respect to the longitudinal direction of the lattice structure for connecting two adjacent main members 50 among the four main members 50 with each other in the second embodiment as well. Specifically, for instance, the diagonal members include a plurality of first diagonal members 60 each connecting the first main member 51 and the second main member 52 with each other. The first diagonal members 60 connect the first main member 51 and the second main member 52 with each other in a zigzag manner. Similarly, the diagonal members include a plurality of second diagonal members 60 each connecting the third main member 53 and the fourth main member 54 with each other. The second diagonal members 60 connect the third main member 53 and the fourth main member 54 with each other in a zigzag manner.

Nearest Diagonal Member

The diagonal members 60 in the second embodiment include four nearest diagonal members 601 to 604 located near the one end (left end in FIG. 3) of the lattice structure in the longitudinal direction thereof as well.

As shown in FIG. 6 and FIG. 7, the nearest diagonal member 601 (serving as an exemplary first nearest diagonal member) is a diagonal member 60 located nearest to the first connector 81A among the first diagonal members 60 connecting the first main member 51 and the second main member 52 with each other. The nearest diagonal member 601 has one end connected to the first connector 81A and another end connected to the second main member 52. In this way, the nearest diagonal member 601 connects the first main member 51 and the second main member 52 with each other. As shown in FIG. 7, the nearest diagonal member 601 is inclined in the direction D21 at an angle to the longitudinal direction of the lattice structure so that a distance between the one end of the nearest diagonal member 601 and the first connector 81A is shorter than a distance between the another end of the nearest diagonal member 601 and the second connector 82A.

The nearest diagonal member 602 is a diagonal member 60 located nearest to the second connector 82A among the diagonal members 60 connecting the second main member 52 and the third main member 53 with each other. The nearest diagonal member 602 has one end connected to the third connector 81A and another end connected to the second main member 52. In this way, the nearest diagonal member 602 connects the second main member 52 and the third main member 53 with each other. The nearest diagonal member 602 is inclined in the direction D22 at an angle to the longitudinal direction of the lattice structure so that a distance between the one end of the nearest diagonal member 602 and the second connector 82A is longer than a distance between the another end of the nearest diagonal member 602 and the third connector 81A.

The nearest diagonal member 603 (serving as an exemplary second nearest diagonal member) is a diagonal member 60 located nearest to the third connector 81A among the second diagonal members 60 connecting the third main member 53 and the fourth main member 54 with each other. The nearest diagonal member 603 has one end connected to the third connector 81A and another end connected to the fourth main member 54. In this way, the nearest diagonal member 603 connects the third main member 53 and the fourth main member 54 with each other. The nearest diagonal member 603 is inclined in a direction D23 at an angle to the longitudinal direction of the lattice structure so that a distance between the one end of the nearest diagonal member 603 and the third connector 81A is shorter than a distance between the another end of the nearest diagonal member 603 and the fourth connector 82A.

The nearest diagonal member 604 is a diagonal member 60 located nearest to the fourth connector 82A among the diagonal members 60 connecting the fourth main member 54 and the first main member 51 with each other. The nearest diagonal member 604 has one end connected to the first connector 81A and another end connected to the fourth main member 54. In this way, the nearest diagonal member 604 connects the fourth main member 54 and the first main member 51 with each other. The nearest diagonal member 604 is inclined in a direction D24 at an angle to the longitudinal direction of the lattice structure so that a distance between the one end of the nearest diagonal member 604 and the fourth connector 82A is longer than a distance between the another end of the nearest diagonal member 604 and the first connector 81A.

Similarly, four nearest diagonal members, like the four nearest diagonal members 601 to 604, are arranged near another end of the lattice structure in the longitudinal direction thereof as well.

Reinforcement Part

Each of the reinforcement parts 40 is a linearly extending pipe (reinforcement pipe) in the second embodiment as well. Further, the reinforcement parts 40 include two reinforcement parts 40, i.e., a first reinforcement part 40 and a second reinforcement part 40 as well.

The first reinforcement part 40 has one end 42 and another end 41 in a longitudinal direction (axial direction) thereof. The one end 42 of the first reinforcement part 40 is connected to the nearest diagonal member 601 and the another end 41 of the first reinforcement part 40 is connected to the second main member 52. The first reinforcement part 40 extends from the nearest diagonal member 601 to the second main member 52 in the longitudinal direction (exemplary first specific direction) thereof for connecting the nearest diagonal member 601 and the second main member 52 with each other. Specifically, the longitudinal direction of the first reinforcement part 40 is perpendicular to the longitudinal direction of the lattice structure. The first reinforcement part 40 is arranged in a posture extending in a direction perpendicular to the central axis L of the pin insertion hole (axial direction L of the pin) of the second connector 82A and intersecting the longitudinal direction of the second main member 52. More specifically, the first reinforcement part 40 is arranged in a posture extending in a direction perpendicular to the central axis L of the pin insertion hole (axial direction L of the pin) of the second connector 82A and perpendicular to the longitudinal direction of the second main member 52. The another end 41 of the first reinforcement part 40 is connected to the second main member 52 at a position in a portion of the second main member 52 that is adjacent to the second connector 82A.

The second reinforcement part 40 has one end 42 and another end 41 in a longitudinal direction (axial direction) thereof. The one end 42 of the second reinforcement part 40 is connected to the nearest diagonal member 603 and the another end 41 of the second reinforcement part 40 is connected to the fourth main member 54. The second reinforcement part 40 extends from the nearest diagonal member 603 to the fourth main member 54 in the longitudinal direction (exemplary second specific direction) thereof for connecting the nearest diagonal member 603 and the fourth main member 54 with each other. Specifically, the second reinforcement part 40 is arranged in a posture extending in a direction perpendicular to the longitudinal direction of the lattice structure. The second reinforcement part 40 is arranged in a posture extending in a direction perpendicular to the central axis L of the pin insertion hole (axial direction L of the pin) of the fourth connector 82A and intersecting the longitudinal direction of the fourth main member 54. More specifically, the second reinforcement part 40 is arranged in a posture extending in a direction perpendicular to the central axis L of the pin insertion hole (axial direction L of the pin) of the fourth connector 82A and perpendicular to the longitudinal direction of the fourth main member 54. The another end 41 of the second reinforcement part 40 is connected to the fourth main member 54 at a position in a portion of the fourth main member 54 that is adjacent to the fourth connector 82A.

In the first and second embodiments, the two reinforcement parts 40 are arranged only at the one end (left end in FIGS. 3, 7) of the lattice structure in the longitudinal direction thereof, but no reinforcement part 40 is provided at the another end (right end in FIGS. 3, 7) of the lattice structure in the longitudinal direction thereof. However, the present invention is not limited to the configuration. In the present invention, reinforcement parts 40 having the same configuration as those described above may be provided at the another end of the lattice structure in the longitudinal direction thereof.

The present invention should not be limited to the embodiments described above. The present invention covers, for example, aspects which will be described below.

First Modification

Figure 11:
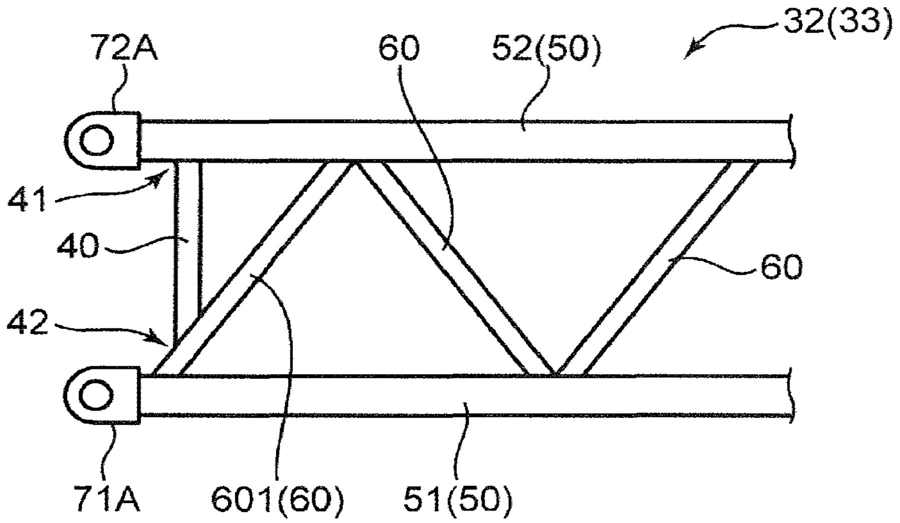
FIG. 11 is a schematic sideview of a lattice structure according to a first modification of the first and second embodiments.

FIG. 11 is a schematic sideview of a lattice structure 32 (33) according to a first modification of the first and second embodiments. In the first modification, a nearest diagonal member 601 has one end which is not connected to a first connector 71A, but is connected to a first main member 51. The remaining configurations of the lattice structure 32 (33) according to the first modification are equivalent to those in the first embodiment or the second embodiment.

Second Modification

Figure 12:
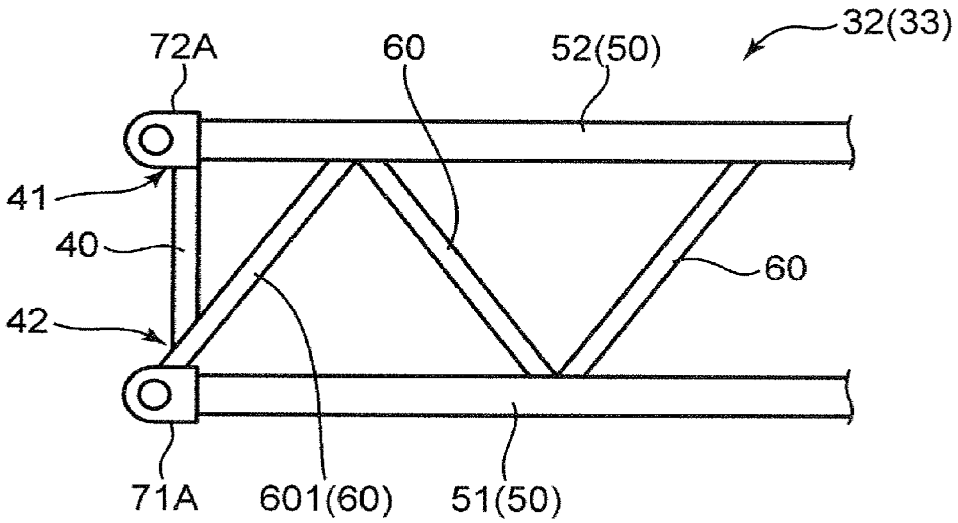
FIG. 12 is a schematic sideview of a lattice structure according to a second modification of the first and second embodiments.

FIG. 12 is a schematic sideview of a lattice structure 32 (33) according to a second modification of the first and second embodiments. In the second modification, a reinforcement part 40 has another end 41 which is not connected to a second main member 52, but is connected to a second connector 72A. In the second modification, the reinforcement part 40 is arranged in a posture extending in a direction (perpendicular direction) perpendicular to a longitudinal direction of the lattice structure or inclined in a direction at an angle to the perpendicular direction. The remaining configurations of the lattice structure 32 (33) according to the second modification are equivalent to those in the first embodiment or the second embodiment.

Third Modification

Figure 13:
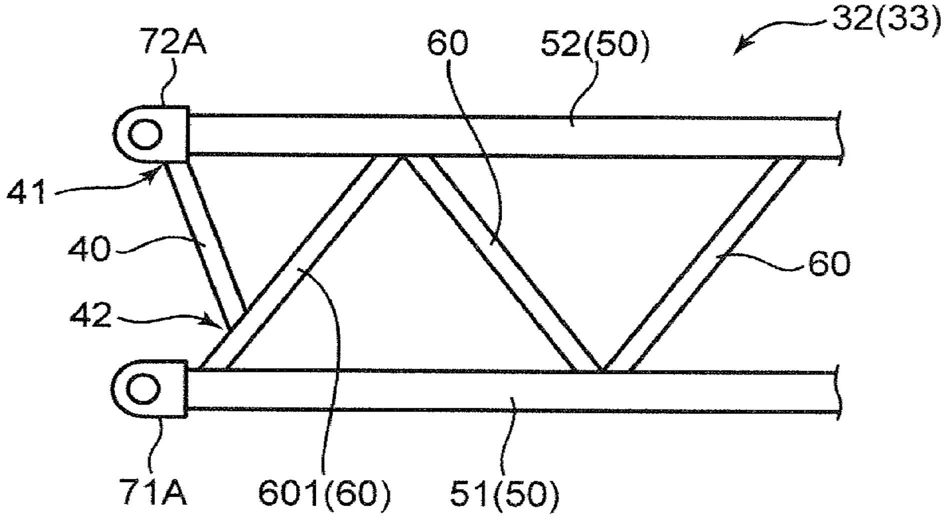
FIG. 13 is a schematic sideview of a lattice structure according to a third modification of the first and second embodiments.

FIG. 13 is a schematic sideview of a lattice structure according to a third modification of the first and second embodiments. In the third modification, a nearest diagonal member 601 has one end which is not connected to a first connector 71A, but is connected to a first main member 51. In the third modification, a reinforcement part 40 has another end 41 which is not connected to a second main member 52, but is connected to a second connector 72A. In this way, the reinforcement part 40 connects the nearest diagonal member 601 and the second connector 72A with each other. In other words, the reinforcement part 40 connects the nearest diagonal member 601 and the second main member 52 with each other via the second connector 72A. In the third modification, a first specific direction corresponding to a longitudinal direction of the reinforcement part 40 does not indicate a direction (perpendicular direction) perpendicular to a longitudinal direction of the lattice structure, but indicates a direction at an angle to the perpendicular direction. The remaining configurations of the lattice structure 32 (33) according to the third modification are equivalent to those in the first embodiment or the second embodiment.

Lattice Structure According to Third Embodiment

Figure 14:
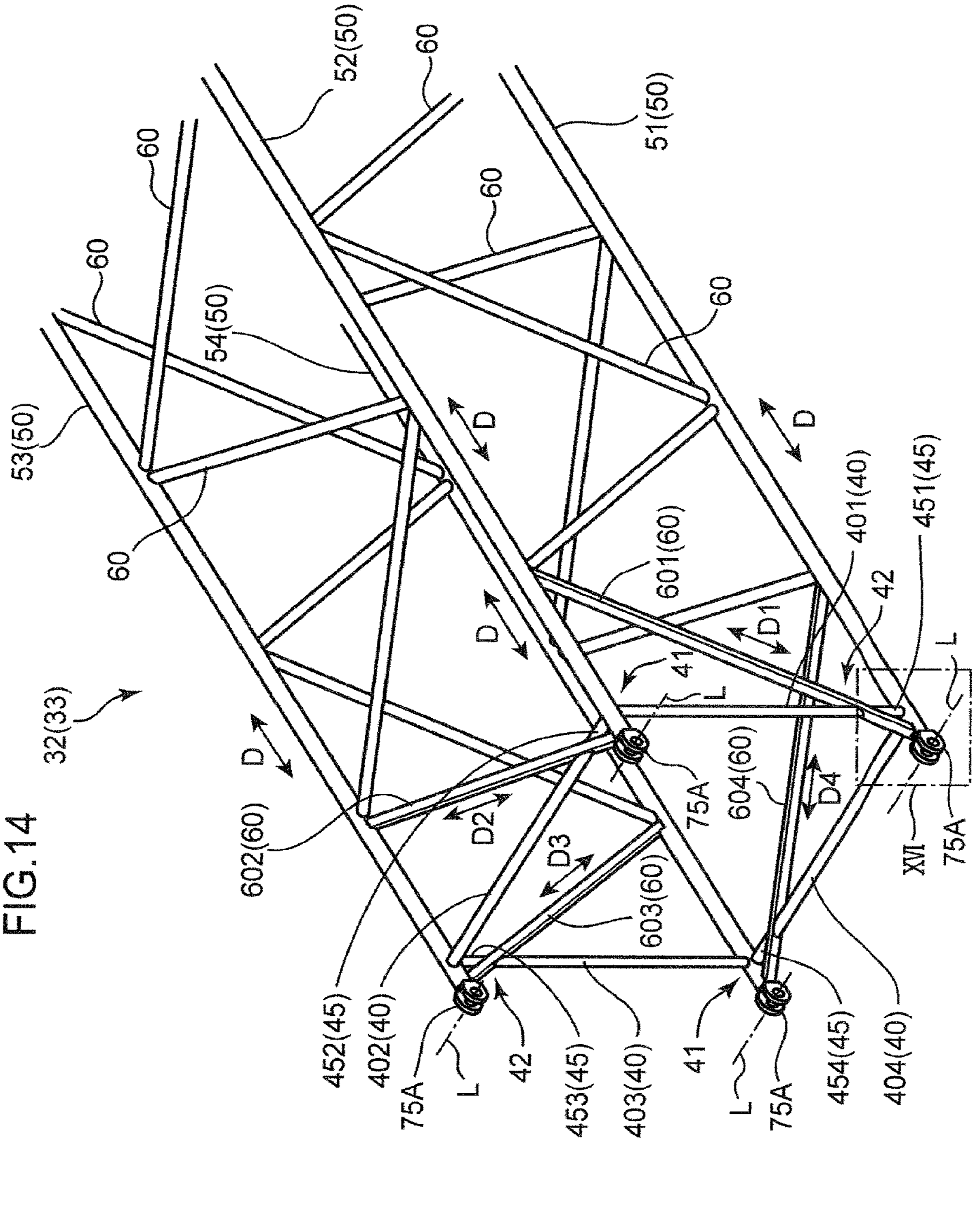
FIG. 14 is a perspective view of a lattice structure according to a third embodiment.
Figure 15:
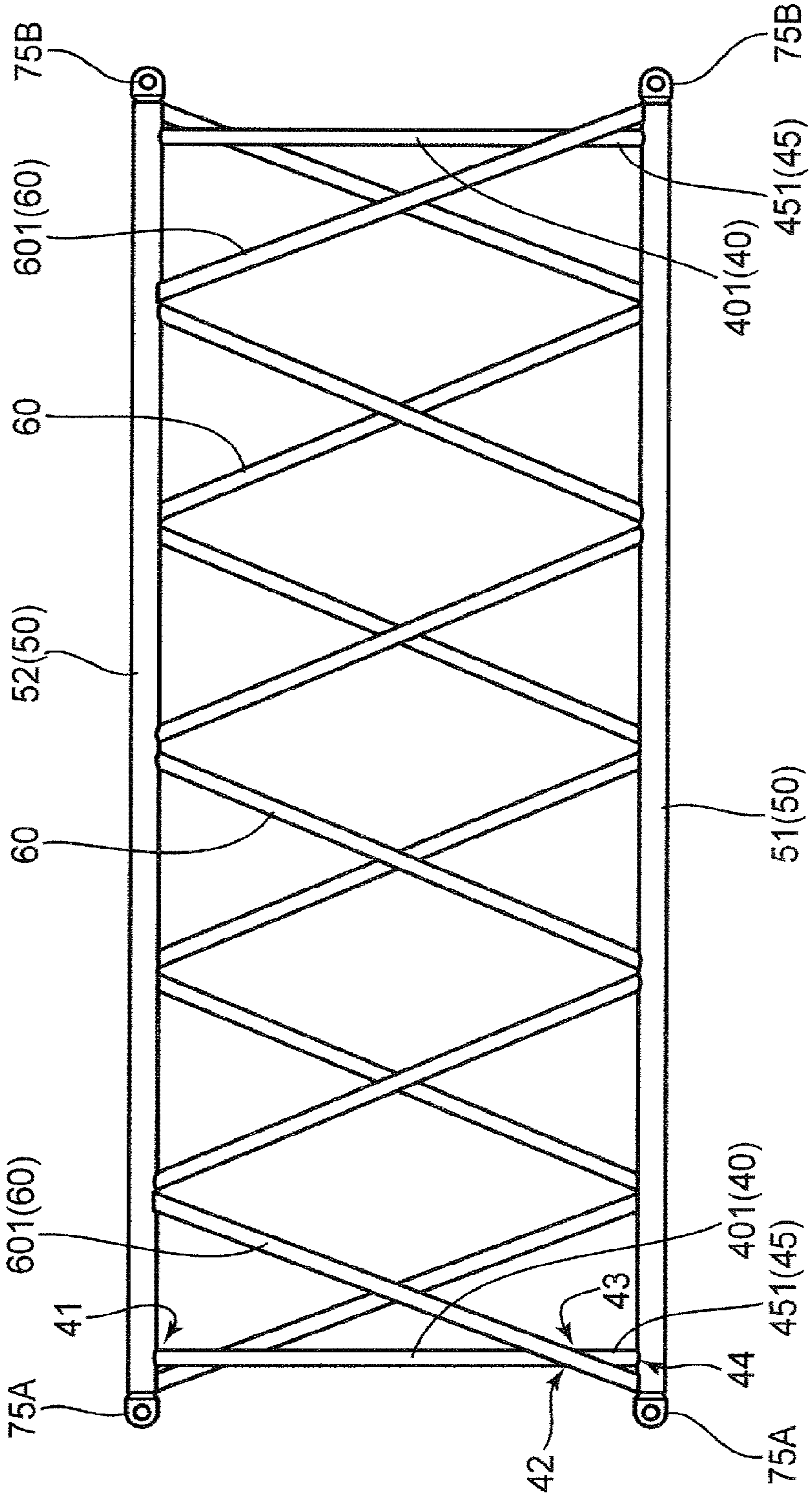
FIG. 15 is a sideview of the lattice structure according to the third embodiment.
Figure 16:
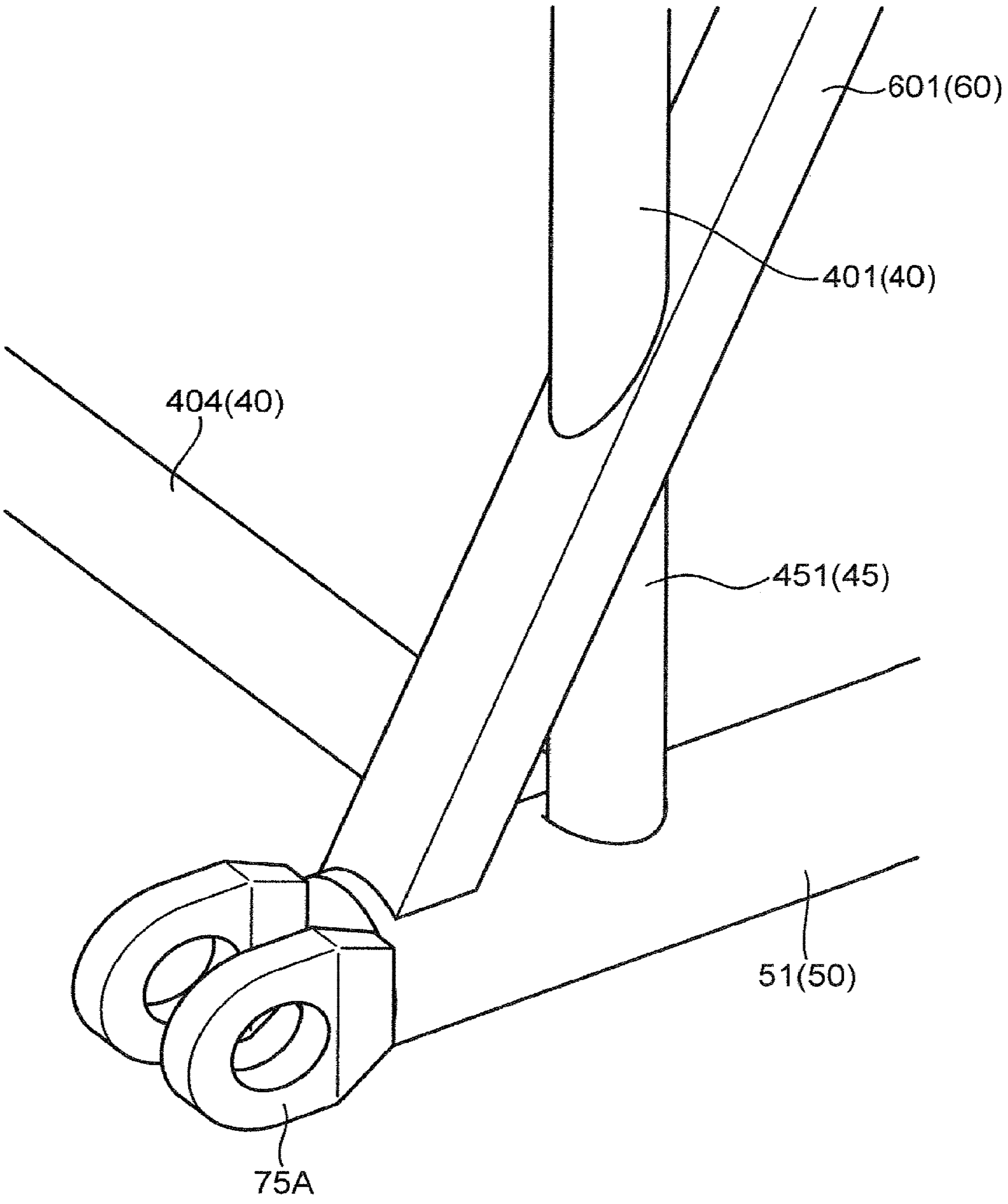
FIG. 16 is an enlarged perspective view of a portion in a framed box XVI in FIG. 14.
Figure 17:
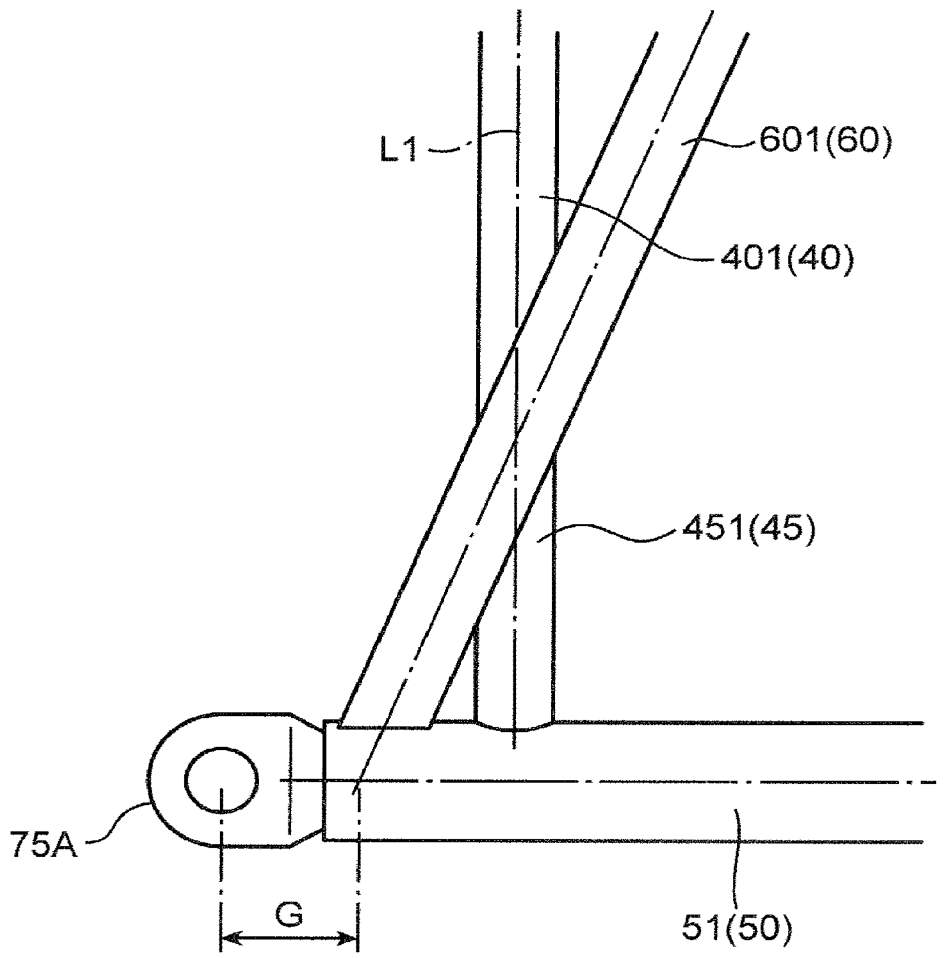
FIG. 17 is an enlarged sideview of the portion in the framed box XVI in FIG. 14.

FIG. 14 is a perspective view of a lattice structure 32 according to a third embodiment, and FIG. 15 is a sideview thereof. FIG. 16 is an enlarged perspective view of a portion in a framed box XVI in FIG. 14, and FIG. 17 is a sideview thereof. A basic configuration of the lattice structure 32 according to the third embodiment is similar to that of the lattice structure 32 according to the first embodiment.

The lattice structure 32 according to the third embodiment shown in FIG. 14 serves as, for example, the boom member 32 shown in FIG. 1, and a lattice structure 33 (boom member 33) is couplable to the lattice structure 32. The lattice structure 32 and the lattice structure 33 have the same configuration in the third embodiment as well. As shown in FIG. 14 and FIG. 15, each of the lattice structures 32, 33 according to the third embodiment includes four main members 50, a plurality of connectors 75A, 75B, a plurality of diagonal members 60, a plurality of reinforcement parts 40, and a plurality of sub-reinforcement parts 45.

Main Member

Each of the four main members 50 is a linearly extending pipe (main pie) in the third embodiment as well. The four main members 50 include a first main member 51, a second main member 52, a third main member 53, and a fourth main member 54 in the same manner as those in the first embodiment.

Connector

Each of the connectors is connected to a corresponding one of one end and another end of each of the four main members 50. In the specific examples shown in FIGS. 14 and 15, each of the first to fourth main members 51 to 54 has one end (left end in FIG. 14 and FIG. 15) to which, for example, the female connector 75A is connected and another end (right end in FIG. 15) to which, for example, the male connector 75B is connected. However, the female connector 75A and the male connector 75B shown in FIG. 14 and FIG. 15 may be interchanged.

As shown in FIG. 14 to FIG. 17, central axes L of pin insertion holes (axial directions L of pins) of the four connectors 75A each connected to the corresponding one end of each of the first to fourth main members 51 to 54 are parallel to one another. Although unillustrated, central axes of pin insertion holes (axial directions of pins) of the four connectors 75B each connected to the corresponding another end of each of the first to fourth main members 51 to 54 are parallel to one another, and parallel to the central axes L of the insertion holes of the four connectors 75A. The female connector 75A and the male connector 75B are rotatably connected to each other by the pin. These connectors 75A, 75B compose a coupling unit for the adjacent lattice structures 32, 33.

The connector 75A has a main member joint for joining the main member 50 thereto while having no diagonal member joint like the diagonal member joint shown in FIG. 4 and FIG. 5. Similarly, the connector 75B has a main member joint for joining the main member 50 thereto while having no diagonal member joint. In other words, the main member 50 is connected to each of the connector 75A and 75B while no diagonal member 60 is connected thereto.

Diagonal Member

Each of the diagonal members 60 is a pipe (diagonal pipe) linearly extending so as to be inclined with respect to a longitudinal direction of the lattice structure in the third embodiment as well. Each of the diagonal member 60 has one end in a longitudinal direction (axial direction) thereof and another end opposite the one end in the longitudinal direction. Each diagonal member 60 connects two adjacent main members among the four main members with each other. The diagonal members 60 include a plurality of nearest diagonal members 601 to 604 in the same manner as those in the first embodiment.

Nearest Diagonal Member

As shown in FIG. 14, the four nearest diagonal members 601 to 604 are located near one end (left end in FIG. 14 and FIG. 15) of the lattice structure 32 in the longitudinal direction thereof and near another end (right end in FIG. 15) of the lattice structure 32 in the longitudinal direction thereof.

In the third embodiment, each of the nearest diagonal members 601 to 604 is a member having a prism-shape as shown in FIG. 14 and FIG. 16. However, each of the nearest diagonal members 601 to 604 may be a cylindrical member (cylindrical pipe) like that in the first embodiment, or may be a shaped steel member, such as an H-steel member and a channel steel member. Further, each of the nearest diagonal members may be a hollow member like a pipe, or a solid member.

The H-steel member has a pair of flanges extending parallel to each other and a web perpendicular to the flanges for connecting the flanges with each other. Each of the flanges and the web constitutes a portion of the nearest diagonal member that extends in a longitudinal direction of the nearest diagonal member. The web is located to connect a center section of one flange of the flanges in a width direction of the one flange and a center section of the other flange of the flanges in a width direction of the other flange. The web may be located to connect another section of the one flange deviating from the center section in the width direction thereof and another section of the other flange deviating from the center section in the width direction thereof with each other.

The channel steel member may be a lip channel steel member (C-steel member) or a light channel steel member. The channel steel member has a pair of flanges extending parallel to each other and a web being perpendicular to the flanges for connecting the flanges with each other. Each of the flanges and web constitutes a portion of the nearest diagonal member that extends in a longitudinal direction of the nearest diagonal member. The web is located to connect respective ends of the flanges in the width direction with each other.

Each of the H-steel member and the channel steel member has an unillustrated opening having a groove-shape and defined by the pair of flanges and the web. For instance, as shown in FIG. 16, the nearest diagonal member 601 is preferably arranged in such a posture as to allow the opening to face a sub-reinforcement part 451 between the first main member 51 and a reinforcement part 401. A narrow region between one end of the nearest diagonal member 601 to be welded to the first main member 51 and the sub-reinforcement part 451 may make it difficult to perform a welding operation of connecting a portion of the one end of the nearest diagonal member 601 that is nearer to the sub-reinforcement part 451 to the first main member 51, the portion of the one end of the nearest diagonal member 601 being opposite to another portion thereof nearer to the connector 75A. In this case, a shaped steel member having the aforementioned opening is adoptable as the nearest diagonal member 601, and the shaped steel member is arranged in such a posture as to allow the opening to face the sub-reinforcement part 451. This configuration can more effectively aim at a decrease in workloads required for the welding operation and at weight reduction than a configuration adopting, as the nearest diagonal member 601, a member having a cylindrical shape with a closed section. In the nearest diagonal member 601, the opening is continuous from the one end to another end of the nearest diagonal member 601. However, the opening may be defined only in, for example, a portion of the nearest diagonal member 601 between the first main member 51 and the reinforcement part 401.

The nearest diagonal member 601 is a diagonal member 60 located nearest to the connector 75A connected to the one end of the first main member 51 among the diagonal members 60 connecting the first main member 51 and the second main member 52 with each other. As shown in FIG. 16, the one end of the nearest diagonal member 601 is connected to a portion of the first main member 51 that is adjacent to the connector 75A, and the another end of the nearest diagonal member 601 is connected to the second main member 52. In this way, the nearest diagonal member 601 connects the first main member 51 and the second main member 52 with each other. The nearest diagonal member 601 is a continuous member linearly and continuously extending from the first main member 51 to the second main member 52. Specifically, the nearest diagonal member 601 is made of a single member from the first main member 51 to the second main member 52.

The nearest diagonal member 602 is a diagonal member 60 located nearest to the connector 75A connected to one end of the second main member 52 among the diagonal members 60 connecting the second main member 52 and the third main member 53 with each other. The nearest diagonal member 602 has one end connected to a portion of the second main member 52 that is adjacent to the connector 75A, and another end connected to the third main member 53. In this way, the nearest diagonal member 602 connects the second main member 52 and the third main member 53 with each other. The nearest diagonal member 602 is a continuous member linearly and continuously extending from the second main member 52 to the third main member 53. Specifically, the nearest diagonal member 602 is made of a single member from the second main member 52 to the third main member 53.

The nearest diagonal member 603 is a diagonal member 60 located nearest to the connector 75A connected to one end of the third main member 53 among the diagonal members 60 connecting the third main member 53 and the fourth main member 54 with each other. The nearest diagonal member 603 has one end connected to a portion of the third main member 53 that is adjacent to the connector 75A, and another end connected to the fourth main member 54. In this way, the nearest diagonal member 603 connects the third main member 53 and the fourth main member 54 with each other. The nearest diagonal member 603 is a continuous member linearly and continuously extending from the third main member 53 to the fourth main member 54. Specifically, the nearest diagonal member 603 is made of a single member from the third main member 53 to the fourth main member 54.

The nearest diagonal member 604 is a diagonal member 60 located nearest to the connector 75A connected to one end of the fourth main member 54 among the diagonal members 60 connecting the fourth main member 54 and the first main member 51 with each other. The nearest diagonal member 604 has one end connected to a portion of the fourth main member 54 that is adjacent to the connector 75A, and another end connected to the first main member 51. In this way, the nearest diagonal member 604 connects the fourth main member 54 and the first main member 51 with each other. The nearest diagonal member 604 is a continuous member linearly and continuously extending from the fourth main member 54 to the first main member 51. Specifically, the nearest diagonal member 604 is made of a single member from the fourth main member 54 to the first main member 51.

Reinforcement Part

Each of the reinforcement parts 40 is a linearly extending pipe (reinforcement pipe) in the third embodiment as well. However, each of the reinforcement parts 40 may be, for example, a member having a prism-shape, or a shaped steel member, such as an H-steel member and a channel steel member. Moreover, each of the reinforcement parts 40 may be a solid member.

In the third embodiment, the reinforcement parts 40 include a reinforcement part 401, a reinforcement part 402, a reinforcement part 403, and a reinforcement part 404. The four reinforcement parts 401 to 404 are respectively arranged at the one end (left end in FIG. 14 and FIG. 15) of the lattice structure 32 in the longitudinal direction thereof and another end (right end in FIG. 15) of the lattice structure 32 in the longitudinal direction thereof.

Specifically, as shown in FIG. 14 to FIG. 17, the reinforcement part 401 has one end 42 and another end 41 in a longitudinal direction thereof, the one end 42 being connected to the nearest diagonal member 601 and the another end 41 being connected to the second main member 52. The reinforcement part 401 extends from the nearest diagonal member 601 to the second main member 52 in the longitudinal direction for connecting the nearest diagonal member 601 and the second main member 52 with each other. The longitudinal direction of the reinforcement part 401 is perpendicular to the longitudinal direction of the lattice structure. Specifically, the longitudinal direction of the reinforcement part 401 indicates a direction (exemplary first specific direction) perpendicular to the longitudinal direction of the lattice structure and perpendicular to the central axis L of the pin insertion hole (axial direction L of the pin) of the connector 75A.

As shown in FIG. 14, the reinforcement part 402 has one end and another end in a longitudinal direction thereof, the one end being connected to the nearest diagonal member 602 and the another end being connected to the third main member 53. The reinforcement part 402 extends from the nearest diagonal member 602 to the third main member 53 in the longitudinal direction thereof for connecting the nearest diagonal member 602 and the third main member 53 with each other. The longitudinal direction of the reinforcement part 402 is perpendicular to the longitudinal direction of the lattice structure. Specifically, the longitudinal direction of the reinforcement part 402 is perpendicular to the longitudinal direction of the lattice structure and parallel to the central axis L of the pin insertion hole (axial direction L of the pin) of the connector 75A.

The reinforcement part 403 has one end and another end in a longitudinal direction thereof, the one end being connected to the nearest diagonal member 603 and the another end being connected to the fourth main member 54. The reinforcement part 403 extends from the nearest diagonal member 603 to the fourth main member 54 in the longitudinal direction thereof for connecting the nearest diagonal member 603 and the fourth main member 54 with each other. The longitudinal direction of the reinforcement part 403 is perpendicular to the longitudinal direction of the lattice structure. Specifically, the longitudinal direction of the reinforcement part 403 indicates a direction (exemplary second specific direction) perpendicular to the longitudinal direction of the lattice structure and perpendicular to the central axis L of the pin insertion hole (axial direction L of the pin) of the connector 75A.

The reinforcement part 404 has one end and another end in a longitudinal direction thereof, the one end being connected to the nearest diagonal member 604 and the another end being connected to the first main member 51. The reinforcement part 404 extends from the nearest diagonal member 604 to the first main member 51 in the longitudinal direction thereof for connecting the nearest diagonal member 604 and the first main member 51 with each other. The longitudinal direction of the reinforcement part 404 is perpendicular to the longitudinal direction of the lattice structure. Specifically, the longitudinal direction of the reinforcement part 404 is perpendicular to the longitudinal direction of the lattice structure and parallel to the central axis L of the pin insertion hole (axial direction L of the pin) of the connector 75A.

Sub-Reinforcement Part

Each of the sub-reinforcement parts 45 is a linearly extending pipe (sub-reinforcement pipe). However, each of the sub-reinforcement parts 45 may be, for example, a member having a prism-shape. Each of the sub-reinforcement parts 45 may be made of at least a plate-like member, a shaped steel member, such as a H-steel member and a channel steel member, or a member having a box shape.

The sub-reinforcement parts 45 include a sub-reinforcement part 451, a sub-reinforcement part 452, a sub-reinforcement part 453, and a sub-reinforcement part 454. The four sub-reinforcement parts 451 to 454 are respectively arranged at the one end (left end in FIG. 14 and FIG. 15) of the lattice structure 32 in the longitudinal direction thereof and another end (right end in FIG. 15) of the lattice structure 32 in the longitudinal direction thereof. More details will be described below.

As shown in FIG. 14 to FIG. 17, the sub-reinforcement part 451 has one end 44 connected to the first main member 51 and another end 43 connected to the nearest diagonal member 601. The sub-reinforcement part 451 extends from the first main member 51 to the nearest diagonal member 601 in a longitudinal direction thereof for connecting the first main member 51 and the nearest diagonal member 601 with each other. The sub-reinforcement part 451 is arranged at such a position as to overlap the reinforcement part 401 when the sub-reinforcement part 451 is viewed in the longitudinal direction (first specific direction) of the reinforcement part 401. Specifically, the sub-reinforcement part 451 extends from the first main member 51 to the nearest diagonal member 601 in a direction parallel to the longitudinal direction (first specific direction) of the reinforcement part 401. More specifically, in the third embodiment, a central axis of the reinforcement part 401 and a central axis of the sub-reinforcement part 451 are substantially on the same straight line L1, as shown in FIG. 17.

As shown in FIG. 14, the sub-reinforcement part 452 has one end connected to the second main member 52 and another end connected to the nearest diagonal member 602. The sub-reinforcement part 452 extends from the second main member 52 to the nearest diagonal member 602 in a longitudinal direction thereof for connecting the second main member 52 and the nearest diagonal member 602 with each other. The sub-reinforcement part 452 is arranged at such a position as to overlap the reinforcement part 402 when the sub-reinforcement part 452 is viewed in the longitudinal direction of the reinforcement part 402. Specifically, the sub-reinforcement part 452 extends from the second main member 52 to the nearest diagonal member 602 in a direction parallel to the longitudinal direction of the reinforcement part 402. More specifically, in the third embodiment, a central axis of the reinforcement part 402 and a central axis of the sub-reinforcement part 452 are substantially on the same straight line.

The sub-reinforcement part 453 has one end connected to the third member 53 and another end connected to the nearest diagonal member 603. The sub-reinforcement part 453 extends from the third member 53 to the nearest diagonal member 603 in a longitudinal direction thereof for connecting the third main member 53 and the nearest diagonal member 603 with each other. The sub-reinforcement part 453 is arranged at such a position as to overlap the reinforcement part 403 when the sub-reinforcement part 453 is viewed in the longitudinal direction (second specific direction) of the reinforcement part 403. Specifically, the sub-reinforcement part 453 extends from the third main member 53 to the nearest diagonal member 603 in a direction parallel to the longitudinal direction (second specific direction) of the reinforcement part 403. More specifically, in the third embodiment, a central axis of the reinforcement part 403 and a central axis of the sub-reinforcement part 453 are substantially on the same straight line.

The sub-reinforcement part 454 has one end connected to the fourth main member 54 and another end connected to the nearest diagonal member 604. The sub-reinforcement part 454 extends from the fourth main member 54 to the nearest diagonal member 604 in a longitudinal direction thereof for connecting the fourth main member 54 and the nearest diagonal member 604 with each other. The sub-reinforcement part 454 is arranged at such a position as to overlap the reinforcement part 404 when the sub-reinforcement part 454 is viewed in the longitudinal direction of the reinforcement part 404. Specifically, the sub-reinforcement part 454 extends from the fourth main member 54 to the nearest diagonal member 604 in a direction parallel to the longitudinal direction of the reinforcement part 404. More specifically, in the third embodiment, a central axis of the reinforcement part 404 and a central axis of the sub-reinforcement part 454 are substantially on the same straight line.

A way of connecting or joining the one end and the another end of each of the reinforcement parts 40 to the corresponding nearest diagonal member and main member, and a way of connecting or joining the one end and the another end of each of the sub-reinforcement parts 45 to the corresponding main member and nearest diagonal member are not particularly limited. For example, a joining way, such as welding, may be adoptable.

The lattice structure according to the third embodiment includes the plurality of sub-reinforcement parts 45 in addition to the plurality of reinforcement parts 40. Specifically, each of the reinforcement parts 40 and each of the sub-reinforcement parts 45 support the corresponding one of the nearest diagonal members 601 to 604 at the opposite positions thereacross. Therefore, the lattice structure according to the third embodiment more effectively suppresses deformation of each of the nearest diagonal members 601 to 604 than the lattice structure according to the first and second embodiments including no sub-reinforcement part 45, and thus has further improved stiffness.

In the third embodiment, the sub-reinforcement part 45 is arranged at such a position as to overlap the reinforcement part 40 when the sub-reinforcement part 45 is viewed in the longitudinal direction of the reinforcement part 40. In this configuration, a load is effectively transmitted from the reinforcement part 40 to the sub-reinforcement part 45, and a load is effectively transmitted from the sub-reinforcement part 45 to the reinforcement part 40 in a work performed by the working machine.

In the third embodiment, the sub-reinforcement part 451 extends from the first main member 51 to the nearest diagonal member 601 in a direction parallel to the longitudinal direction of the reinforcement part 401, and the sub-reinforcement part 453 extends from the third main member 53 to the nearest diagonal member 603 in a direction parallel to the longitudinal direction of the reinforcement part 403. In this configuration, the longitudinal direction of each of the sub-reinforcement parts 451, 453 approximates to a direction in which buckling deformation of the lattice structure may occur. Accordingly, the buckling strength is further effectively improved.

In the third embodiment, connecting the reinforcement part 40 and the sub-reinforcement part 45 to the corresponding one of the nearest diagonal members 601 to 604 that is the continuous member attains arrangement of the end of the nearest diagonal member nearer to the connector 75A than the sub-reinforcement part 45. This arrangement achieves a smaller gap between the end of the nearest diagonal member and the connector 75A (specifically, the pin insertion hole of the connector 75A). More specifically, in the sideview shown in FIG. 17, this arrangement can achieve, for example, a shorter distance G between an intersection of a central axis of the first main member 51 and a central axis of the first nearest diagonal member 601, and a center of the pin insertion hole of the connector 75A. Accordingly, in the third embodiment, an effect of the improved buckling strength is obtainable by the first reinforcement part 401 and the sub-reinforcement part 451 in the coupling unit composed of the pair of connectors 75A, 75B and therearound. Additionally, the aforementioned triangular configuration (lattice configuration) or a configuration similar to the lattice configuration in the coupling unit and therearound can exert an effect of suppressing lowering in the buckling strength.

In the third embodiment, each of the nearest diagonal members 601 to 604 that is the continuous member as described above can be made of a single member. A nearest diagonal member made of a single member can more smoothly transmit a load at the nearest diagonal member than a nearest diagonal member composed of a plurality of members connected to each other. This can further effectively improve the stiffness of the lattice structure.

A load acting on each of the reinforcement part 40 and the sub-reinforcement part 45 is highly likely to be smaller than a load acting on the nearest diagonal member to which these parts are connected in a work performed by the working machine. Hence, an outer diameter of each of the reinforcement part 40 and the sub-reinforcement part 45 can be made smaller than an outer diameter of the nearest diagonal member. In this case, weight reduction in the lattice structure is achievable. Furthermore, in this case, each of the reinforcement part 40 and the sub-reinforcement part 45 having the relatively small diameter is easily connectable to the nearest diagonal member having the relatively large diameter by using a connection or joining way, e.g., welding.

Modification

Figure 18:
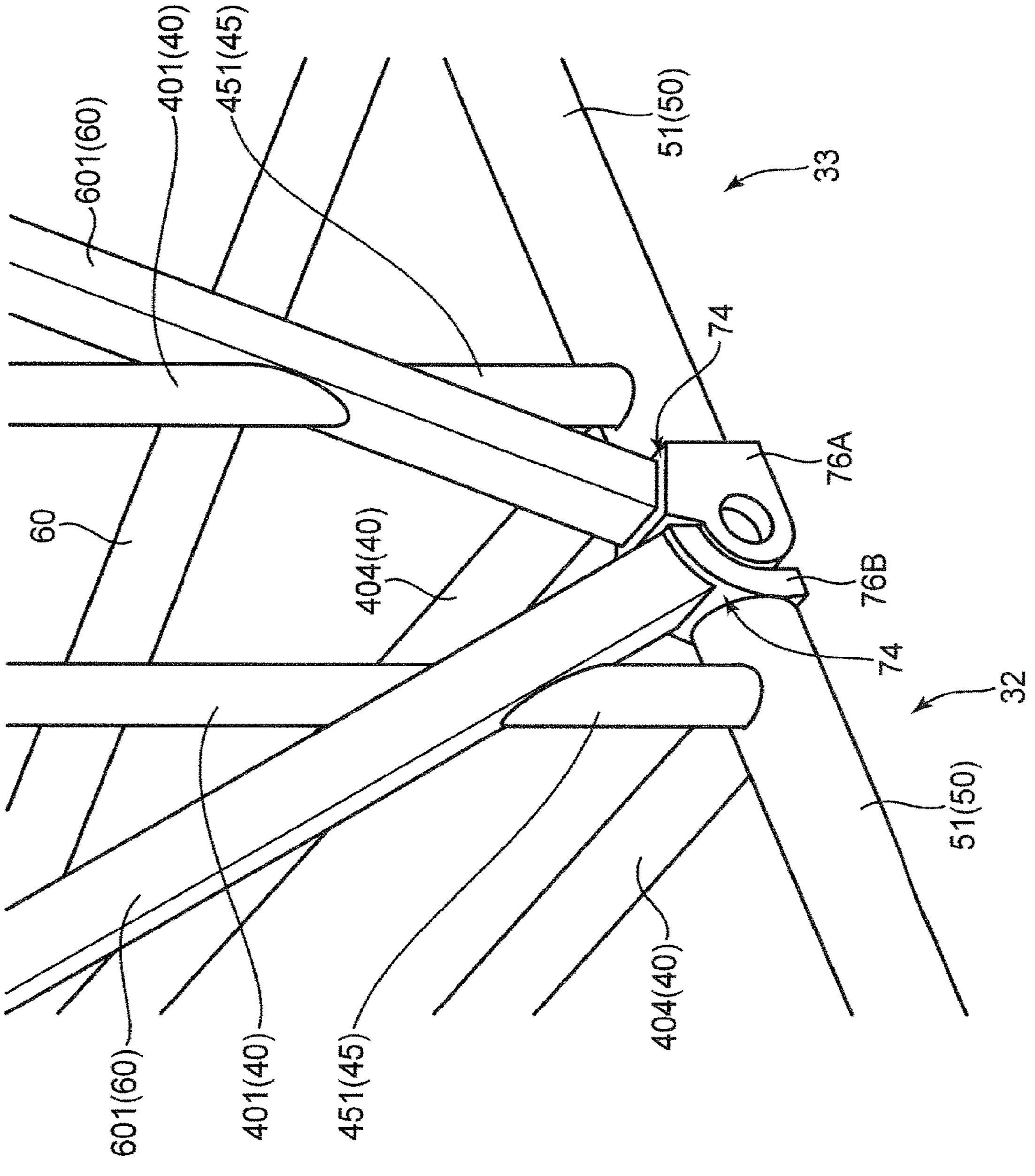
FIG. 18 is a perspective view of a portion of a lattice structure according to a modification of the third embodiment.

FIG. 18 is a perspective view of a portion of each of lattice structures 32, 33 according to a modification of the third embodiment. In the modification of the third embodiment shown in FIG. 18, the lattice structure 32 includes a nearest diagonal member 601 having one end which is not connected to a first main member 51, but is connected to a diagonal member joint 74 of a connector 76B joined to an end of a first main member 51. Similarly, a lattice structure 33 includes a nearest diagonal member 601 having one end which is not connected to a first main member 51, but is connected to a diagonal member joint 74 of a connector 76A joined to an end of the first main member 51. The modification shown in FIG. 18 differs from the lattice structure 32 (33) shown in FIG. 14 to FIG. 17 in this respect, but the remaining configurations of the modification are equivalent to those of the lattice structure 32 (33) shown in FIGS. 14 to 17.

In this modification, the one end of each of the two nearest diagonal members 601, 601 is connected to corresponding one of the connector 76A and the connector 76B. Accordingly, each of the nearest diagonal members 601, 601 can contribute to an ideal lattice configuration in a coupling unit for coupling the lattice structures 32, 33 to each other. This configuration can further effectively suppress lowering in the stiffness of each of the lattice structures 32, 33 in the coupling unit and therearound.

Lattice Structure According to Fourth Embodiment

Figure 19:
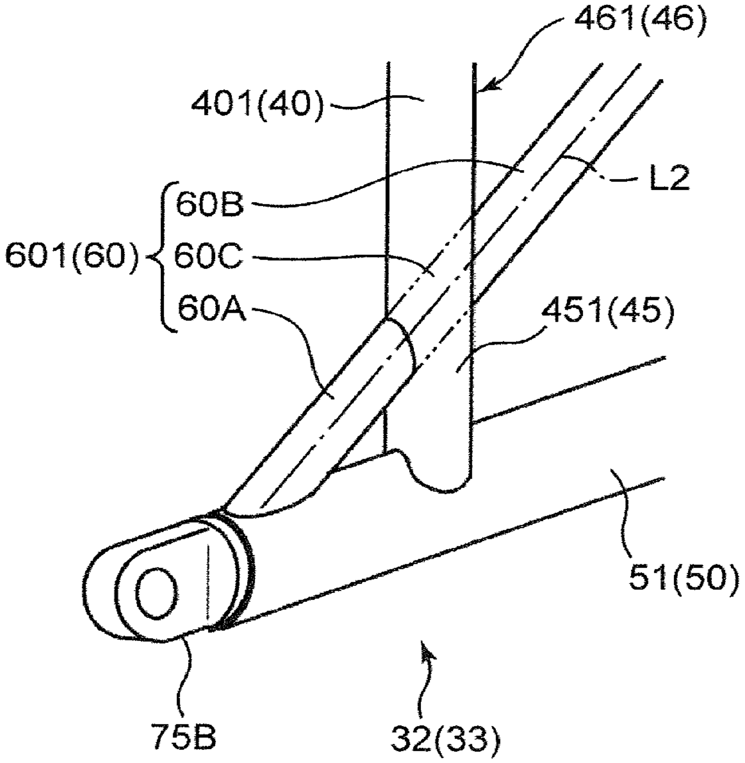
FIG. 19 is a perspective view of a portion of a lattice structure according to a fourth embodiment.
Figure 20:
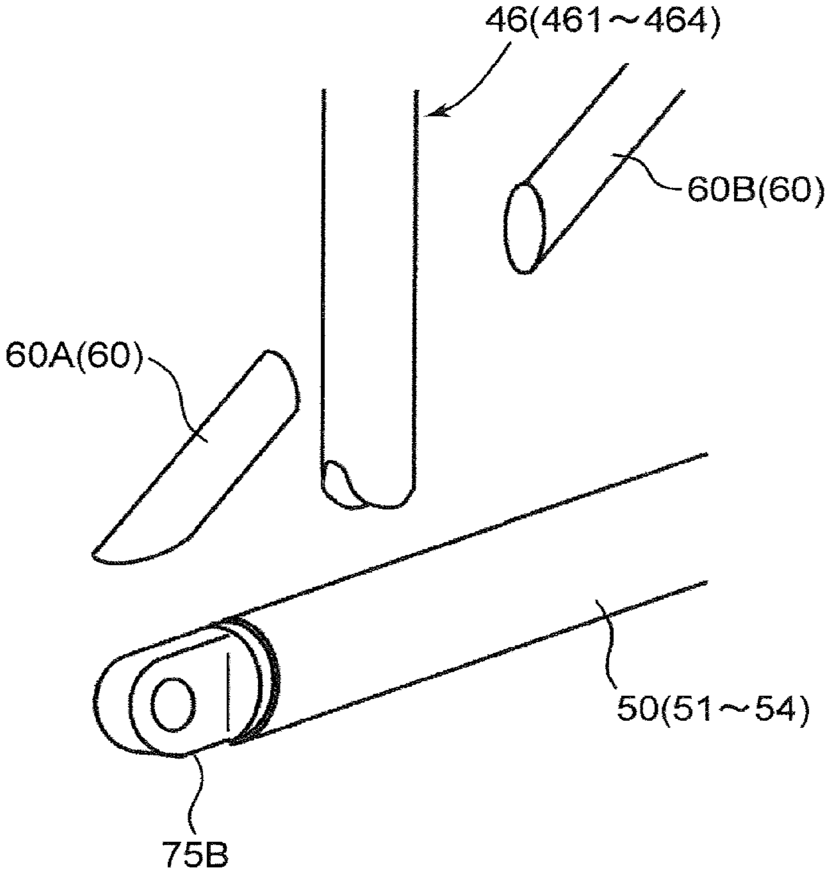
FIG. 20 is a perspective view showing components for use in manufacturing the lattice structure according to the fourth embodiment.

FIG. 19 is a perspective view of a main portion of a lattice structure according to a fourth embodiment. FIG. 20 is a perspective view showing components for use in manufacturing the lattice structure according to the fourth embodiment. A region occupied by the main portion shown in FIG. 19 in the lattice structure according to the fourth embodiment corresponds to the portion in the framed box XVI in FIG. 14.

The lattice structure according to the fourth embodiment includes four main members 51 to 54, a plurality of connectors 75A, 75B, a plurality of diagonal members 60, a plurality of reinforcement parts 40, and a plurality of sub-reinforcement parts 45. As shown in FIG. 19, the first main member 51 has one end to which the male connector 75B is connected and another end to which the female connector 75A (not shown) is connected.

A basic configuration of the lattice structure according to the fourth embodiment shown in FIG. 19 is similar to that of the lattice structure 32 (33) according to the third embodiment shown in FIG. 14 to FIG. 17. Hereinafter, the differences between the fourth embodiment and the third embodiment will be mainly described.

Reinforcement Part and Sub-Reinforcement Part

In the fourth embodiment, the reinforcement parts 40 include a reinforcement part 401, a reinforcement part 402, a reinforcement part 403, and a reinforcement part 404. Further, the sub-reinforcement parts 45 include a sub-reinforcement part 451, a sub-reinforcement part 452, a sub-reinforcement part 453, and a sub-reinforcement part 454. The reinforcement parts 401 to 404 and the sub-reinforcement parts 451 to 454 in the lattice structure according to the fourth embodiment are provided in substantially the same portions as the portions where the reinforcement parts 401 to 404 and the sub-reinforcement parts 451 to 454 in the lattice structure according to the third embodiment shown in FIG. 14 are provided.

In the fourth embodiment, each of the reinforcement parts 40 constitutes a portion of a corresponding continuous member 46 to be described below, and each of the sub-reinforcement parts 45 constitutes another portion of the continuous member 46. More details will be described below.

The lattice structure 32 (33) according to the fourth embodiment shown in FIG. 19 includes a plurality of continuous members 46. The continuous members 46 include a first continuous member 461, a second continuous member 462, a third continuous member 463, and a fourth continuous member 464. The continuous members 461 to 464 are respectively provided near one end of the lattice structure in a longitudinal direction thereof and near another end of the lattice structure in the longitudinal direction thereof.

In the fourth embodiment, each of the continuous members 46 is a linearly extending single pipe as shown in FIG. 20, but may be a linearly extending solid member. The continuous member 46 may be a linearly extending plate-like member, or a linearly extending shaped steel member, such as an H-steel member and a channel steel member.

The first continuous member 461 is located in a portion corresponding to the portion where the reinforcement part 401 and the sub-reinforcement part 451 in the third embodiment shown in FIG. 14 to FIG. 17 are located. The second continuous member 462 (not shown) is located in a portion corresponding to the portion where the reinforcement part 402 and the sub-reinforcement part 452 in the third embodiment are located. The third continuous member 463 (not shown) is located in a portion corresponding to the portion where the reinforcement part 403 and the sub-reinforcement part 453 in the third embodiment are located. The fourth continuous member 464 (not shown) is located in a portion corresponding to the portion where the reinforcement part 404 and the sub-reinforcement part 454 in the third embodiment are located. More details will be described below.

As shown in FIG. 19 and FIG. 20, the first continuous member 461 linearly and continuously extends from the first main member 51 to the second main member 52 in a longitudinal direction (first specific direction) of the first continuous member, and is made of a single member. The second continuous member 462 linearly and continuously extends from the second main member 52 to the third main member 53 in a longitudinal direction of the second continuous member, and is made of a single member. The third continuous member 463 linearly and continuously extends from the third main member 53 to the fourth main member 54 in a longitudinal direction (second specific direction) of the third continuous member, and is made of a single member. The fourth continuous member 464 linearly and continuously extends from the fourth main member 54 to the first main member 51 in a longitudinal direction of the fourth continuous member, and is made of a single member.

As shown in FIG. 19, the continuous member 461 includes the reinforcement part 401, the sub-reinforcement part 451, and an intermediate section 60C located therebetween. In the continuous member 461, the reinforcement part 401, the intermediate section 60C, and the sub-reinforcement part 451 are arranged in this order in the longitudinal direction of the continuous member 461.

The reinforcement part 401 constitutes a portion of the continuous member 461, the portion including an end of the continuous member 461 that is connected to the second main member 52. Specifically, the reinforcement part 401 extends, in the continuous member 461, from the intermediate section 60C to the second main member 52.

The sub-reinforcement part 451 constitutes another portion of the continuous member 461, the another portion including another end of the continuous member 461 that is connected to the first main member 51. Specifically, the sub-reinforcement part 451 extends, in the continuous member 461, from the first main member 51 to the intermediate section 60C.

Although unillustrated, each of the continuous members 462 to 464 has the same configuration as the continuous member 461. Specifically, the reinforcement part 402 constitutes a portion of the continuous member 462, the portion including an end of the continuous member 462 that is connected to the third main member 53. More specifically, the reinforcement part 402 extends, in the continuous member 462, from an intermediate section 60C to the third main member 53. The sub-reinforcement part 452 constitutes another portion of the continuous member 462, the another portion including another end of the continuous member 462 that is connected to the second main member 52. Specifically, the sub-reinforcement part 452 extends, in the continuous member 462, from the second main member 52 to the intermediate section 60C.

The reinforcement part 403 constitutes a portion of the continuous member 463, the portion including an end of the continuous member 463 that is connected to the fourth main member 54. Specifically, the reinforcement part 403 extends, in the continuous member 463, from an intermediate section 60C to the fourth main member 54. The sub-reinforcement part 453 constitutes another portion of the continuous member 463, the another portion including another end of the continuous member 463 that is connected to the third main member 53. Specifically, the sub-reinforcement part 453 extends, in the continuous member 463, from the third main member 53 to the intermediate section 60C.

The reinforcement part 404 constitutes a portion of the continuous member 464, the portion including an end of the continuous member 464 that is connected to the first main member 51. Specifically, the reinforcement part 404 extends, in the continuous member 464, from an intermediate section 60C to the first main member 51. The sub-reinforcement part 454 constitutes another portion of the continuous member 464, the another portion including another end of the continuous member 464 that is connected to the fourth main member 54. Specifically, the sub-reinforcement part 454 extends, in the continuous member 464, from the fourth main member 54 to the intermediate section 60C.

Nearest Diagonal Member

The diagonal members 60 in the lattice structure according to the fourth embodiment include a plurality of nearest diagonal members 601 to 604 respectively located in portions similar to those in the third embodiment.

In the fourth embodiment, each of the nearest diagonal members 601 to 604 includes: the intermediate section 60C included in the continuous member 46; a first member 60A connected to the intermediate section 60C and extending from the intermediate section 60C to a certain main member 50; and a second member 603 connected to the intermediate section 60C and extending from the intermediate section GOC to another main member 50 adjacent to the certain main member 50. Hereinafter, more details will be described.

The nearest diagonal member 601 is arranged so that one end of the nearest diagonal member 601 is connected to the first main member 51 and another end of the nearest diagonal member 601 is connected to the second main member 52. In this way, the nearest diagonal member 601 connects the first main member 51 and the second main member 52 with each other. As shown in FIG. 19, the nearest diagonal member 601 includes: an intermediate section 60C (located between the reinforcement part 401 and the sub-reinforcement part 451) included in the continuous member 461; a first member 60A connected to the intermediate section 60C and extending from the intermediate section 60C to the first main member 51; and a second member 60B connected to the intermediate section 60C and extending from the intermediate section 60C to the second main member 52.

Although unillustrated, each of the nearest diagonal member 602 to 604 has the same configuration as the nearest diagonal member 601.

Specifically, the nearest diagonal member 602 is arranged so that one end of the nearest diagonal member 602 is connected to the second main member 52 and another end of the nearest diagonal member 602 is connected to the third main member 53. In this way, the nearest diagonal member 602 connects the second main member 52 and the third main member 53 with each other. The nearest diagonal member 602 includes: an intermediate section 60C (located between the reinforcement part 402 and the sub-reinforcement part 452) included in the continuous member 462; a first member 60A connected to the intermediate section 60C and extending from the intermediate section 60C to the second main member 52; and a second member 60B connected to the intermediate section 60C and extending from the intermediate section 60C to the third main member 53.

The nearest diagonal member 603 is arranged so that one end of the nearest diagonal member 603 is connected to the third main member 53 and another end of the nearest diagonal member 603 is connected to the fourth main member 54. In this way, the nearest diagonal member 603 connects the third main member 53 and the fourth main member 54 with each other. The nearest diagonal member 603 includes: an intermediate section 60C (located between the reinforcement part 403 and the sub-reinforcement part 453) included in the continuous member 463; a first member 60A connected to the intermediate section 60C and extending from the intermediate section 60C to the third main member 53; and a second member 60B connected to the intermediate section 60C and extending from the intermediate section 60C to the fourth main member 54.

The nearest diagonal member 604 is arranged so that one end of the nearest diagonal member 604 is connected to the fourth main member 54 and another end of the nearest diagonal member 604 is connected to the first main member 51. In this way, the nearest diagonal member 604 connects the fourth main member 54 and the first main member 51 with each other. The nearest diagonal member 604 includes: an intermediate section 60C (located between the reinforcement part 404 and the sub-reinforcement part 454) included in the continuous member 464; a first member 60A connected to the intermediate section 60C and extending from the intermediate section 60C to the fourth main member 54; and a second member 60B connected to the intermediate section 60C and extending from the intermediate section 60C to the first main member 51.

The one end of each of the nearest diagonal members 601 to 604 (one end of the first member 60A) is connected to the corresponding main member 50 at a position in a portion of the main member 50 that is adjacent to the connector 75B, for example as shown in FIG. 19. However, the one end of each of the nearest diagonal members 601 to 604 (one end of the first member 60A) may be connected to the connector 75B in place of the main member 50.

In the fourth embodiment shown in FIGS. 19 and 20, each of the first member 60A and the second member 60B is a cylindrical member (cylindrical pipe). At least one of the first member 60A and the second member 60B may be, for example, a plate-like member, a member having a prism-shape, or a shaped steel member, such as an H-steel member and a channel steel member. Alternatively, at least one of the first member 60A and the second member 60B may be a solid member instead of a pipe.

For instance, in a case where the first member 60A is a H-steel member or a channel steel member, the first member 60A is preferably arranged in such a posture as to allow an unillustrated opening formed in the H-steel member or the channel steel member to face the sub-reinforcement part 451 in FIG. 19. A narrow region between the one end of the first member 60A to be welded to the first main member 51 and the sub-reinforcement part 451 may make it difficult to perform a welding operation of connecting a portion of the one end of the first member 60A that is closer to the sub-reinforcement part 451 to the first main member 51, the portion of the one end of the first member 60A being opposite to another portion thereof that is closer to the connector 75B. In this case, a shaped steel member having the aforementioned opening is adoptable as the first member 60A, and the shaped steel member is arranged in such a posture as to allow the opening to face the sub-reinforcement part 451. This configuration can more effectively aim at a decrease in workloads required for the welding operation and at weight reduction than a configuration adopting, as the first member 60A, a member having a cylindrical shape with a closed section.

As described above, in the fourth embodiment, the reinforcement part 40 constitutes a portion of the continuous member 46, and the sub-reinforcement part 45 constitutes another portion of the continuous member 46. Further, each of the nearest diagonal members 601 to 604 includes the inter mediate section 60C included in the continuous member 46, and the first member 60A and the second member 60B each connected to the intermediate section. Therefore, for instance, as shown in FIG. 19, the end of the first nearest diagonal member 601 is arrangeable to be nearer to the connector 75B than the sub-reinforcement part 451. This arrangement achieves a smaller gap between the end of the nearest diagonal member 601 and the connector 75B (specifically, a pin insertion hole of the connector 75B). Accordingly, in the fourth embodiment, an effect of the improved buckling strength is obtainable by the reinforcement part 40 and the sub-reinforcement part 45 in the coupling unit and therearound. Additionally, the aforementioned triangular configuration (lattice configuration) or a configuration similar to the lattice configuration in the coupling unit and therearound can exert an effect of suppressing lowering in the buckling strength.

Moreover, in the fourth embodiment, adoption of the configuration including the first member 60A and the second member 60B each connected to the intermediate section 60C of the continuous member 46 succeeds in forming the continuous member 46 including the reinforcement part 40 and the sub-reinforcement part 45 by a single member. A continuous member 46 made of a single member can more effectively suppress a decrease in a dimensional accuracy of the continuous member 46 in the longitudinal direction thereof than a continuous member 46 composed of a plurality of members connected to each other. For instance, this configuration can easily ensure accuracy of a distance between the connector 75B connected to the first main member 51 and the connector 75B connected to the second main member 52, specifically, accuracy of a distance between pin insertion holes of the connectors 75B, 75B.

In the fourth embodiment, the first member 60A is arranged at such a position as to overlap the second member 60B when the first member 60A is viewed in a longitudinal direction of the second member 60B. In this configuration, a load is effectively transmitted from the first member 60A to the second member 60B, and a load is effectively transmitted from the second member 60B to the first member 60A in a work performed by the working machine.

Specifically, a longitudinal direction of the first member 60A is parallel to the longitudinal direction of the second member 60B. In this configuration, a load is further effectively transmitted from the first member 60A to the second member 60B, and a load is further effectively transmitted from the second member 60B to the first member 60A in a work performed by the working machine. More specifically, in the fourth embodiment, a central axis of the first member 60A and a central axis of the second member 60B are substantially on the same straight line L2, as shown in FIG. 19.

First Modification

Figure 21:
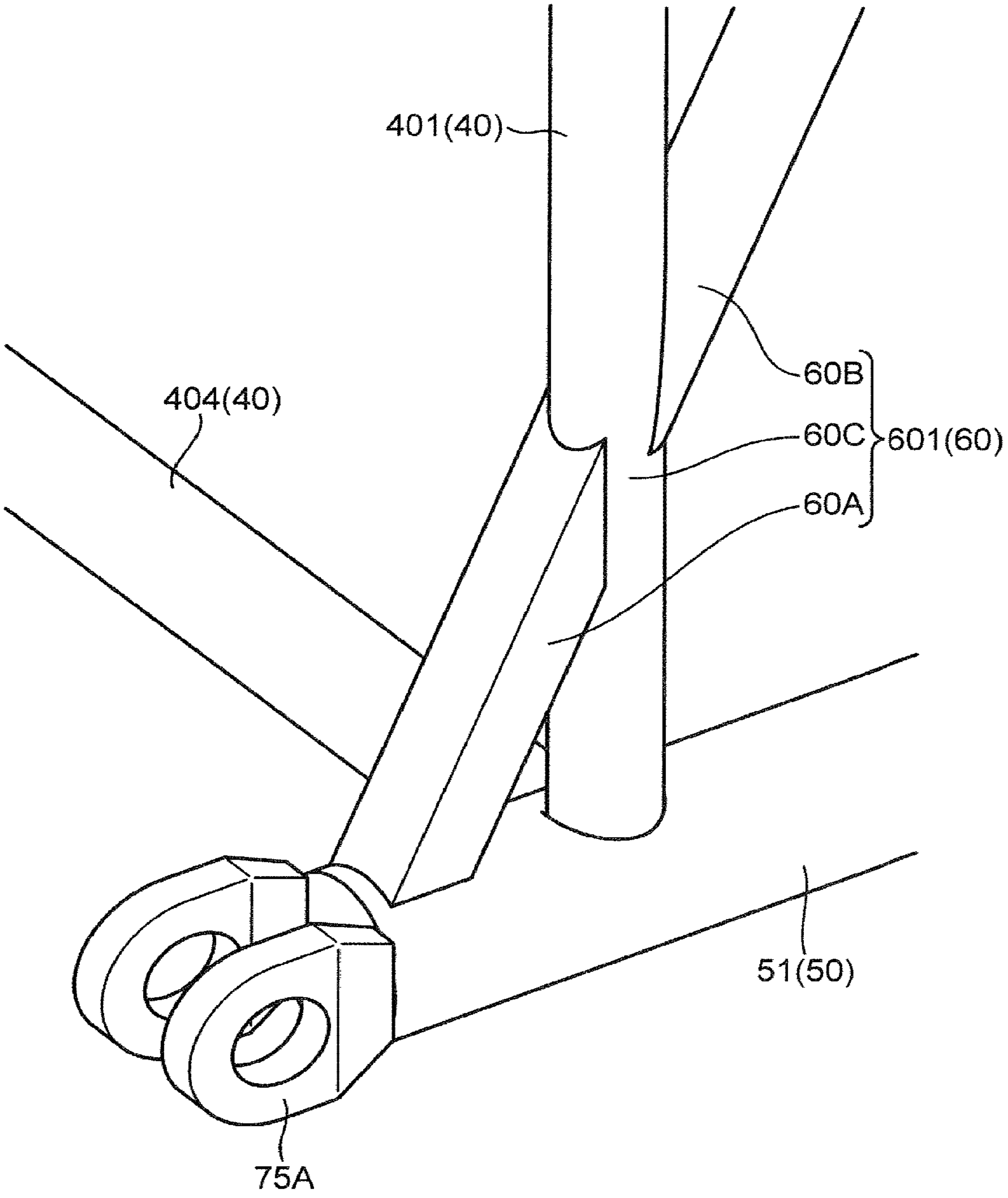
FIG. 21 is a perspective view of a portion of a lattice structure according to a first modification of the fourth embodiment.

FIG. 21 is a perspective view of a portion of a lattice structure according to a first modification of the fourth embodiment. In the first modification, as shown in FIG. 21, a nearest diagonal member 601 includes a first member 60A which is a member having a prism-shape and a second member 60B which is a cylindrical pipe. The remaining configurations in the first modification are equivalent to those in the fourth embodiment shown in FIG. 19 and FIG. 20.

Second Modification

Figure 22:
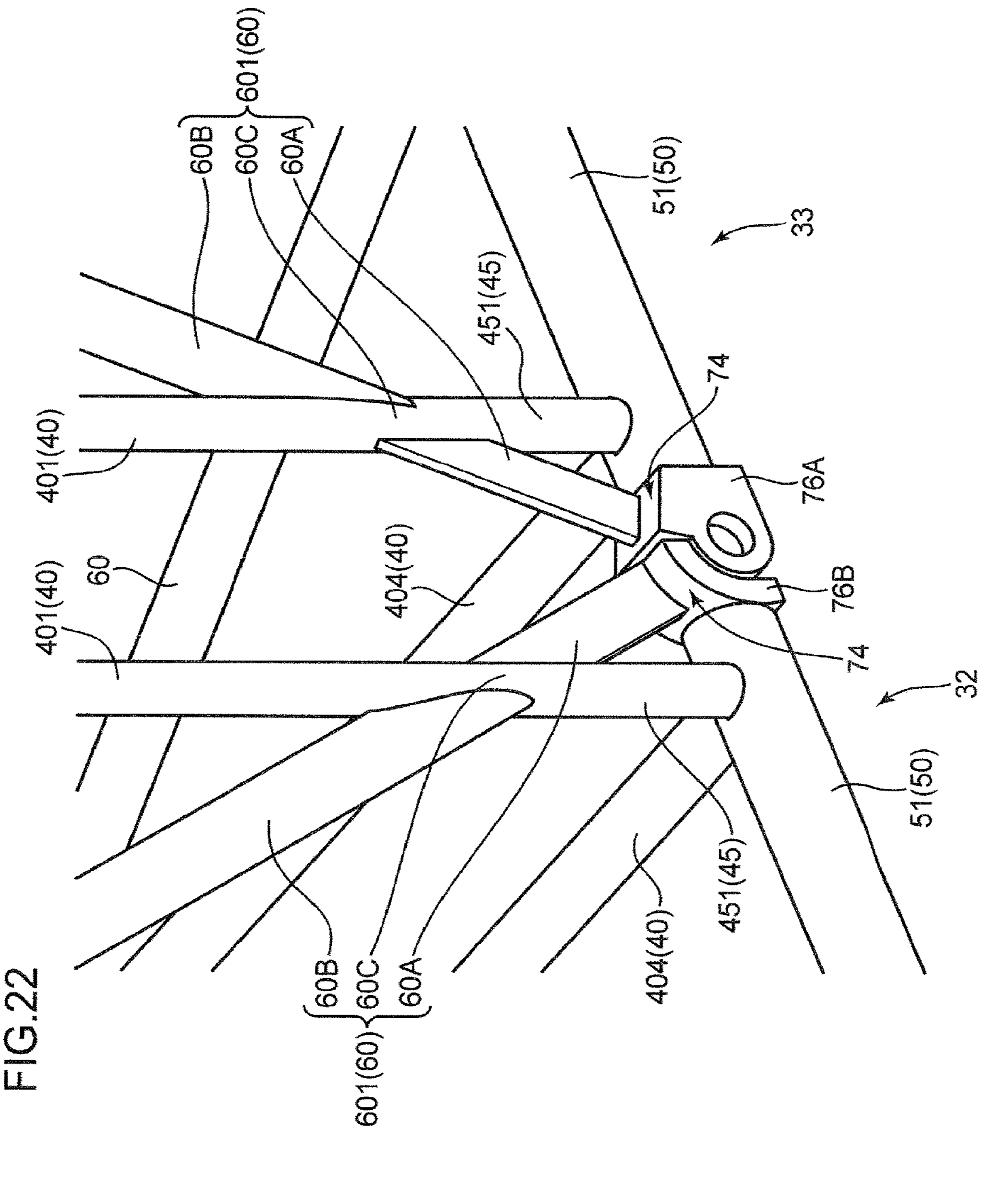
FIG. 22 is a perspective view of a portion of a lattice structure according to a second modification of the fourth embodiment.

FIG. 22 is a perspective view of a portion of a lattice structure according to a second modification of the fourth embodiment. In the second modification shown in FIG. 22, a lattice structure 32 includes a nearest diagonal member 601 having one end which is not connected to a first main member 51, but is connected to a diagonal member joint 74 of a connector 76B joined to an end of the first main member 51. Similarly, a lattice structure 33 includes a nearest diagonal member 601 having one end which is not connected to a first main member 51, but is connected to a diagonal member joint 74 of a connector 76A joined to an end of the first main member 51. The one end of each of the two nearest diagonal members 601, 601 is connected to corresponding one of the connector 76A and the connector 76B. Accordingly, each of the nearest diagonal members 601, 601 can contribute to an ideal lattice configuration in a coupling unit for coupling the lattice structures 32, 33 to each other. This configuration can effectively suppress lowering in the stiffness of each of the lattice structures 32, 33 in the coupling unit and therearound.

In the second modification, the nearest diagonal member 601 includes a first member 60A which is a plate-like member and a second member 60B which is a cylindrical pipe. The remaining configurations in the second modification are equivalent to those in the fourth embodiment shown in FIG. 19 and FIG. 20.

Lattice Structure According to Fifth Embodiment

Figure 23:
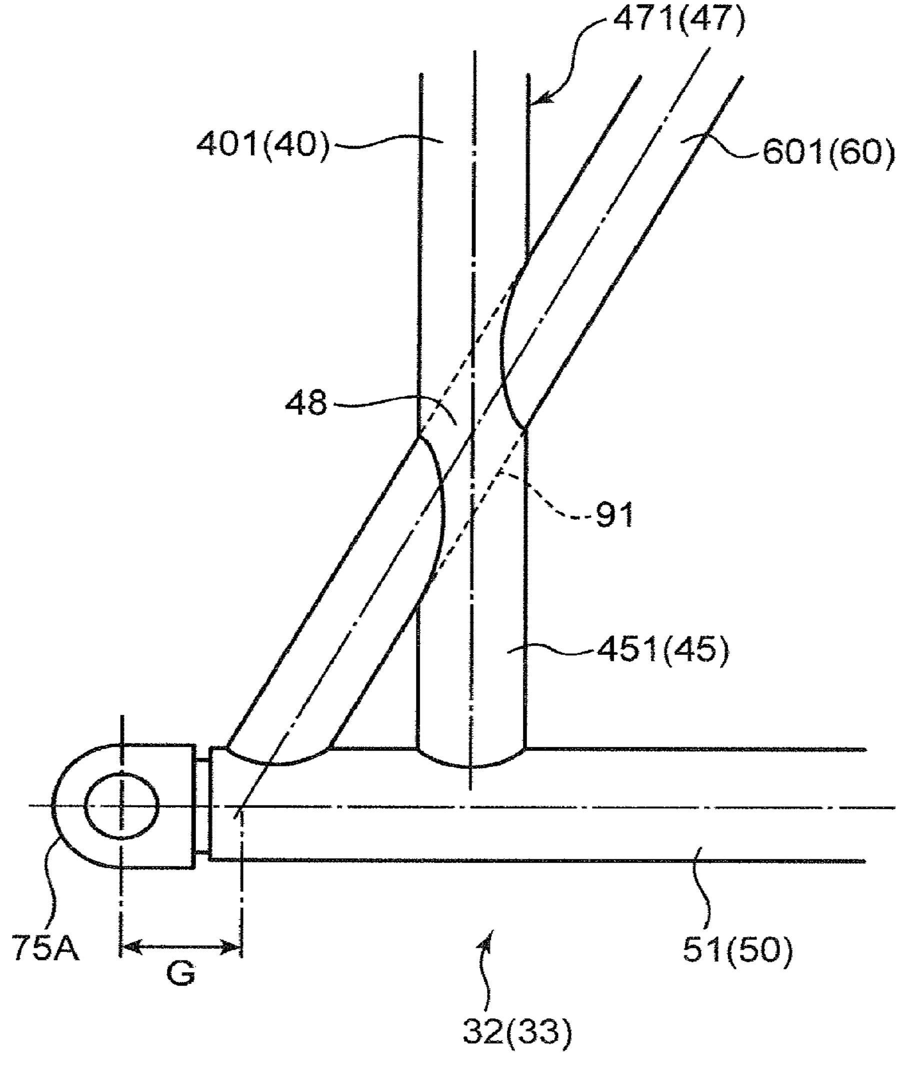
FIG. 23 is a sideview of a portion of a lattice structure according to a fifth embodiment.
Figure 24:
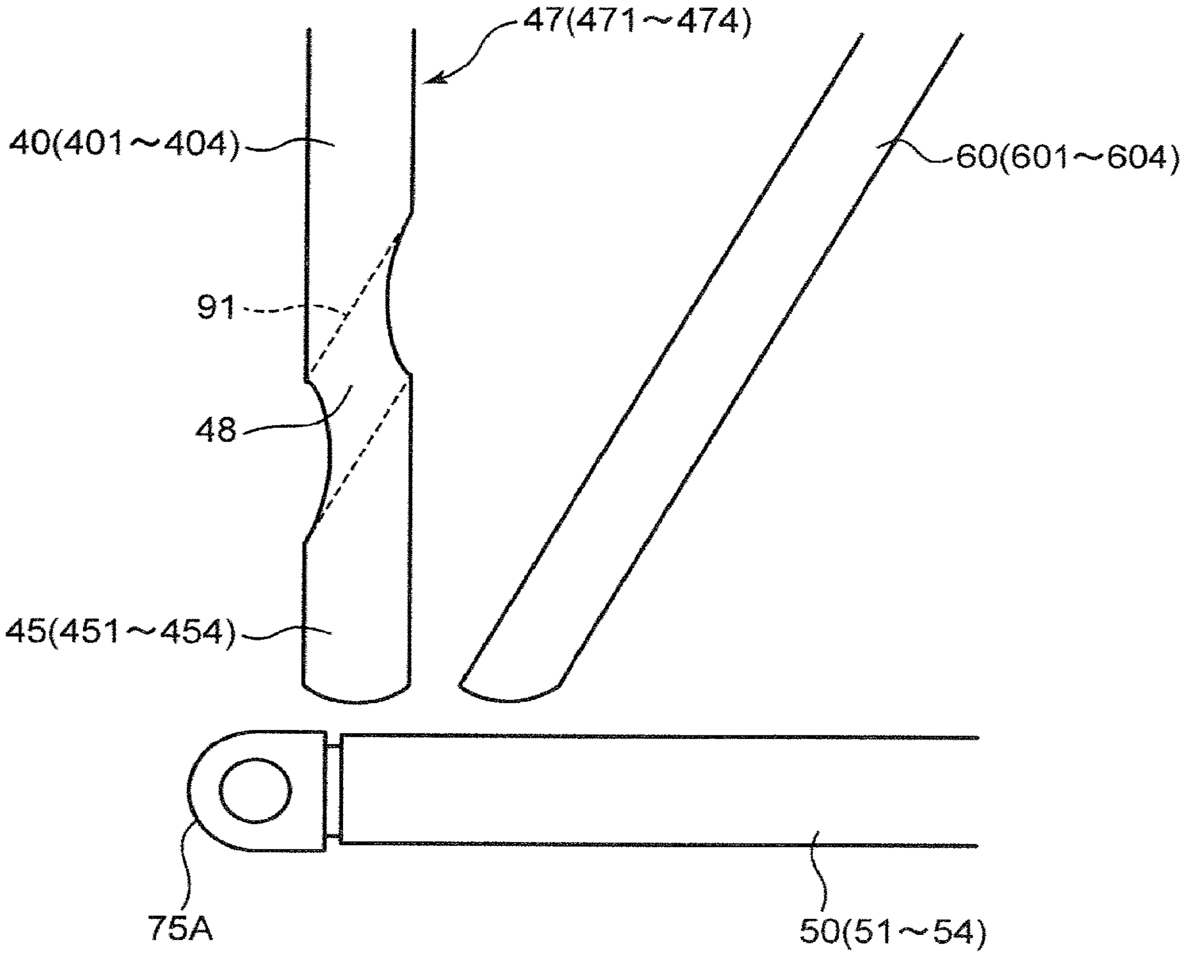
FIG. 24 is a sideview showing components for use in manufacturing the lattice structure according to the fifth embodiment.

FIG. 23 is a sideview of a main portion of a lattice structure according to a fifth embodiment. FIG. 24 is a sideview showing components for use in manufacturing the lattice structure according to the fifth embodiment. A region occupied by the main portion shown in FIG. 23 in the lattice structure according to the fifth embodiment corresponds to the portion in the framed box XVI in FIG. 14.

The lattice structure according to the fifth embodiment includes four main members 51 to 54, a plurality of connectors 75A, 75B, a plurality of diagonal members 60, a plurality of reinforcement parts 40, and a plurality of sub-reinforcement parts 45. As shown in FIG. 23, the first main member 51 has one end to which the female connector 75A is connected and another end to which the male connector 75B (not shown) is connected.

A basic configuration of the lattice structure according to the fifth embodiment shown in FIG. 23 is similar to that of the lattice structure 32 (33) according to the third embodiment shown in FIG. 14 to FIG. 17. Hereinafter, the differences between the fifth embodiment and the third embodiment will be mainly described.

Nearest Diagonal Member

The diagonal members 60 in the lattice structure according to the fifth embodiment include a plurality of nearest diagonal members 601 to 604 respectively located in portions similar to those in the third embodiment.

In the fifth embodiment, each of the nearest diagonal members 601 to 604 is a continuous member linearly and continuously extending from one of two adjacent main members to the other of the main members. Specifically, each of the nearest diagonal members 601 to 604 is made of a single member from one of two adjacent main members to the other of the main members. Each of the nearest diagonal members 601 to 604 is a linearly extending single pipe, but may be a linearly extending solid member. The continuous member 46 may be a linearly extending plate-like member, or a linearly extending shaped steel member, such as an H-steel member and a channel steel member. Hereinafter, more details will be described.

The nearest diagonal member 601 is arranged so that one end of the nearest diagonal member 601 is connected to the first main member 51 and another end of the nearest diagonal member 601 is connected to the second main member 52. In this way, the nearest diagonal member 601 connects the first main member 51 and the second main member 52 with each other. The nearest diagonal member 601 is a continuous member made of a single member linearly and continuously extending from the first main member 51 to the second main member 52.

Although unillustrated, each of the nearest diagonal member 602 to 604 has the same configuration as the nearest diagonal member 601.

Specifically, the nearest diagonal member 602 is arranged so that one end of the nearest diagonal member 602 is connected to the second main member 52 and another end of the nearest diagonal member 602 is connected to the third main member 53. In this way, the nearest diagonal member 602 connects the second main member 52 and the third main member 53 with each other. The nearest diagonal member 602 is a continuous member made of a single member linearly and continuously extending from the second main member 52 to the third main member 53.

The nearest diagonal member 603 is arranged so that one end of the nearest diagonal member 603 is connected to the third main member 53 and another end of the nearest diagonal member 603 is connected to the fourth main member 54. In this way, the nearest diagonal member 603 connects the third main member 53 and the fourth main member 54 with each other. The nearest diagonal member 603 is a continuous member made of a single member linearly and continuously extending from the third main member 53 to the fourth main member 54.

The nearest diagonal member 604 is arranged so that one end of the nearest diagonal member 604 is connected to the fourth main member 54 and another end of the nearest diagonal member 604 is connected to the first main member 51. In this way, the nearest diagonal member 604 connects the fourth main member 54 and the first main member 51 with each other. The nearest diagonal member 604 is a continuous member made of a single member linearly and continuously extending from the fourth main member 54 to the first main member 51.

Reinforcement Part and Sub-Reinforcement Part

In the fifth embodiment, the reinforcement parts 40 include a reinforcement part 401, a reinforcement part 402, a reinforcement part 403, and a reinforcement part 404. Further, the sub-reinforcement parts 45 include a sub-reinforcement part 451, a sub-reinforcement part 452, a sub-reinforcement part 453, and a sub-reinforcement part 454. The reinforcement parts 401 to 404 and the sub-reinforcement parts 451 to 454 in the lattice structure according to the fifth embodiment are provided in substantially the same portions as the portions where the reinforcement parts 401 to 404 and the sub-reinforcement parts 451 to 454 in the lattice structure according to the third embodiment shown in FIG. 14 are provided.

In the fifth embodiment, each of the reinforcement parts 40 constitutes a portion of a corresponding reinforcement continuous member 47 to be described below, and each of the sub-reinforcement parts 45 constitutes another portion of the reinforcement continuous member 47. More details will be described below.

A lattice structure 32 (33) according to the fifth embodiment shown in FIG. 23 includes a plurality of reinforcement continuous members 47. The reinforcement continuous members 47 include a reinforcement continuous member 471, a reinforcement continuous member 472, a reinforcement continuous member 473, and a reinforcement continuous member 474. The reinforcement continuous members 471 to 474 are respectively provided near one end of the lattice structure in a longitudinal direction thereof and near another end of the lattice structure in the longitudinal direction thereof.

In the fifth embodiment, each of the reinforcement continuous members 47 is a linearly extending single pipe as shown in FIG. 24, but may be a linearly extending solid member. The reinforcement continuous member 47 may be a linearly extending plate-like member, or a linearly extending shaped steel member, such as an H-steel member and a channel steel member.

As shown in FIG. 23 and FIG. 24, the reinforcement continuous member 471 linearly and continuously extends from the first main member 51 to the second main member 52 in a longitudinal direction (first specific direction) of the reinforcement continuous member, and is made of a single member. The reinforcement continuous member 472 linearly and continuously extends from the second main member 52 to the third main member 53 in a longitudinal direction of the reinforcement continuous member, and is made of a single member. The reinforcement continuous member 473 linearly and continuously extends from the third main member 53 to the fourth main member 54 in a longitudinal direction (second specific direction) of the reinforcement continuous member, and is made of a single member. The reinforcement continuous member 474 linearly and continuously extends from the fourth main member 54 to the first main member 51 in a longitudinal direction of the reinforcement continuous member, and is made of a single member. The longitudinal direction of the reinforcement continuous member 47 is perpendicular to the longitudinal direction of the lattice structure.

As shown in FIG. 23, the reinforcement continuous member 471 includes the reinforcement part 401, the sub-reinforcement part 451, and an intermediate section 48 located therebetween. In the reinforcement continuous member 471, the reinforcement part 401, the intermediate section 48, and the sub-reinforcement part 451 are located in this order in the longitudinal direction of the reinforcement continuous member 471. The reinforcement continuous member 471 has a through hole 91 penetrating the reinforcement continuous member 471 in a direction intersecting the longitudinal direction of the reinforcement continuous member 471. The direction intersecting in the aforementioned manner corresponds to the longitudinal direction of the nearest diagonal member 601. The through hole 91 is formed in the intermediate section 48. The reinforcement part 401 constitutes a portion of the reinforcement continuous member 471, the portion of the reinforcement continuous member 471 extending from the nearest diagonal member 601 to the second main member 52. The sub-reinforcement part 451 constitutes another portion of the reinforcement continuous member 471, the another portion of the reinforcement continuous member 471 extending from the first main member 51 to the nearest diagonal member 601. Each of the reinforcement continuous members 472 to 474 has the same configuration as the reinforcement continuous member 471.

The reinforcement continuous member 472 includes the reinforcement part 402, the sub-reinforcement part 452, and an intermediate section 48 located therebetween. In the reinforcement continuous member 472, the reinforcement part 402, the intermediate section 48, and the sub-reinforcement part 452 are located in this order in the longitudinal direction of the reinforcement continuous member 472. The reinforcement continuous member 472 has a through hole 91 penetrating the reinforcement continuous member 472 in a direction intersecting the longitudinal direction of the reinforcement continuous member 472. The direction intersecting in the aforementioned manner corresponds to the longitudinal direction of the nearest diagonal member 602. The through hole 91 is formed in the inteiinediate section 48. The reinforcement part 402 constitutes a portion of the reinforcement continuous member 472, the portion of the reinforcement continuous member 472 extending from the nearest diagonal member 602 to the third main member 53. The sub-reinforcement part 452 constitutes another portion of the reinforcement continuous member 472, the another portion of the reinforcement continuous member 472 extending from the second main member 52 to the nearest diagonal member 602.

The reinforcement continuous member 473 includes the reinforcement part 403, the sub-reinforcement part 453, and an intermediate section 48 located therebetween. In the reinforcement continuous member 473, the reinforcement part 403, the intermediate section 48, and the sub-reinforcement part 453 are located in this order in the longitudinal direction of the reinforcement continuous member 473. The reinforcement continuous member 473 has a through hole 91 penetrating the reinforcement continuous member 473 in a direction intersecting the longitudinal direction of the reinforcement continuous member 473. The direction intersecting in the aforementioned manner corresponds to the longitudinal direction of the nearest diagonal member 603. The through hole 91 is formed in the intermediate section 48. The reinforcement part 403 constitutes a portion of the reinforcement continuous member 473, the portion of the reinforcement continuous member 473 extending from the nearest diagonal member 603 to the fourth main member 54. The sub-reinforcement part 453 constitutes another portion of the reinforcement continuous member 473, the another portion of the reinforcement continuous member 473 extending from the third main member 53 to the nearest diagonal member 603.

The reinforcement continuous member 474 includes the reinforcement part 404, the sub-reinforcement part 454, and an intermediate section 48 located therebetween. In the reinforcement continuous member 474, the reinforcement part 404, the intermediate section 48, and the sub-reinforcement part 454 are located in this order in the longitudinal direction of the reinforcement continuous member 474. The reinforcement continuous member 474 has a through hole 91 penetrating the reinforcement continuous member 474 in a direction intersecting the longitudinal direction of the reinforcement continuous member 474. The direction intersecting in the aforementioned manner corresponds to the longitudinal direction of the nearest diagonal member 604. The through hole 91 is formed in the intermediate section 48. The reinforcement part 404 constitutes a portion of the reinforcement continuous member 474, the portion of the reinforcement continuous member 474 extending from the nearest diagonal member 604 to the first main member 51. The sub-reinforcement part 454 constitutes another portion of the reinforcement continuous member 474, the another portion of the reinforcement continuous member 474 extending from the fourth main member 54 to the nearest diagonal member 604.

As shown in FIG. 23 and FIG. 24, the nearest diagonal member 601 is inserted in the through hole 91 of the reinforcement continuous member 471 and arranged in such a manner as to intersect the reinforcement continuous member 471. Although unillustrated, the nearest diagonal member 602 is inserted in the through hole 91 of the reinforcement continuous member 472 and arranged in such a manner as to intersect the reinforcement continuous member 472. The nearest diagonal member 603 is inserted in the through hole 91 of the reinforcement continuous member 473 and arranged in such a manner as to intersect the reinforcement continuous member 473. The nearest diagonal member 604 is inserted in the through hole 91 of the reinforcement continuous member 474 and arranged in such a manner as to intersect the reinforcement continuous member 474.

Modification

Figure 25:
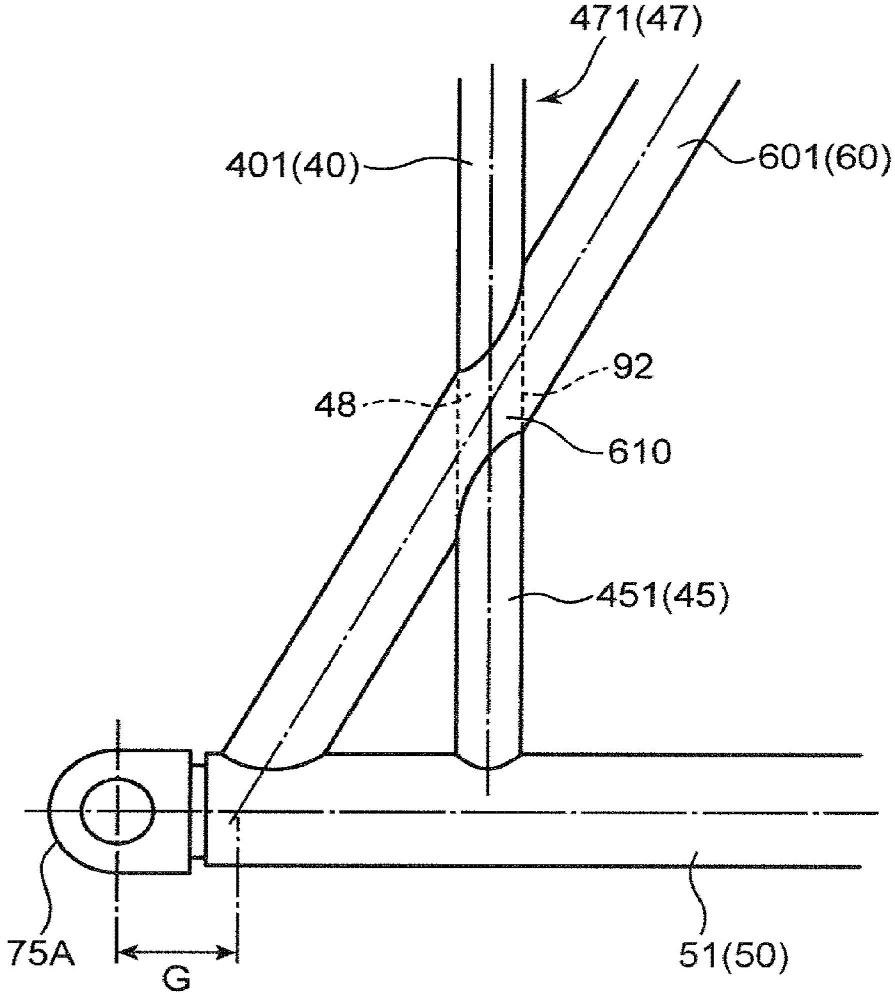
FIG. 25 is a sideview of a portion of a lattice structure according to a modification of the fifth embodiment.
Figure 26:
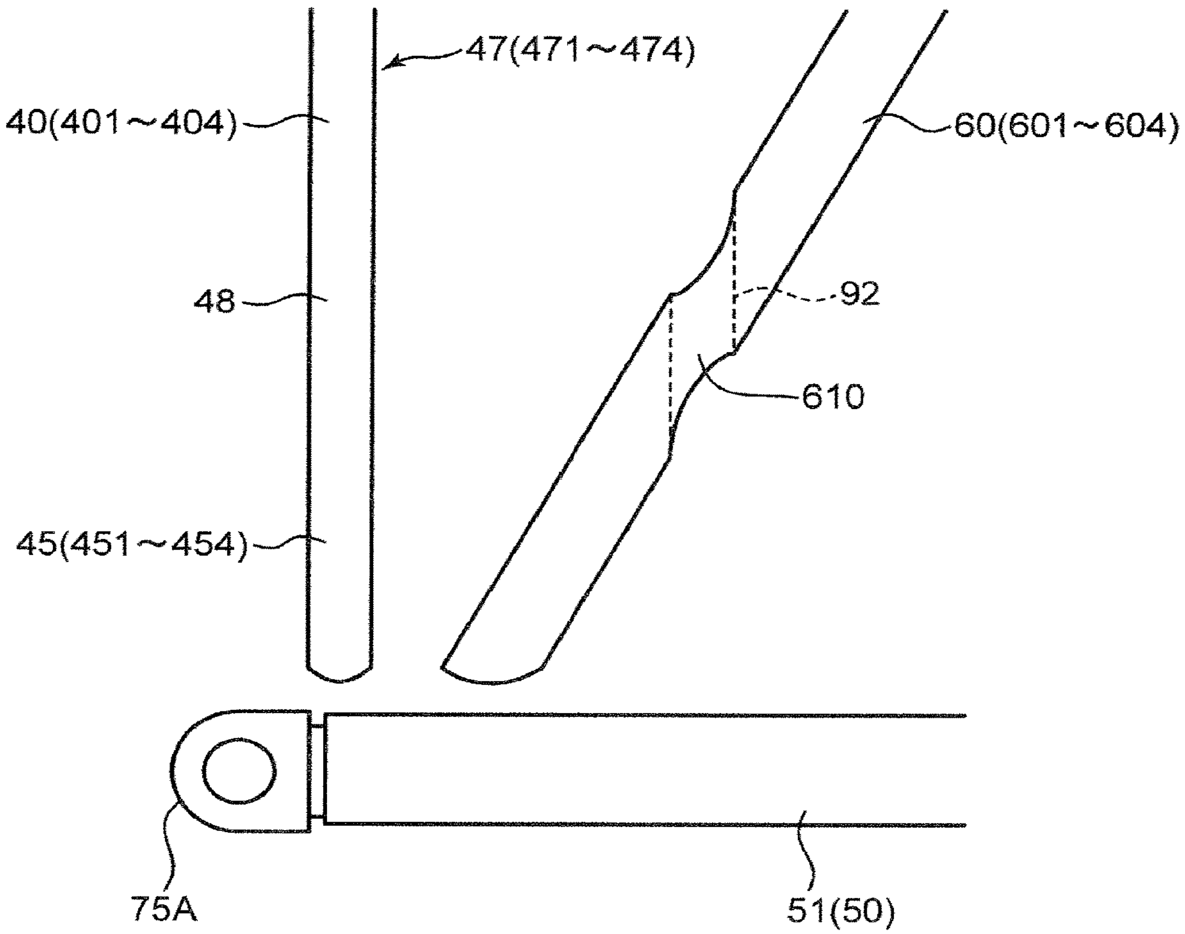
FIG. 26 is a sideview showing components for use in manufacturing the lattice structure according to the modification of the fifth embodiment.

FIG. 25 is a sideview of a portion of a lattice structure according to a modification of the fifth embodiment. FIG. 26 is a sideview showing components for use in manufacturing the lattice structure according to the modification of the fifth embodiment.

The lattice structure according to the modification of the fifth embodiment shown in FIG. 25 differs from the lattice structure shown in FIG. 23 in that each of nearest diagonal members 601 to 604 is formed with a through hole 92 in which a corresponding reinforcement continuous member 47 is inserted. The remaining configurations of the lattice structure according to the modification shown in FIG. 25 are equivalent to those of the lattice structure shown in FIG. 23 except the aforementioned difference.

In the modification, each of the nearest diagonal members 601 to 604 has the through hole 92 in an intermediate section 610 of the nearest diagonal member in a longitudinal direction thereof. The through hole 92 penetrates each of the nearest diagonal members 601 to 604 in a direction intersecting the longitudinal direction of the nearest diagonal member. The direction intersecting in the aforementioned manner corresponds to a longitudinal direction of the reinforcement continuous member 47. In contrast, the reinforcement continuous member 47 in the modification excludes the through hole 91 shown in FIG. 23.

As shown in FIG. 25 and FIG. 26, the reinforcement continuous member 47 includes a reinforcement part 40, a sub-reinforcement part 45, and an intermediate section 48 located therebetween. In the reinforcement continuous member 47, the reinforcement part 40, the intermediate section 48, and the sub-reinforcement part 45 are located in this order in the longitudinal direction of the reinforcement continuous member 47. The intermediate section 48 of the reinforcement continuous member 47 is to fit in the through hole 92 of the corresponding nearest diagonal member.

As shown in FIG. 25 and FIG. 26, a reinforcement continuous member 471 is inserted in the through hole 92 of the nearest diagonal member 601 and arranged in such a manner as to intersect the nearest diagonal member 601. Although unillustrated, a reinforcement continuous member 472 is inserted in the through hole 92 of the nearest diagonal member 602 and arranged in such a manner as to intersect the nearest diagonal member 602. A reinforcement continuous member 473 is inserted in the through hole 92 of the nearest diagonal member 603 and arranged in such a manner as to intersect the nearest diagonal member 603. A reinforcement continuous member 474 is inserted in the through hole 92 of the nearest diagonal member 604 and arranged in such a manner as to intersect the nearest diagonal member 604.

As described above, in the fifth embodiment shown in FIG. 23, each of the nearest diagonal members 601 to 604 is inserted in the through hole 91 of the corresponding reinforcement continuous member 47 and arranged in such a manner as to intersect the reinforcement continuous member 47. Besides, in the modification shown in FIG. 25, the reinforcement continuous member 47 is inserted in the through hole 92 of the corresponding nearest diagonal member and arranged in such a manner as to intersect the nearest diagonal member. Therefore, for instance, as shown in FIGS. 23 and 25, the end of the nearest diagonal member 601 is arrangeable nearer to the connector 75A than the end of sub-reinforcement part 451. This arrangement achieves a smaller gap between the end of the nearest diagonal member 601 and the connector 75A (specifically, a pin insertion hole of the connector 75A). More specifically, in the sideview shown in each of FIG. 23 and FIG. 25, this arrangement can achieve, for example, a shorter distance G between an intersection of a central axis of the first main member 51 and a central axis of the nearest diagonal member 601, and a center of the pin insertion hole of the connector 75A. Accordingly, an effect of the improved buckling strength is obtainable by the reinforcement part 40 and the sub-reinforcement part 45 in the coupling unit and therearound. Additionally, the aforementioned triangular configuration (lattice configuration) or a configuration similar to the lattice configuration in the coupling unit and therearound can exert an effect of suppressing lowering in the buckling strength.

Each of the nearest diagonal members 601 to 604 and the reinforcement continuous member 47 in the fifth embodiment and the modification thereof has a cross-section being continuous from the one end to the another end thereof without being divided. This configuration can effectively transmit a load from the one end to the another end of each of the nearest diagonal members 601 to 604 and the reinforcement continuous member 47, or from the another end to the one end thereof, and further easily ensure the stiffness.

Besides, as shown in FIG. 23 and FIG. 25, the configuration where one of the members is inserted in the through hole 91 or the through hole 92 of the other of the members can avoid an increase in the number of components, and further suppress occurrence of relative positional displacement between each of the nearest diagonal members 601 to 604 and the reinforcement continuous member 47 corresponding to the nearest diagonal member.

In the fifth embodiment shown in FIG. 23, each of the nearest diagonal members 601 to 604 has a substantially uniform cross-section from the one end to the another end thereof. This configuration can further effectively transmit a load acting on, for example, the nearest diagonal member 601 to the first main member 51 and the connector 75A near the first main member in a work performed by the working machine.

In the modification shown in FIG. 25, the reinforcement continuous member 47 has a substantially uniform cross-section from the one end to the another end thereof. This configuration can suppress occurrence of a strain (e.g., welding strain) in the reinforcement continuous member 47 in manufacturing of the lattice structure.

Lattice Structure According to Sixth Embodiment

Figure 27:
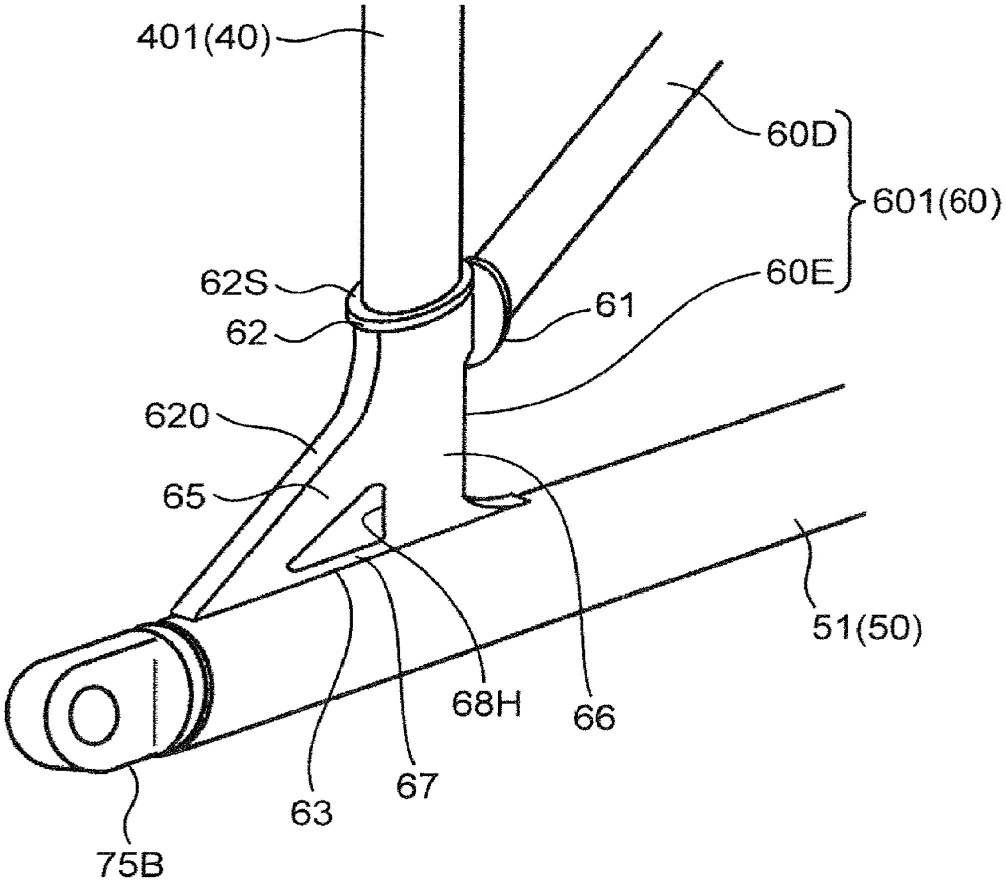
FIG. 27 is a perspective view of a portion of a lattice structure according to a sixth embodiment.
Figure 28:
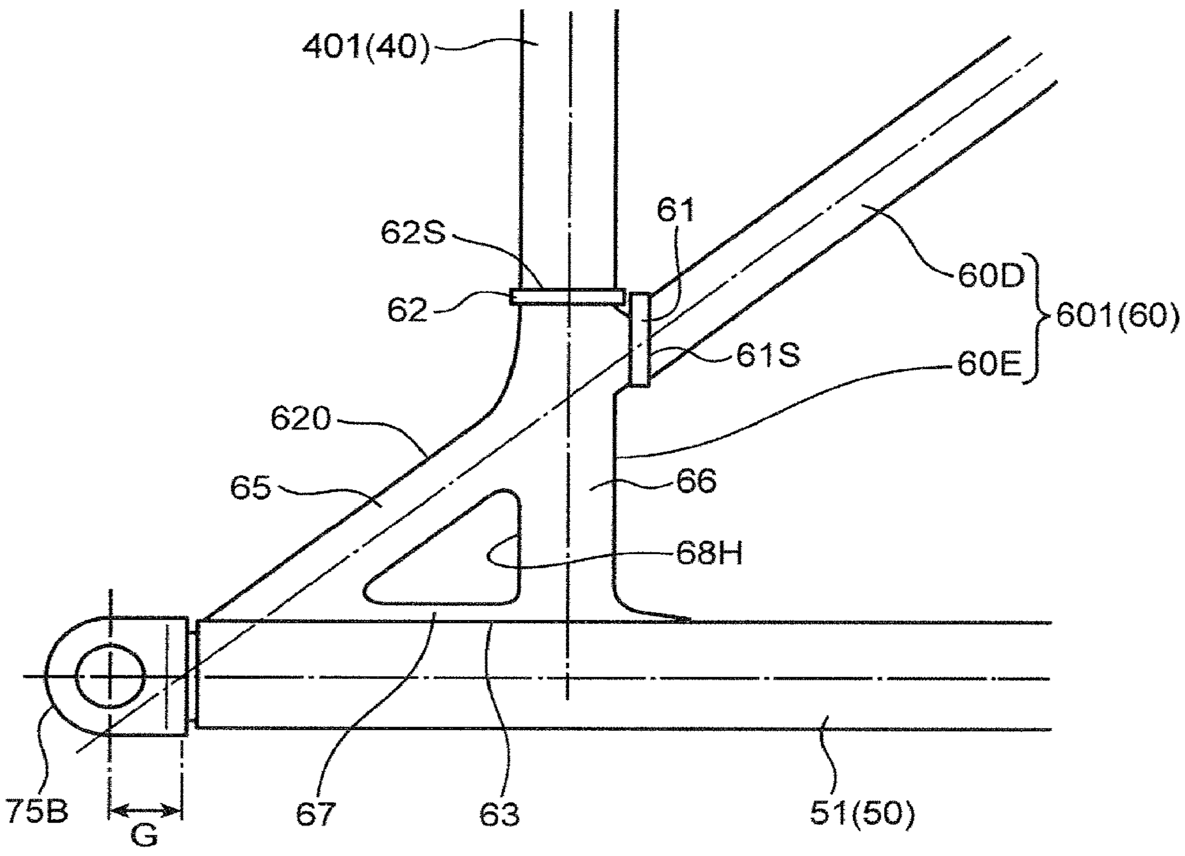
FIG. 28 is a sideview of the portion of the lattice structure according to the sixth embodiment.

FIG. 27 is a perspective view of a main portion of a lattice structure according to a sixth embodiment, and FIG. 28 is a sideview thereof. A region occupied by the main portion shown in each of FIG. 27 and FIG. 28 in the lattice structure according to the sixth embodiment corresponds to the portion in the framed box XVI in FIG. 14.

The lattice structure according to the sixth embodiment includes four main members 51 to 54, a plurality of connectors 75A, 75B, a plurality of diagonal members 60, and a plurality of reinforcement parts 40. As shown in FIGS. 27 and 28, the first main member 51 has one end to which the male connector 75B is connected and another end to which the female connector 75A (not shown) is connected.

The reinforcement parts 40 in the sixth embodiment include, in the same manner as in the third embodiment shown in FIG. 14, a reinforcement part 401, a reinforcement part 402, a reinforcement part 403, and a reinforcement part 404. These reinforcement parts 401 to 404 are respectively arranged at one end of the lattice structure 32 in a longitudinal direction thereof and another end of the lattice structure 32 in the longitudinal direction thereof. Each of the reinforcement parts 40 in the sixth embodiment is a linearly extending pipe (reinforcement pipe) in the same manner as in the third embodiment shown in FIG. 14. However, each of the reinforcement parts 40 may be, for example, a member having a prism-shape, or a shaped steel member, such as an H-steel member and a channel steel member. Moreover, each of the reinforcement parts 40 may be a solid member.

A basic configuration of the lattice structure according to the sixth embodiment shown in FIG. 27 and FIG. 28 is similar to that of the lattice structure 32) according to the third embodiment shown in FIG. 14 to FIG. 17. Hereinafter, the differences between the sixth embodiment and the third embodiment will be mainly described.

Diagonal Member

Each of the diagonal members 60 linearly extends so as to be inclined with respect to the longitudinal direction of the lattice structure according to the sixth embodiment as well. Each of the diagonal members 60 is made of a single pipe except nearest diagonal members 601 to 604 to be described below. Each of the diagonal members 60 has one end in a longitudinal direction (axial direction) thereof and another end opposite the one end in the longitudinal direction. Each diagonal member 60 connects two adjacent main members among the four main members with each other. The diagonal members 60 include the plurality of nearest diagonal members 601 to 604 in the same manner as in the third embodiment.

Nearest Diagonal Member

The four nearest diagonal members 601 to 604 are located near one end of a lattice structure 32 in the longitudinal direction thereof and near another end of the lattice structure 32 in the longitudinal direction thereof. Each of FIG. 27 and FIG. 28 illustrates only the nearest diagonal member 601 while omitting the illustration of the remaining nearest diagonal members 602 to 604.

In the sixth embodiment, each of the nearest diagonal members 601 to 604 includes a diagonal member main body 60D and an interposition member 60E. The diagonal member main body 60D is a member linearly extending from one main member 50 of the two adjacent members 50 toward the other main member 50 of the two adjacent members. The interposition member 60E is interposed between the corresponding diagonal member main body 60D and the other main member 50. The diagonal member main body 60D is, for example, a linearly extending single pipe, but may be a linearly extending solid member. Alternatively, the diagonal member main body 60D may be a linearly extending plate-like member, or a linearly extending shaped steel member, such as an H-steel member and a channel steel member.

The interposition member 60E has an interposition member main body 620, a diagonal member main body connection part 61, a reinforcement connection part 62, and a main mber connection part 63. The interposition member main body 620 has, for example, a triangular shape in a sideview as shown in FIG. 28, but the shape of the interposition member main body 620 is not limited to the triangular shape. The interposition member main body 620 is, for example, a plate-like member, but may be, for example, a shaped steel member, such as an H-steel member and a channel steel member, or a pipe. One end of the corresponding diagonal member main body 60D is connected to the diagonal member main body connection part 61. One end of the corresponding reinforcement part 40 is connected to the reinforcement connection part 62. The main member connection part 63 is connected to the other main member 50.

A connection or joining way, e.g., welding, is used to connect or join the diagonal member main body connection part 61 and the one end of the diagonal member main body 60D to each other, connect or join the reinforcement connection part 62 and the one end of the reinforcement part 40 to each other, and connect or join the main member connection part 63 and the main member 50 to each other, but the connection or joining way is not limited to the welding.

For instance, the nearest diagonal member 601 includes, as shown in FIG. 27 and FIG. 28, a diagonal member main body 60D extending from the second main member 52 toward the first main member 51, and an interposition member 60E interposed between the diagonal member main body 60D and the first main member 51. The main member connection part 63 of the nearest diagonal member 601 is connected to a portion of the main member 51 that is adjacent to the connector 75B. The diagonal member main body 60D of the nearest diagonal member 601 has one end connected to the diagonal member main body connection part 61 of the nearest diagonal member 601. The reinforcement part 401 has one end connected to the reinforcement connection part 62 of the nearest diagonal member 601.

Although unillustrated, each of the nearest diagonal members 602 to 604 has the same configuration as the nearest diagonal member 601. The nearest diagonal member 602 includes a diagonal member main body 60D extending from the third main member 53 toward the second main member 52, and an interposition member 60E interposed between the diagonal member main body 60D and the second main member 52. The main member connection part 63 of the nearest diagonal member 602 is connected to a portion of the second main member 52 that is adjacent to the connector 75B. The diagonal member main body 60D of the nearest diagonal member 602 has one end connected to the diagonal member main body connection part 61 of the nearest diagonal member 602. The reinforcement part 402 has one end connected to the reinforcement connection part 62 of the nearest diagonal member 602.

Similarly, the nearest diagonal member 603 includes a diagonal member main body 60D extending from the fourth main member 54 toward the third main member 53, and an interposition member 60E interposed between the diagonal member main body 60D and the third main member 53. The main member connection part 63 of the nearest diagonal member 603 is connected to a portion of the third main member 53 that is adjacent to the connector 75B. The diagonal member main body 60D of the nearest diagonal member 603 has one end connected to the diagonal member main body connection part 61 of the nearest diagonal member 603. The reinforcement part 403 has one end connected to the reinforcement connection part 62 of the nearest diagonal member 603.

The nearest diagonal member 604 includes a diagonal member main body 60D extending from the first main member 51 toward the fourth main member 54, and an interposition member 60E interposed between the diagonal member main body 60D and the fourth main member 54. The main member connection part 63 of the nearest diagonal member 604 is connected to a portion of the fourth main member 54 that is adjacent to the connector 75B. The diagonal member main body 60D of the nearest diagonal member 604 has one end connected to the diagonal member main body connection part 61 of the nearest diagonal member 604. The reinforcement part 404 has one end connected to the reinforcement connection part 62 of the nearest diagonal member 604.

In the sixth embodiment, each of the nearest diagonal members includes the interposition member 60E having the three connection parts 61 to 63. Therefore, as shown in FIG. 28, this configuration achieves, for example, a smaller gap between the end of the nearest diagonal member 601 (specifically, the end of the interposition member 60E) and the connector 75B (specifically, a pin insertion hole of the connector 75B). More specifically, in the sideview shown in FIG. 28, this configuration can achieve, for example, a shorter distance G between an intersection of a central axis of the first main member 51 and a central axis of the diagonal member main body 60D of the nearest diagonal member 601, and a center of the pin insertion hole of the connector 75B. Accordingly, an effect of the improved buckling strength is obtainable by the reinforcement part 401 in the coupling unit and therearound. Additionally, the aforementioned triangular configuration (lattice configuration) or a configuration similar to the lattice configuration in the coupling unit and therearound can exert an effect of suppressing lowering in the buckling strength.

The summary of the sixth embodiment is described heretofore, and the configuration in the sixth embodiment will be described below in more detail. Hereinafter, the nearest diagonal member 601 will be mainly described, but the remaining nearest diagonal members 602 to 604 have the same configuration.

As shown in FIG. 27 and FIG. 28, the interposition member main body 620 of the interposition member 60E has a diagonal member continuous part 65 being continuous from the diagonal member main body connection part 61 to the first main member 51 in a direction parallel to a longitudinal direction of the diagonal member main body 60D. The diagonal member continuous part 65 has a leading end connected to the first main member 51. In this manner, a load acting on the diagonal member main body 60D of the nearest diagonal member 601 in a work performed by the working machine is continuously and effectively transmittable to the first main member 51 and the connector 75B therearound via the diagonal member continuous part 65 of the interposition member 60E.

Besides, the interposition member main body 620 of the interposition member 60E further has a reinforcement continuous part 66 being continuous from the reinforcement connection part 62 to the first main member 51 in a direction parallel to a longitudinal direction (exemplary first specific direction) of the reinforcement part 401. In this manner, a load acting on the reinforcement part 401 in a work performed by the working machine is continuously and effectively transmittable to the first main member 51 via the reinforcement continuous part 66 of the interposition member 60E. The reinforcement continuous part 66 has a leading end connected to the first main member 51 at a position farther away from the connector 75B than the leading end of the diagonal member continuous part 65 in the longitudinal direction of the first main member 51.

The interposition member main body 620 of the interposition member 60E further has a bridge part 67 extending along the first main member 51 for bridging the leading end of the diagonal member continuous part 65 and the leading end of the reinforcement continuous part 66. The bridge part 67 provided in this manner can improve the stiffness of the interposition member 60E.

The interposition member main body 620 has a hole 68H defined by the diagonal member continuous part 65, the reinforcement continuous part 66, and the bridge part 67 thereamong. Specifically, the interposition member 60E has the diagonal member continuous part 65, the reinforcement continuous part 66, and the bridge part 67 in necessary portions in view of the load transmission and stiffness improvement, and further has the hole 68H in view of the weight reduction.

Moreover, as shown in FIG. 27 and FIG. 28, the diagonal member main body connection part 61 has a welding surface 61S which is flat for welding the one end of the diagonal member main body 60D, and the reinforcement connection part 62 has a welding surface 62S which is flat for welding the one end of the reinforcement part 401. This configuration can more effectively improve the operability of the welding operation and improve the welding quality than a configuration with a welding surface having a curving shape, such as the side surface of a pipe.

For instance, Japanese unexamined patent publication No. SHO 58-65850 discloses a truss structure joint. The truss structure joint is aimed at joining a main pipe and a branch pipe of the truss structure to each other, and has a plurality of bulge parts for welding the branch pipe thereto, a part of or whole of the bulge parts being linearly connected to each other. As shown in FIG. 6 of Japanese unexamined patent publication No. SHO 58-65850, each of the bulge parts has a space inside, and thus the bulge part to which one end of the pipe is connected does not necessarily have high stiffness.

In contrast, in the embodiment, each of the diagonal member main body connection part 61 and the reinforcement connection part 62 is made of a plate-like member (member having a flat-plate shape), and is connected to the interposition member main body 620. This configuration is advantageous in the stiffness in terms of no space between each of the diagonal member main body connection part 61 and the reinforcement connection part 62, and the interposition member main body 620.

Moreover, the truss structure joint in Japanese unexamined patent publication No. SHO 58-65850 that includes the bulge parts each having the complicated shape faces difficulty to manufacture so that a central axis of the branch pipe intersects a central axis of the main pipe. Furthermore, the truss structure joint gradually curves as a portion to be welded to the main pipe is longer in the longitudinal direction and in the cross-sectional direction of the main pipe, and accordingly the workability of the welding becomes worse. As a result, a problem of a welding strain is likely to occur. From these perspectives, it is difficult to manufacture the truss structure joint so that the central axis of the branch pipe intersects the central axis of the main pipe.

In contrast, in the sixth embodiment shown in FIG. 27 and FIG. 28, the main member connection part 63 of the interposition member 60E and the main member 50 define a straight connection portion therebetween, and the one end of the diagonal member main body 60D is welded to the welding surface 61S which is flat and the one end of the reinforcement part 401 is welded to the welding surface 62S which is flat. Accordingly, the welding is easily executable, and the problem of the welding strain is unlikely to occur. Consequently, a configuration for the aforementioned smaller distance G (the distance G between the intersection of the central axis of the first main member 51 and the central axis of the nearest diagonal member 601, and the center of the pin insertion hole of the connector 75B) is accurately attainable.

First Modification

Figure 29:
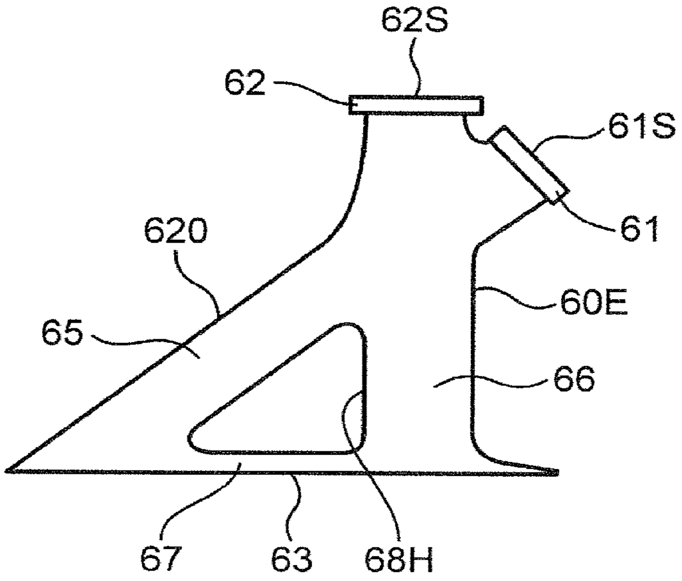
FIG. 29 is a sideview showing components of a lattice structure according to a first modification of the sixth embodiment.

FIG. 29 is a sideview showing components of a lattice structure according to a first modification of the sixth embodiment. In the first modification shown in FIG. 29, a diagonal member main body connection part 61 has a welding surface 61S mostly perpendicular or substantially perpendicular to a longitudinal direction of a diagonal member main body 60D. This configuration can further improve the operability of the welding operation and improve the welding quality.

Second Modification

Figure 30:
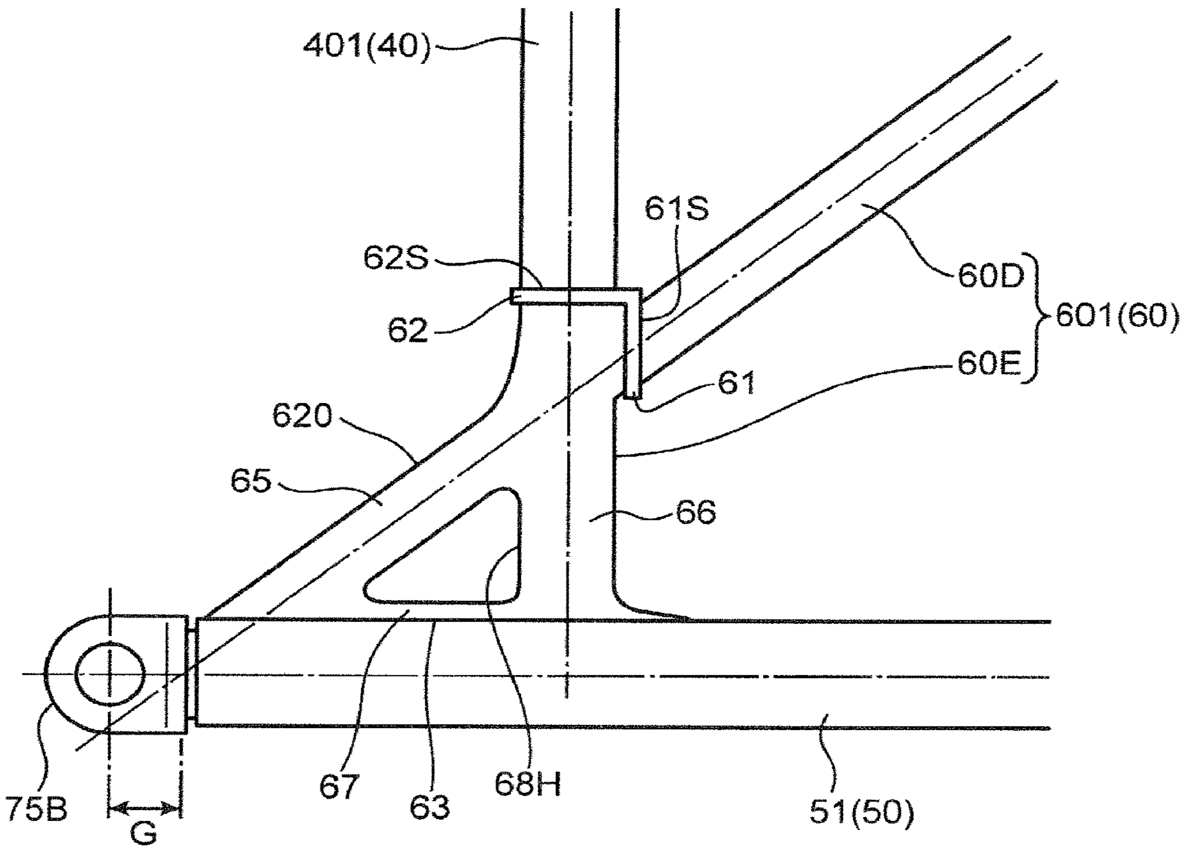
FIG. 30 is a sideview of a portion of a lattice structure according to a second modification of the sixth embodiment.

FIG. 30 is a sideview of a portion of a lattice structure according to a second modification of the sixth embodiment. In the second modification shown in FIG. 30, a diagonal member main body connection part 61 and a reinforcement connection part 62 are formed of an integrally continuous member. In this ease, a welding operation of welding the diagonal member main body connection part 61 and the reinforcement connection part 62 formed of the integrally continuous member to an interposition member main body 620 can be continuously performed, and accordingly, the operability of the welding operation is improvable. Furthermore, such continuous welding suppresses remaining of an unwelded portion which has been left unwelded, and hence the welding quality is improvable.

Third Modification

Figure 31:
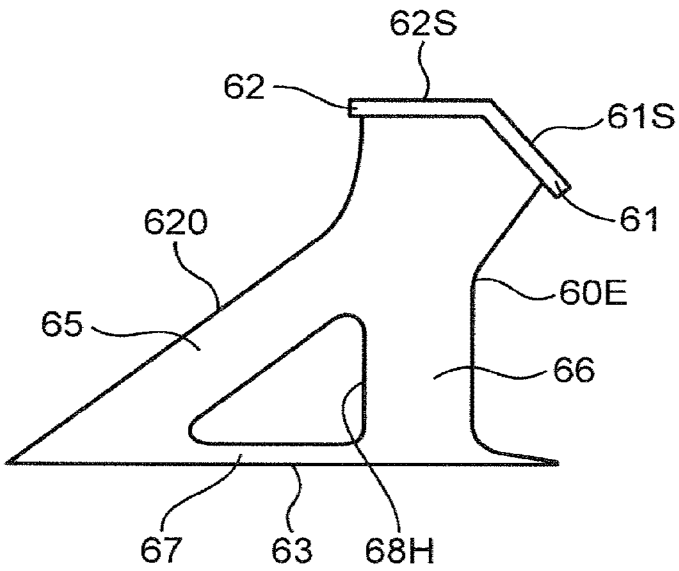
FIG. 31 is a sideview showing components of a lattice tru ure according to a third modification of the sixth embodiment.

FIG. 31 is a sideview showing components of a lattice structure according to a third modification of the sixth embodiment. In the third modification shown in FIG. 31, a diagonal member main body connection part 61 has a welding surface 61S mostly perpendicular or substantially perpendicular to a longitudinal direction of a diagonal member main body 60D, and the diagonal member main body connection part 61 and a reinforcement connection part 62 are formed of an integrally continuous member. In the third modification, the welding surface 61S is substantially perpendicular to the longitudinal direction of the diagonal member main body 60D, and a welding surface 62S is substantially perpendicular to a longitudinal direction of a reinforcement part 40. This configuration can further improve the workability of the welding operation and further improve the welding quality.

Fourth Modification

Figure 32:
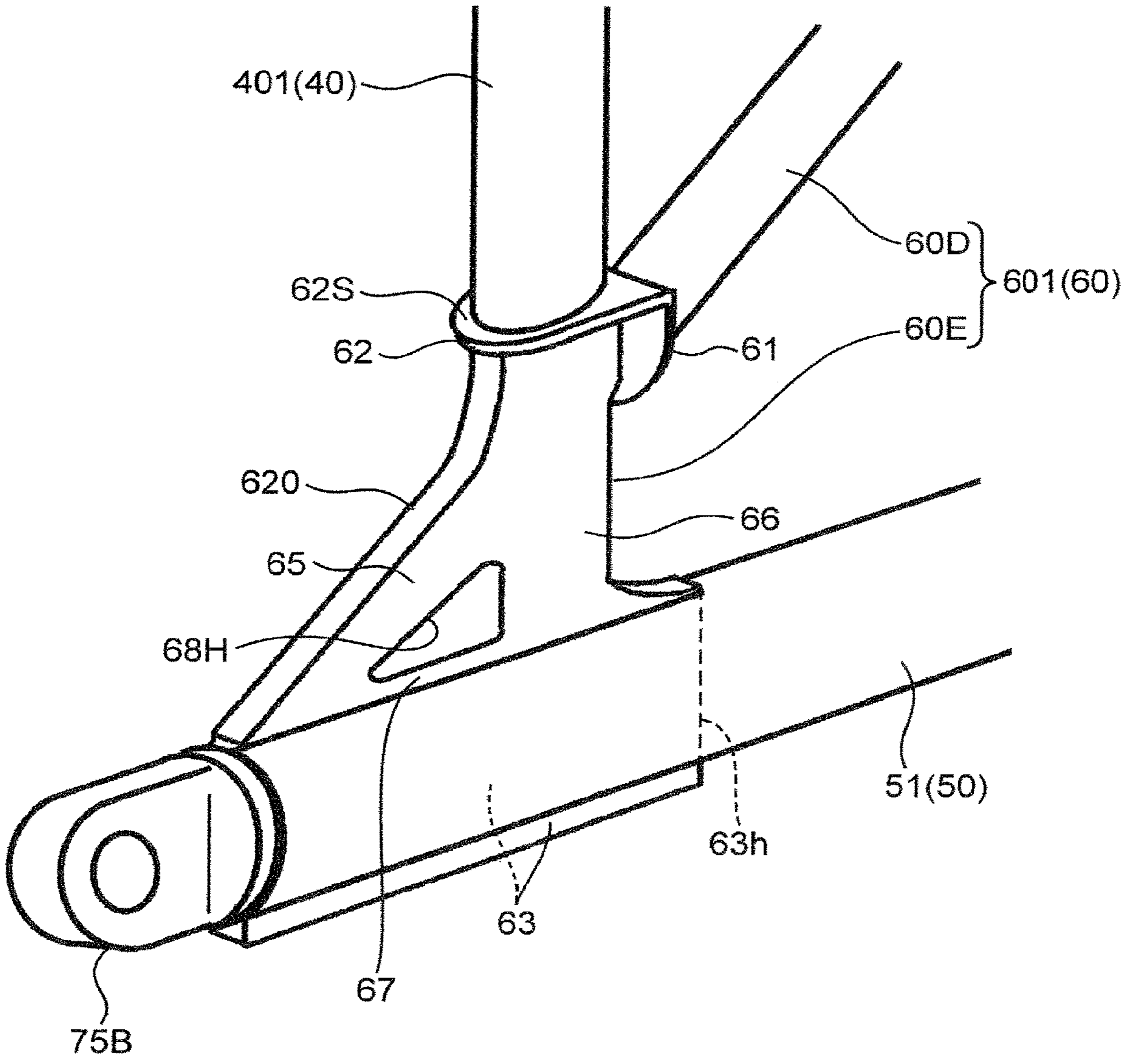
FIG. 32 is a perspective view of a portion of a lattice structure according to a fourth modification of the sixth embodiment.
Figure 33:
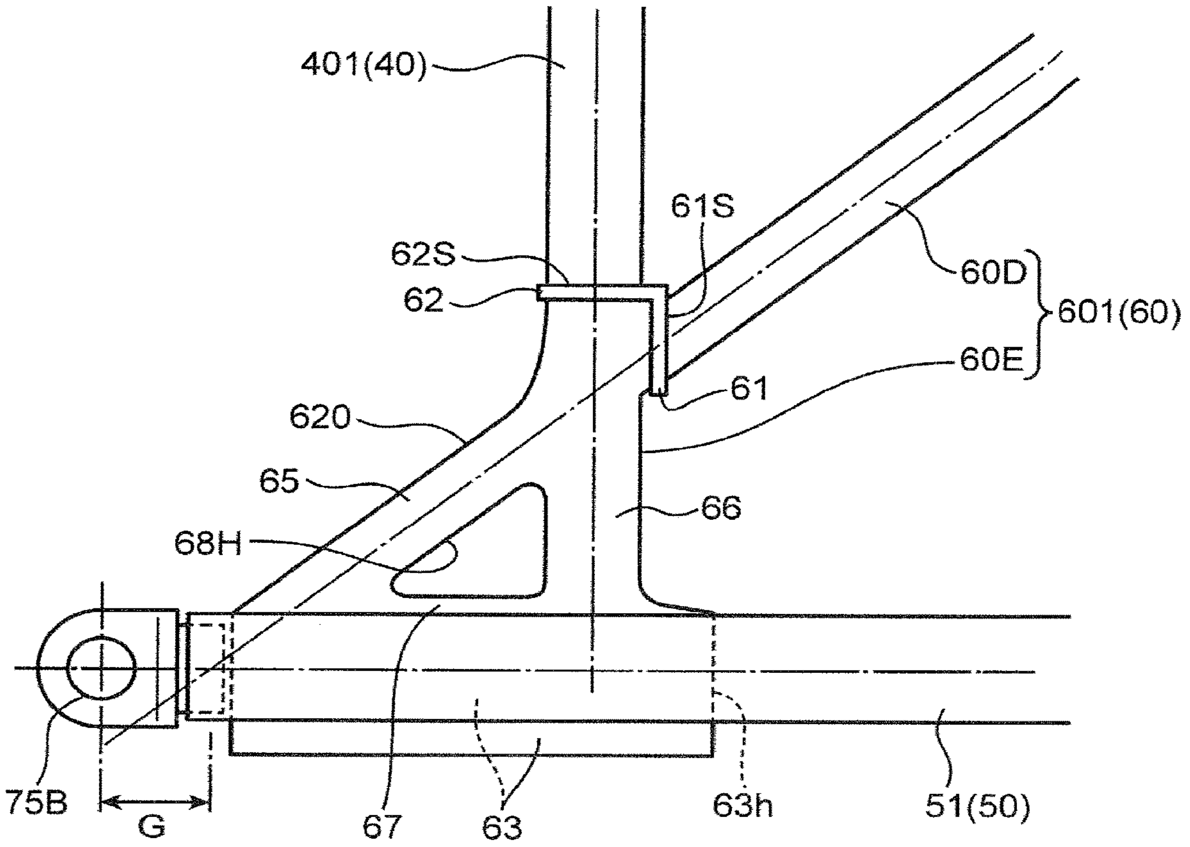
FIG. 33 is a sideview of the portion of the lattice structure according to the fourth modification of the sixth embodiment.

FIG. 32 is a perspective view of a portion of a lattice structure according to a fourth modification of the sixth embodiment, and FIG. 33 is a sideview thereof. Although the main member connection part 63 of the interposition member 60E is joined to an outer peripheral surface of the main member 50 through welding in the embodiment shown in FIG. 27, a main member connection part 63 of an interposition member 60E in the fourth modification shown in FIG. 32 and FIG. 33 is connected to a main member 50 in the following manner.

As shown in FIG. 32 and FIG. 33, a first main member 51 has an insertion part 63*h* having at least one of a groove and a hole in which a portion of the interposition member 60E is inserted. The insertion part 63*h* may be, for example, a through hole penetrating the first member 51 in a radial direction thereof, or a groove recessed in a portion on an outer periphery of the first main member 51 in the radial direction thereof.

The main member connection part 63 of the interposition member 60E is fixedly attached to the first main member 51 by using a connection or joining way, e.g., welding, in a state where at least a portion of the main member connection part 63 is inserted in the insertion part 63*h*.

In the fourth modification, the interposition member 60E is fixedly attachable to the first main member 51 in the state where at least the portion of the main member connection part 63 of the interposition member 60E is inserted in the insertion part 63H. This configuration facilitates a positioning operation of deciding relative positions between the first main member 51 and the interposition member 60E in the fixing and attaching operation, and accordingly improve accuracy of the relative positions and further improve the operability of the fixing and attaching operation.

In the fourth modification, the main member connection part 63 of the interposition member 60E is weldable and fixedly attachable to the opposite portions of the main member 51 (upper portion and lower portion of the first main member 51 in FIG. 33) in the radial direction thereof in the state of being inserted in the insertion part 63*h* of the first main member 51. In this case, the integrality of the first main member 51 and the interposition member 60E is further increased, resulting in further improvement of the strength.

Lattice Structure According to Seventh Embodiment

Figure 34:
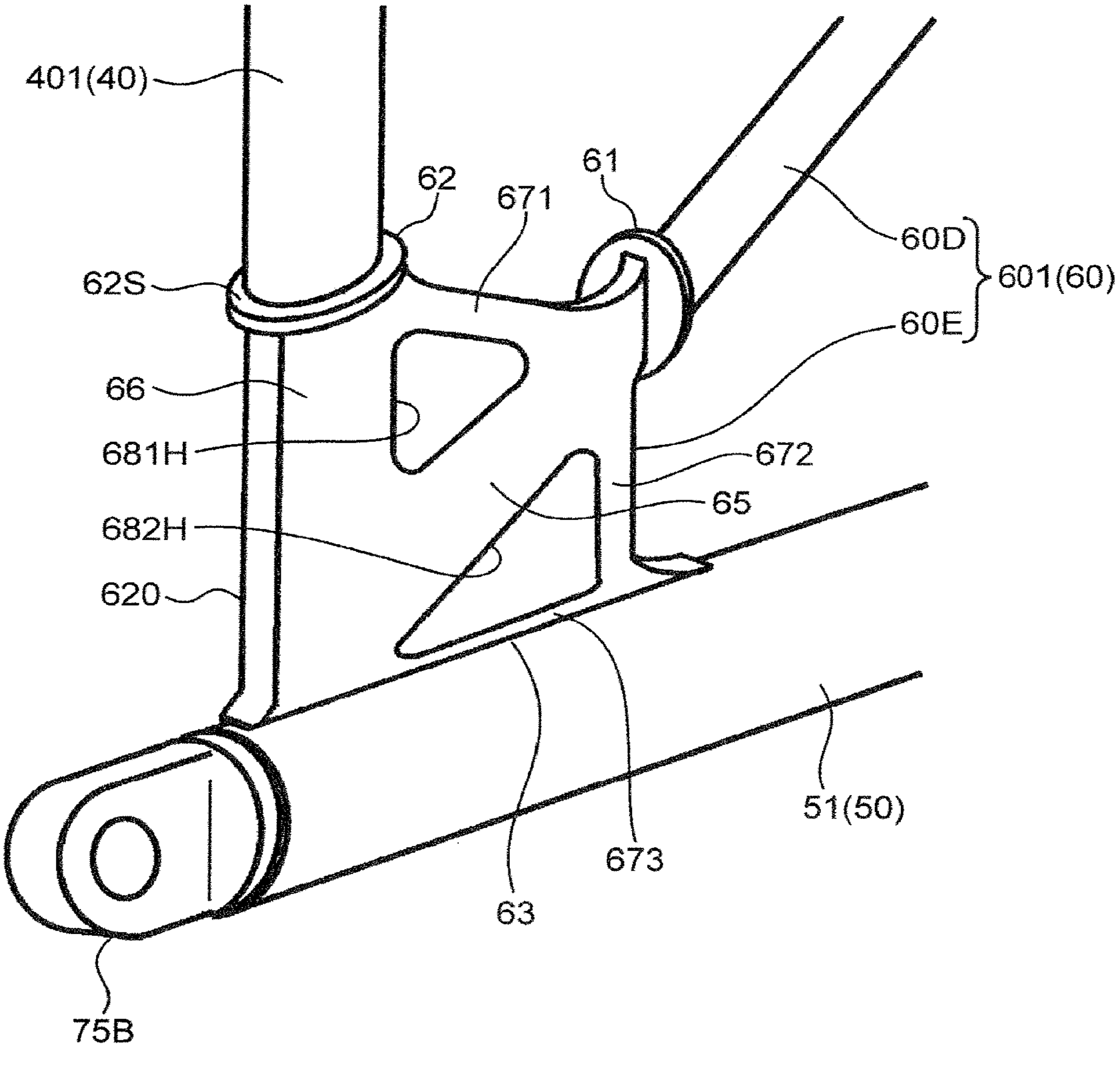
FIG. 34 is a perspective view of a portion of a lattice structure according to a seventh embodiment.
Figure 35:
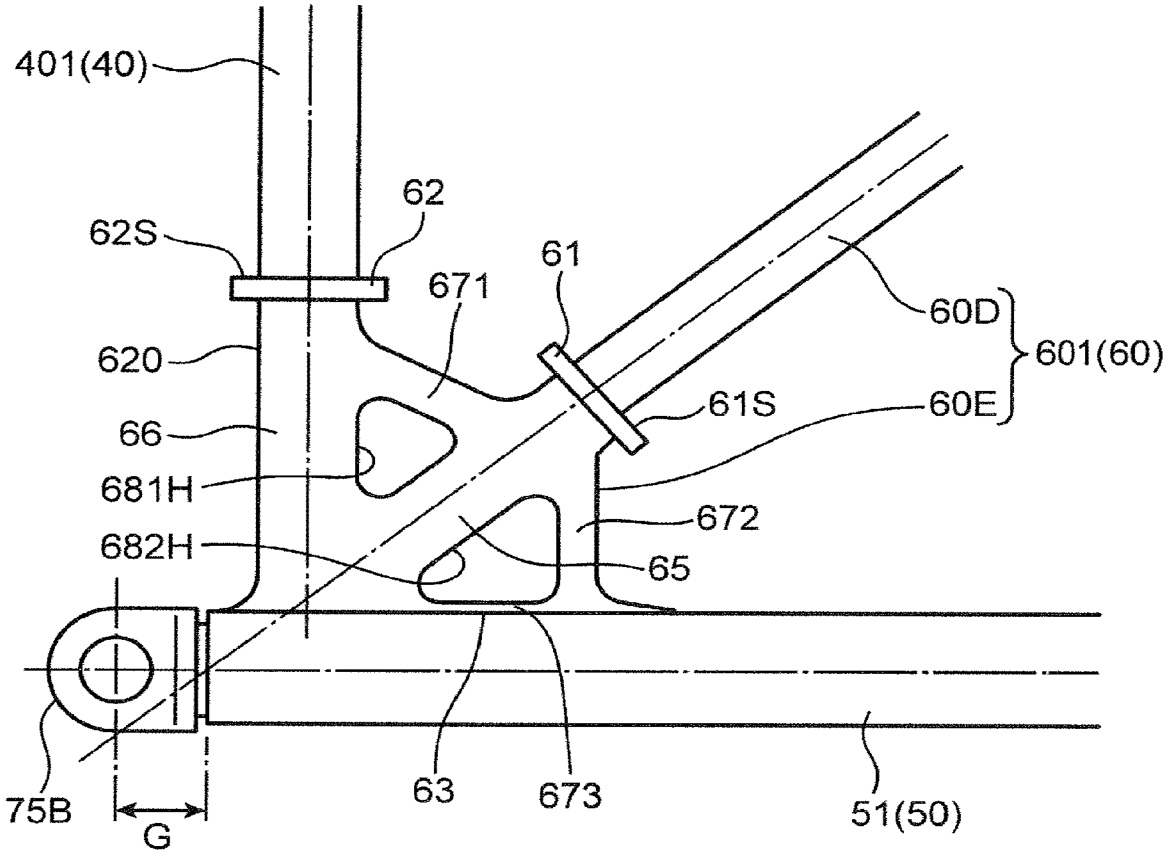
FIG. 35 is a sideview of the portion of the lattice structure according to the seventh embodiment.

FIG. 34 is a perspective view of a portion of a lattice structure according to a seventh embodiment, and FIG. 35 is a sideview thereof. A region occupied by a main portion shown in each of FIG. 34 and FIG. 35 in the lattice structure according to the seventh embodiment corresponds to the portion in the framed box XVI in FIG. 14.

A basic configuration of the lattice structure according to the seventh embodiment shown is similar to that of the lattice structure according to the sixth embodiment shown in FIG. 27 and FIG. 28. Accordingly, hereinafter, the differences between the lattice structure according to the seventh embodiment between the lattice structure according to the sixth embodiment will be mainly described. The main differences are seen in the configuration of an interposition member 60E. More details will be described below.

In the lattice structure according to the seventh embodiment shown in FIG. 34 and FIG. 35, the interposition member 60E has an interposition member main body 620, a diagonal member main body connection part 61, a reinforcement connection part 62, and a main member connection part 63, in the same manner as in the sixth embodiment. The interposition member main body 620 has a diagonal member continuous part 65, a reinforcement continuous part 66, and a first bridge part 671.

The diagonal member continuous part 65 is continuous from the diagonal member main body connection part 61 to a first main member 51 in a direction parallel to a longitudinal direction of a diagonal member main body 60D. The diagonal member continuous part 65 has a leading end connected to the first main member 51. The reinforcement continuous part 66 is continuous from the reinforcement connection part 62 to the diagonal member continuous part 65 in a direction parallel to a longitudinal direction of a reinforcement part 40. The reinforcement continuous part 66 has a leading end connected to the diagonal member continuous part 65. The first bridge part 671 is located closer to a second main member 52 (closer to the reinforcement connection part 62 in FIG. 35) than a specific position where the leading end of the reinforcement continuous part 66 is connected to the diagonal member continuous part 65 for bridging the diagonal member continuous part 65 and the reinforcement continuous part 66.

In the seventh embodiment, a load acting on the diagonal member main body 60D of a nearest diagonal member 601 in a work performed by the working machine is continuously and effectively transmittable to the first main member 51 and a connector 75B adjacent thereto via the diagonal member continuous part 65 of the interposition member 60E. Moreover, a load acting on the reinforcement part 40 is continuously and effectively transmittable to the first main member 51 via the reinforcement continuous part 66 of the interposition member 60E. Furthermore, the first bridge part 671 bridging the diagonal member continuous part 65 and the reinforcement continuous part 66 can improve the stiffness of the interposition member 60E.

In the seventh embodiment, the interposition member main body 620 of the interposition member 60E further has a second bridge part 672 and a third bridge part 673. The second bridge part 672 is located farther away from the connector 75B than the leading end of the reinforcement continuous part 66 in the longitudinal direction of the first main member 51 for bridging the diagonal member continuous part 65 and the first main member 51. The third bridge part 673 extends along the first main member for bridging the leading end of the diagonal member continuous part 65 and a leading end of the second bridge part 672 (where the second bridge part 672 is connected to the first main member 51). The bridge parts 672, 673 provided in this manner further enhances the stiffness of the interposition member 60E.

In the seventh embodiment, the interposition member main body 620 has a hole 681H defined by the diagonal member continuous part 65, the reinforcement continuous part 66, and the first bridge part 671 thereamong. Specifically, the interposition member 60E has the diagonal member continuous part 65, the reinforcement continuous part 66, and the first bridge part 671 in necessary portions in view of improvement in the load transmission and stiffness, and further has the hole 681H in view of the weight reduction. Additionally, the interposition member main body 620 has a hole 682H defined by the diagonal member continuous part 65, the second bridge part 672, and the third bridge part 673 thereamong. Specifically, the interposition member 60E has the diagonal member continuous part 65, the second bridge part 672, and the third bridge part 673 in necessary portions in view of improvement in the load transmission and stiffness, and further has the hole 682H in view of the weight reduction.

Although the diagonal member continuous part 65, the reinforcement continuous part 66, and the first bridge part 671 in the interposition member main body 620 of the interposition member 60E form a triangular shape (inverted triangular shape) in the sideview shown in FIG. 35 in the seventh embodiment, the formed shape is not limited to the triangular shape.

First Modification

Figure 36:
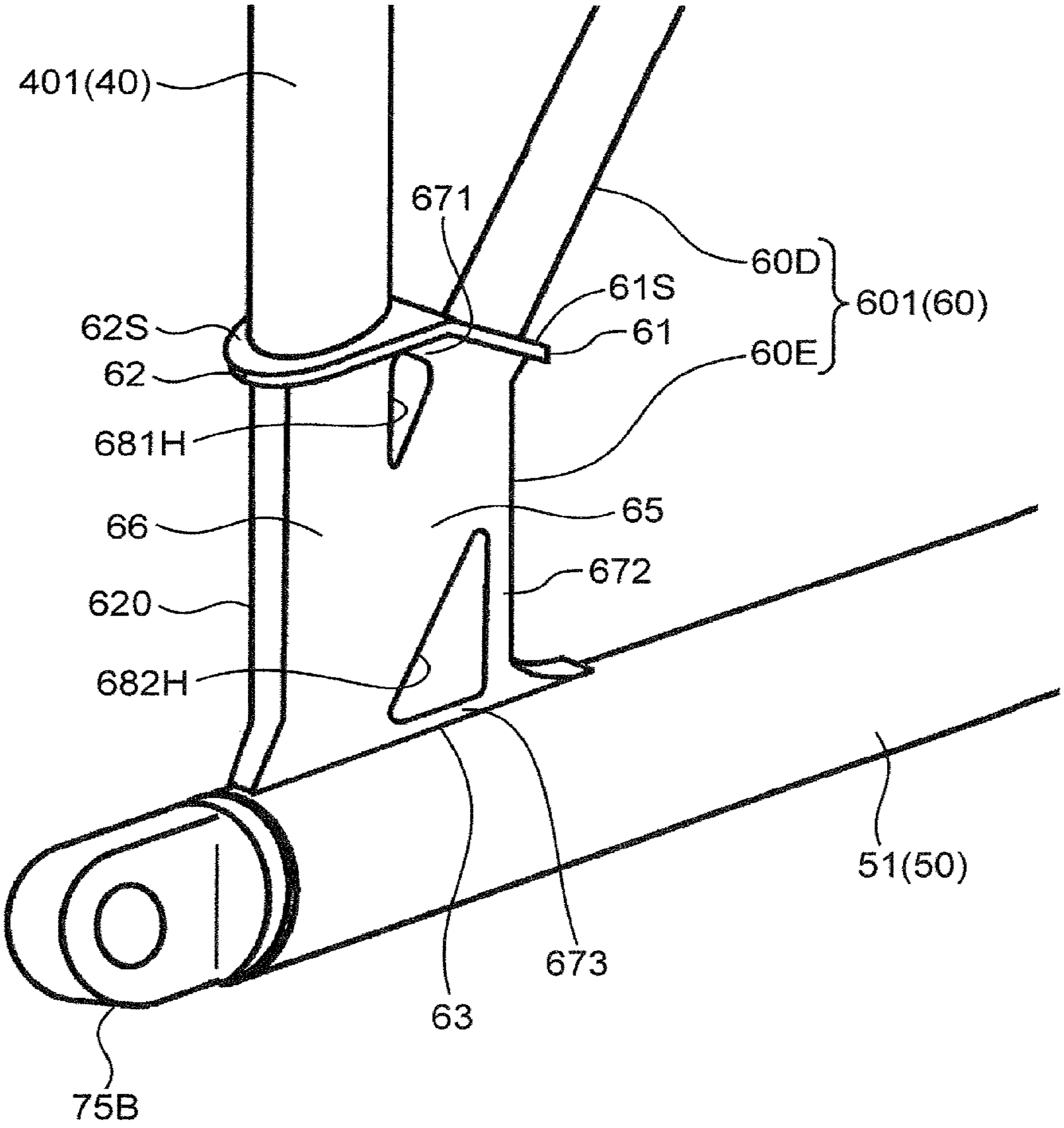
FIG. 36 is a perspective view of a portion of a lattice structure according to a first modification of the seventh embodiment.
Figure 37:
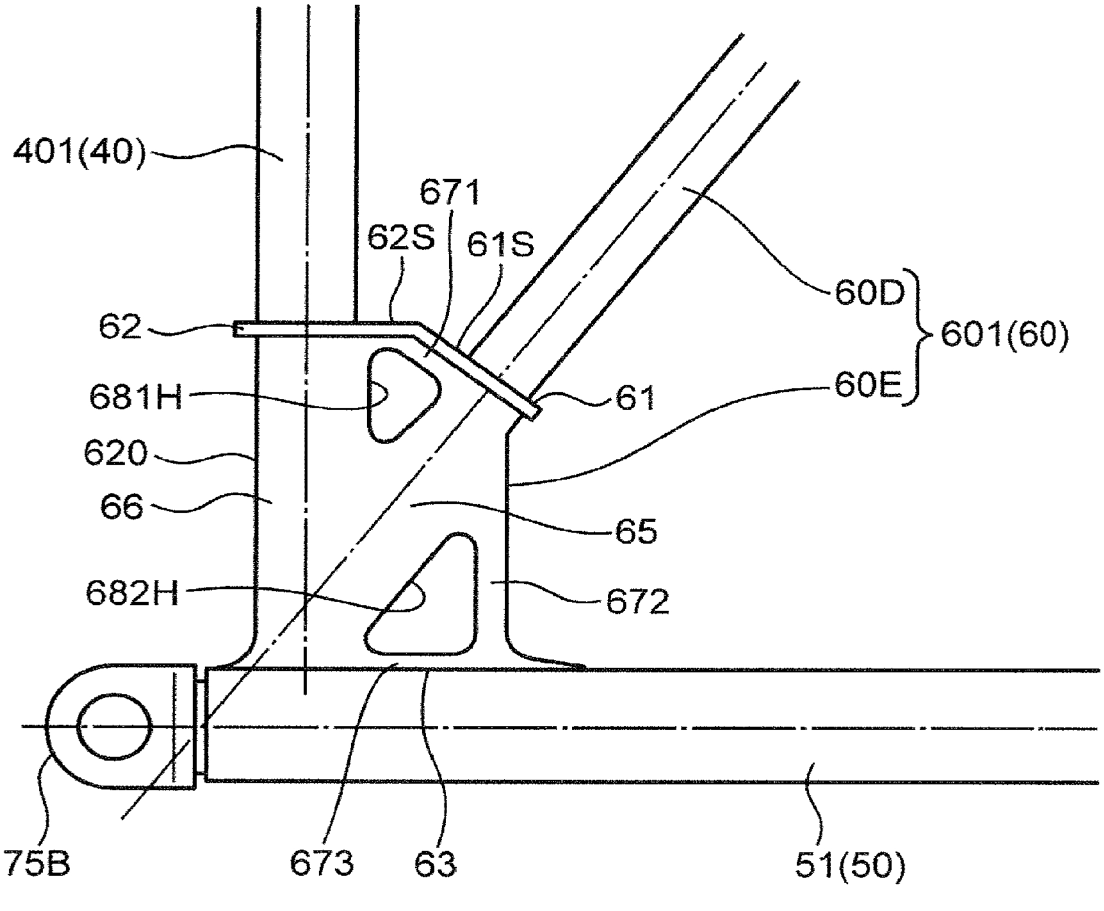
FIG. 37 is a sideview of the portion of the lattice structure according to the first modification of the seventh embodiment.

FIG. 36 is a perspective view of a portion of a lattice structure according to a first modification of the seventh embodiment, and FIG. 37 is a sideview thereof. In the first modification shown in FIG. 36 and FIG. 37, a diagonal member main body connection part 61 and a reinforcement connection part 62 are formed of an integrally continuous member. The diagonal member main body connection part 61 has a welding surface 61S mostly perpendicular or substantially perpendicular to a longitudinal direction of a diagonal member main body 60D.

Second Modification

Figure 38:
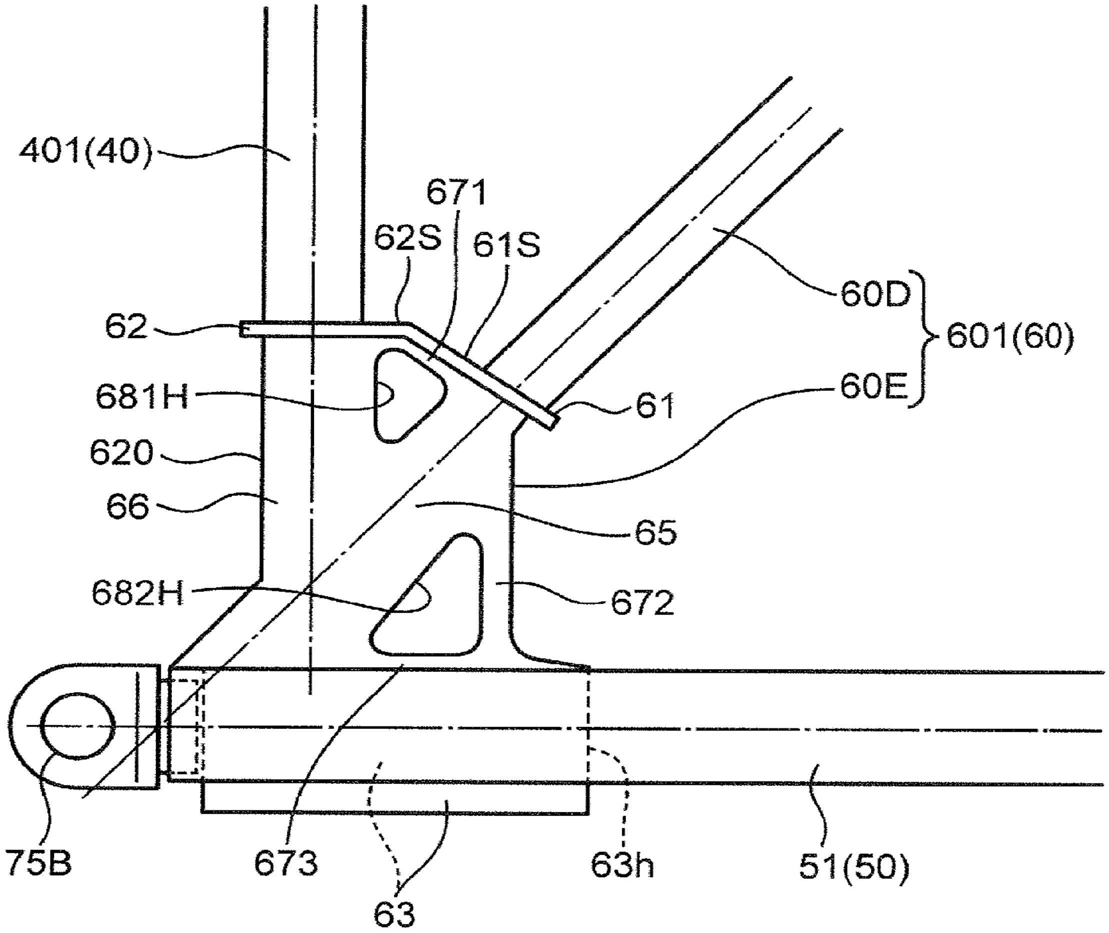
FIG. 38 is a sideview of a portion of a lattice structure according to a second modification of the seventh embodiment.

FIG. 38 is a sideview of a portion of a lattice structure according to a second modification of the seventh embodiment. The second modification of the seventh embodiment has a connection or joining configuration similar to that of the fourth modification of the sixth embodiment shown in FIG. 32 and FIG. 33.

As shown in FIG. 38, a first main member 51 has an insertion part 63*h* having at least one of a groove and a hole in which a portion of an interposition member 60E is inserted. The insertion part 63*h* may be, for example, a through hole penetrating the first member 51 in a radial direction thereof, or a groove recessed in a portion on an outer periphery of the first main member 51 in the radial direction thereof. The interposition member 60E has a main member connection part 63 fixedly attached to the first main member 51 by using a connection or joining way, e.g., welding, in a state where at least a portion of the main member connection part 63 is inserted in the insertion part 63*h*.

Other Modifications

Although the crane is shown as a working machine in the examples of the embodiments, the working machine of the present invention is not limited to the crane, and any other working machine is adaptable as long as the machine includes a lattice structure.

Although the lattice structure serves as a member constituting a portion of the boom 3 of the working machine in the examples of the embodiments, the lattice structure according to the present invention is adaptable to a member constituting another portion of the working machine, such as the jib 4, and the struts 6, 7 as well.

Although the lower traveling body 1 serves as the base body in the examples of the embodiments, the base body is not limited thereto. The base body may not travel on the ground or may be fixed to the ground.

Although the crane 100 serving as the working machine includes the jib 4, the mast 5, and the struts 6, 7 in the embodiments, the present invention is adoptable for a working machine excluding the jib 4, the mast 5, and the structs 6, 7.

Although the main members 50 composing a portion of each of the lattice structures 32, 33 according the embodiments are arranged in parallel to each other in their respective axial directions, the arrangement is not limited thereto. The main members in the present invention cover main members with their respective axial directions which are not parallel to each other like a part of the main members 50 constituting each of the lattice structures 31, 34 (boom members 31, 34) according to the embodiments. In other words, the main members may be arranged in such a posture that at least one of the main members is inclined in an axial direction thereof at an angle to the longitudinal direction of the lattice structure, e.g., in such a manner that the entirety of the lattice structure forms a pyramid-like shape or a truncated cone-like shape.

Each of the main member 50, the diagonal member 60, and the reinforcement part 40 may be a pipe, but is not limited thereto. At least one of the main member 50, the diagonal member 60, and the reinforcement part 40 may be made of, for example, a solid rod-like member, a plate-like member, or a cylindrical member, such as a shaped steel member.

The working machine according to the embodiments includes the mast 5 as shown in FIG. 1, but the configuration of the working machine is not limited to this aspect. The working machine may include a gantry in place of the mast 5. Alternatively, the working machine may include both the mast 5 and the gantry.

The working machine according to the embodiments includes the plurality of winches mounted on the upper slewing body 2, but the arrangement of the winches is not limited to this aspect. At least one of the winches may be mounted on a boom.

The bridge part 67 is excludable in the sixth embodiment. This exclusion can contribute to weight reduction in the interposition member 60E and reduction in the welding portion between the first main member 51 and the interposition member 60E.

In the seventh embodiment, at least one of the first bridge part 671, the second bridge part 672, and the third bridge part 673 may be excludable. The exclusion can contribute to weight reduction in the interposition member 60E. Moreover, exclusion of the third bridge part 673 can lead to reduction in the welding portion between the first main member 51 and the interposition member 60E.

As described heretofore, provided are a lattice structure and a working machine including the same, the lattice structure including a reinforcement part for suppressing lowering in buckling strength in a coupling unit for coupling two lattice structures to each other and therearound, and being capable of suppressing an increase in a distance between ends of two adjacent diagonal members nearest to the coupling unit.

Provided is a lattice structure constituting a portion of a working machine and detachably couplable to another lattice structure adjacent to the lattice structure. The lattice structure includes: a plurality of main members extending along a longitudinal direction of the lattice structure and arranged at intervals in a direction perpendicular to the longitudinal direction; a plurality of diagonal members each extending so as to be inclined with respect to the longitudinal direction, each of the diagonal members connecting two main members among the plurality of main members with each other; a plurality of connectors respectively connected to ends of the main members in the longitudinal direction thereof; and at least one reinforcement part. The main members include a first main member and a second main member. The connectors include a first connector connected to an end of the first main member and a second connector connected to an end of the second main member. The diagonal members include a plurality of first diagonal members connecting the first main member and the second main member with each other, the first diagonal members including a first nearest diagonal member located nearest to the first connector. The at least one reinforcement part includes a first reinforcement part extending from the first nearest diagonal member to the second main member or the second connector in a first specific direction for connecting the first nearest diagonal member, and the second main member or the second connector with each other.

The lattice structure where the first reinforcement part is connected to the first nearest diagonal member eliminates the need to arrange the end of the first reinforcement part between the end of the nearest diagonal member and the first connector. Accordingly, the one end of the first nearest diagonal member can be nearer to the first connector. This configuration, even including the first reinforcement part, can suppress an increase in the distance between the ends of the two diagonal members, Le_, the distance between the end of the nearest diagonal member of the lattice structure and the end of the nearest diagonal member of the another lattice structure. As a result, an effect of the improved buckling strength is obtainable by the first reinforcement part in the coupling unit and therearound. Additionally, the aforementioned triangular configuration (lattice configuration) or a configuration similar to the lattice configuration in the coupling unit and therearound can exert an effect of suppressing lowering in the buckling strength.

In the lattice structure, the first nearest diagonal member preferably has one end connected to the first connector and another end connected to the second main member so that the first nearest diagonal member connects the first main member and the second main member with each other.

In this aspect, the one end of the first nearest diagonal member is connected to the first connector. Thus, the first nearest diagonal member contributes to an ideal lattice structure in the coupling unit (specifically, a portion of the coupling unit corresponding to the first connector) between the lattice structure and the another lattice structure. This configuration can effectively suppress lowering in the stiffness of the lattice structure in the coupling unit and therearound.

In the lattice structure, the first specific direction is preferably perpendicular to the longitudinal direction of the lattice structure.

In this aspect, the longitudinal direction (first specific direction) of the first reinforcement part is perpendicular to the longitudinal direction of the lattice structure, and approximates to the direction in which the buckling deformation of the lattice structure may occur. Accordingly, the buckling strength is further effectively improved.

In the lattice structure, it is preferable that the main members further include a third main member and a fourth main member, the first main member and the second main member are respectively disposed, when the lattice structure is viewed in the longitudinal direction thereof, at positions corresponding to two adjacent vertices among four vertices of a quadrangular shape, and the third main member and the fourth main member are disposed at positions corresponding to remaining two vertices among the four vertices. The connectors preferably further include a third connector connected to an end of the third main member and a fourth connector connected to an end of the fourth main member. The diagonal members preferably include a plurality of second diagonal members connecting the third main member and the fourth main member with each other, the second diagonal members including a second nearest diagonal member located nearest to the third connector. The at least one reinforcement part preferably further includes a second reinforcement part extending from the second nearest diagonal member to the fourth main member or the fourth connector in a second specific direction for connecting the second nearest diagonal member, and the fourth main member or the fourth connector with each other.

In the aspect, the first member and the second main member respectively disposed at positions corresponding to the two adjacent vertices among the four vertices of the quadrangular shape are supported by the first nearest diagonal member and the first reinforcement part, and the third main member and the fourth main member disposed at positions corresponding to the remaining two vertices among the four vertices are supported by the second nearest diagonal member and the second reinforcement part. Accordingly, the portions of the lattice structure corresponding to the respective opposite sides of the quadrangular shape thereof are reinforced in a good balance.

In the lattice structure, the second nearest diagonal member preferably has one end connected to the third connector and another end connected to the fourth main member so that the second nearest diagonal member connects the third main member and the fourth main member with each other.

In this aspect, the one end of the second nearest diagonal member is connected to the third connector. Thus, the second nearest diagonal member contributes to the ideal lattice structure in the coupling unit (specifically, a portion of the coupling unit corresponding to the third connector) between the lattice structure and the another lattice structure. This configuration can further suppress lowering in the stiffness of the lattice structure in the coupling unit and therearound.

In the lattice structure, the second specific direction is preferably perpendicular to the longitudinal direction of the lattice structure.

In this aspect, the longitudinal direction (second specific direction) of the second reinforcement part is perpendicular to the longitudinal direction of the lattice structure, and approximates to the direction in which the buckling deformation of the lattice structure may occur. Accordingly, the buckling strength is further effectively improved.

The lattice structure preferably further includes a sub-reinforcement part for connecting the first main member and the first nearest diagonal member with each other.

The lattice structure according to this aspect includes the sub-reinforcement part for connecting the first embodiment and the first nearest diagonal member with each other in addition to the first reinforcement part for connecting the first nearest diagonal member, and the second main member or the second connector with each other. That is to say, the first reinforcement part and the sub-reinforcement part support the first nearest diagonal member at the opposite positions across the first nearest diagonal member. Therefore, in this aspect, the lattice structure more effectively suppresses the deformation of the first nearest diagonal member than a lattice structure including no sub-reinforcement part, and thus has further improved stiffness.

In the lattice structure, the sub-reinforcement part is preferably arranged at such a position as to overlap the first reinforcement part when the sub-reinforcement part is viewed in the first specific direction.

In this aspect, a load is effectively transmitted from the first reinforcement part to the sub-reinforcement part, and a load is effectively transmitted from the sub-reinforcement part to the first reinforcement part in a work performed by the working machine.

In the lattice structure, the sub-reinforcement part preferably extends from the first main member to the first nearest diagonal member in a direction parallel to the first specific direction.

In this aspect, the longitudinal direction of the sub-reinforcement part is parallel to the longitudinal direction (first specific direction) of the first reinforcement part. Hence, a load is further effectively transmitted from the first reinforcement part to the sub-reinforcement part, and a load is further effectively transmitted from the sub-reinforcement part to the first reinforcement part in a work performed by the working machine. Particularly, the longitudinal direction of the sub-reinforcement part is more preferably perpendicular to the longitudinal direction of the lattice structure. In this case, the longitudinal direction of the sub-reinforcement part approximates to the direction in which the buckling deformation of the lattice structure may occur. Accordingly, the buckling strength is further effectively improved.

In the lattice structure, the first nearest diagonal member may be a continuous member continuously extending from the first main member or the first connector to the second main member, the first reinforcement part may have one end and another end in the first specific direction, and the one end being connected to the first nearest diagonal member and the another end being connected to the second main member or the second connector. The sub-reinforcement part may have one end connected to the first main member and another end connected to the first nearest diagonal member.

In this aspect, connecting the first reinforcement part and the sub-reinforcement part to the first nearest diagonal member that is the continuous member attains arrangement of the end of the first nearest diagonal member nearer to the first connector than the sub-reinforcement part. This arrangement achieves a smaller gap between the end of the first nearest diagonal member and the first connector (specifically, the pin insertion hole of the first connector). Accordingly, in the aspect, an effect of the improved buckling strength is obtainable by the first reinforcement part and the sub-reinforcement part in the coupling unit and therearound. Additionally, the aforementioned triangular configuration (lattice configuration) or a configuration similar to the lattice configuration in the coupling unit and therearound can exert an effect of suppressing lowering in the buckling strength.

In this aspect, the first nearest diagonal member that is the continuous member as described above can be made of a single member. A first nearest diagonal member made of a single member can more smoothly transmit a load at the first nearest diagonal member than a first nearest diagonal member composed of a plurality of members connected to each other. This can further effectively improve the stiffness of the lattice structure.

A load acting on each of the first reinforcement part and the sub-reinforcement part is highly likely to be smaller than a load acting on the first nearest diagonal member in a work performed by the working machine. Hence, an outer diameter of each of the first reinforcement part and the sub-reinforcement part can be made smaller than an outer diameter of the first nearest diagonal member. In this case, weight reduction in the lattice structure is achievable. Furthermore, in this case, each of the first reinforcement part and the sub-reinforcement part having the relatively small diameter is easily connectable to the first nearest diagonal member having the relatively large diameter.

In the lattice structure, for example, the sub-reinforcement part may be made of a pipe. The sub-reinforcement part may be made of at least a plate-like member, a shaped steel member, or a member having a box shape.

A sub-reinforcement part made of at least a plate-like member is easier to manufacture and can lead to greater cost reduction than a sub-reinforcement part made of a pipe. For instance, a sub-reinforcement part made of a shaped steel member, such as an H-steel member and a channel steel member, can more effectively improve the strength than the sub-reinforcement part made of the plate-like member. A sub-reinforcement part made of a member having a box shape can more effectively improve the strength and achieve greater weight reduction than the sub-reinforcement part made of the plate-like member.

In the lattice structure, the first reinforcement part may constitute a portion of a continuous member continuously extending from the first main member to the second main member or the second connector in the first specific direction, the portion including an end of the continuous member that is connected to the second main member or the second connector. The sub-reinforcement part may constitute another portion of the continuous member, the another portion including another end of the continuous member that is connected to the first main member. The first nearest diagonal member may include: an intermediate section included in the continuous member and located between the first reinforcement part and the sub-reinforcement part; a first member connected to the intermediate section and extending from the intermediate section to the first main member or the first connector; and a second member connected to the intermediate section and extending from the intermediate section to the second main member.

In this aspect, the first reinforcement part constitutes a portion of the continuous member and the sub-reinforcement part constitutes another portion of the continuous member. Further, the first nearest diagonal member includes the intermediate section included in the continuous member, and the first member and the second member each connected to the inter mediate section. Therefore, the end of the first nearest diagonal member is arrangeable nearer to the first connector than the sub-reinforcement part. This arrangement achieves a smaller gap between the end of the first nearest diagonal member and the first connector (specifically, the pin insertion hole of the first connector). Accordingly, in the aspect, an effect of the improved buckling strength is obtainable by the first reinforcement part and the sub-reinforcement part in the coupling unit and therearound. Additionally, the aforementioned triangular configuration (lattice configuration) or a configuration similar to the lattice configuration in the coupling unit and therearound can exert an effect of suppressing lowering in the buckling strength.

Moreover, in this aspect, adoption of the configuration including the first member and the second member each connected to the intermediate section of the continuous member succeeds in forming the continuous member including the reinforcement part and the sub-reinforcement part by a single member. A continuous member made of a single member can more effectively suppress a decrease in a dimensional accuracy of the continuous member in the longitudinal direction thereof than a continuous member composed of a plurality of members connected to each other. This configuration can easily ensure accuracy of a distance between the first connector and the second connector, specifically, a distance between the pin insertion hole of the first connector and the pin insertion hole of the second connector.

Furthermore, in this aspect, the first nearest diagonal member is formed by connecting the first member and the second member to the intermediate section. Here, the length of each of the three elements can be made shorter than an entire length of the first nearest diagonal member. The first nearest diagonal member having this configuration is more advantageous in the buckling strength than a first nearest diagonal member made of a single member. Accordingly, the weight reduction can be also aimed by decreasing a cross-sectional area of the first nearest diagonal member.

In the lattice structure, the first member is preferably arranged at such a position as to overlap the second member when the first member is viewed in a longitudinal direction of the second member.

In this aspect, a load is effectively transmitted from the first member to the second member, and a load is effectively transmitted from the second member to the first member in a work performed by the working machine.

In the lattice structure, a longitudinal direction of the first member is preferably parallel to the longitudinal direction of the second member.

In this aspect, a load is further effectively transmitted from the first member to the second member, and a load is further effectively transmitted from the second member to the first member in a work performed by the working machine.

In the lattice structure, for example, the first member may be made of a pipe. The first member may be made of at least a plate-like member, a shaped steel member, or a member having a box shape.

A first member made of at least a plate-like member is easier to manufacture and leads to greater cost reduction than a first member made of a pipe. A first member made of a shaped steel member, such as an H-steel member and a channel steel member, can more effectively improve the strength than the first member made of the plate-like member. A first member made of a member having a box shape can more effectively improve the strength and achieve greater weight reduction than the first member made of the plate-like member.

In the lattice structure, the first nearest diagonal member is preferably a continuous member continuously extending from the first main member or the first connector to the second main member. The first reinforcement part preferably constitutes a portion of a reinforcement continuous member continuously extending from the first main member to the second main member or the second connector in the first specific direction, the portion of the reinforcement continuous member extending from the first nearest diagonal member to the second main member or the second connector. The sub-reinforcement part preferably constitutes another portion of the reinforcement continuous member, the another portion of the reinforcement continuous member extending from the first main member to the first nearest diagonal member. One member of the reinforcement continuous member and the first nearest diagonal member preferably has a through hole penetrating the one member in a direction intersecting a longitudinal direction of the one member, and the other member of the reinforcement continuous member and the first nearest diagonal member is preferably inserted in the through hole and arranged to intersect the one member.

In this aspect, the other member is inserted in the through hole and arranged in such a manner as to intersect the one member. Thus, the end of the first nearest diagonal member is arrangeable nearer to the first connector than the sub-reinforcement part. This arrangement achieves a smaller gap between the end of the first nearest diagonal member and the first connector (specifically, the pin insertion hole of the first connector). Accordingly, in the aspect, an effect of the improved buckling strength is obtainable by the first reinforcement part and the sub-reinforcement part in the coupling unit and therearound. Additionally, the aforementioned triangular configuration (lattice configuration) or a configuration similar to the lattice configuration in the coupling unit and therearound can exert an effect of suppressing lowering in the buckling strength.

In this aspect, each of the first nearest diagonal member and the reinforcement continuous member has a cross-section being continuous from the one end to the another end thereof without being divided. This configuration can effectively transmit a load from the one end to the another end of each of the first nearest diagonal member and the reinforcement continuous member, or from the another end to the one end thereof, and further easily ensure the stiffness.

Besides, the configuration where the other member is inserted in the through hole formed in the one member can avoid an increase in the number of components, and further suppress occurrence of relative positional displacement between the first nearest diagonal member and the corresponding reinforcement continuous member. Specifically, for instance, in adoption of a configuration where the reinforcement continuous member has the through hole in which the first nearest diagonal member is inserted, the first nearest diagonal member can have a substantially uniform cross-section from the one end to the another end thereof. This configuration can more effectively transmit a load acting on the first nearest diagonal member to the first main member or the first connector in a work performed by the working machine. In contrast, in adoption of a configuration where the first nearest diagonal member has the through hole in which the reinforcement continuous member is inserted, the reinforcement continuous member can have a substantially uniform cross-section from the one end to the another end thereof. This configuration can suppress occurrence of a strain (e.g., welding strain) in the reinforcement continuous member in manufacturing of the lattice structure.

In the lattice structure, the first nearest diagonal member preferably includes: a diagonal member main body extending from the second main member toward the first main member and the first connector; and an interposition member interposed between the diagonal member main body and at least one of the first main member and the first connector, and having a portion connected to at least one of the first main member and the first connector. The interposition member preferably has a diagonal member main body connection part to which one end of the diagonal member main body is connected and a reinforcement connection part to which one end of the first reinforcement part is connected.

In this configuration, the interposition member having the three connection parts is provided. Specifically, the provided interposition member has: the connection part connected to at least one of the first main member and the first connector; the diagonal member main body connection part; and the reinforcement connection part. This configuration achieves a smaller gap between the end of the first nearest diagonal member (i.e., the end of the interposition member) and the first connector (specifically, the pin insertion hole of the first connector). Accordingly, in the aspect, an effect of the improved buckling strength is obtainable by the first reinforcement part and the sub-reinforcement part in the coupling unit and therearound. Additionally, the aforementioned triangular configuration (lattice configuration) or a configuration similar to the lattice configuration in the coupling unit and therearound can exert an effect of suppressing lowering in the buckling strength.

In the lattice structure, the interposition member preferably has a diagonal member continuous part being continuous from the diagonal member main body connection part to at least one of the first main member and the first connector in a direction parallel to a longitudinal direction of the diagonal member main body.

In this aspect, a load acting on the diagonal member main body of the first nearest diagonal member in a work performed by the working machine is continuously and effectively transmittable to the first main member or the first connector via the diagonal member continuous part of the interposition member.

In the lattice structure, the interposition member preferably has a reinforcement continuous part being continuous from the reinforcement connection part to the first main member in a direction parallel to a longitudinal direction of the first reinforcement part.

In this aspect, a load acting on the first reinforcement part in a work performed by the working machine is continuously and effectively transmittable to the first main member via the reinforcement continuous part of the interposition member.

In the lattice structure, the interposition member preferably has: a diagonal member continuous part being continuous from the diagonal member main body connection part to at least one of the first main member and the first connector in a direction parallel to a longitudinal direction of the diagonal member main body, and being configured to have a leading end connected to at least one of the first main member and the first connector; a reinforcement continuous part being continuous from the reinforcement connection part to the first main member in a direction parallel to a longitudinal direction of the first reinforcement part, and being configured to have a leading end connected to the first main member at a position farther away from the first connector than the leading end of the diagonal member continuous part in the longitudinal direction of the first main member; and a bridge part extending along the first main member for bridging the leading end of the diagonal member continuous part and the leading end of the reinforcement continuous part.

In this aspect, a load acting on the diagonal member main body of the first nearest diagonal member in a work performed by the working machine is continuously and effectively transmittable to the first main member or the first connector via the diagonal member continuous part of the interposition member. Moreover, a load acting on the first reinforcement part is continuously and effectively transmittable to the first main member via the reinforcement continuous part of the interposition member. Furthermore, the bridge part bridging the leading end of the diagonal member continuous part and the leading end of the reinforcement continuous part can prove the stiffness of the interposition member.

In the lattice structure, the interposition member preferably has: a diagonal member continuous part being continuous from the diagonal member main body connection part to at least one of the first main member and the first connector in a direction parallel to a longitudinal direction of the diagonal member main body, and being configured to have a leading end connected to at least one of the first main member and the first connector; a reinforcement continuous part being continuous from the reinforcement connection part to the diagonal member continuous part in a direction parallel to a longitudinal direction of the first reinforcement part, and being configured to have a leading end connected to the diagonal member continuous part; and a bridge part located closer to the second main member than a specific portion of the interposition member where the leading end of the reinforcement continuous part is connected to the diagonal member continuous part for bridging the diagonal member continuous part and the reinforcement continuous part.

In this aspect, a load acting on the diagonal member main body of the first nearest diagonal member in a work performed by the working machine is continuously and effectively transmittable to the first main member or the first connector via the diagonal member continuous part of the interposition member. Moreover, a load acting on the first reinforcement part is continuously and effectively transmittable to the first main member via the reinforcement continuous part of the interposition member. Furthermore, the bridge part bridging the diagonal member continuous part and the reinforcement continuous part can improve the stiffness of the interposition member.

In the lattice structure, the interposition member preferably further has a second bridge part located farther away from the first connector than the leading end of the reinforcement continuous part in the longitudinal direction of the first main member for bridging the diagonal member continuous part and the first main member.

In this aspect, the second bridge part further enhances the stiffness of the interposition member.

In the lattice structure, the interposition member preferably further has a third bridge part extending along the first main member for bridging the leading end of the diagonal member continuous part and a leading end of the second bridge part, the leading end of the second bridge part being connected to the first main member.

In this aspect, the third bridge part still further enhances the stiffness of the interposition member.

In the lattice structure, it is preferable that the diagonal member main body connection part has a welding surface which is flat for welding the one end of the diagonal member main body, and the reinforcement connection part has a welding surface which is flat for welding the one end of the first reinforcement part.

In this aspect, the configuration where the one end of the diagonal member main body and the one end of the first reinforcement part are connected to the diagonal member main body connection part and the reinforcement connection part respectively by a welding operation provides the following advantages. Specifically, in this aspect, the configuration can more effectively improve the operability of the welding operation and improve the welding quality than a configuration with a welding surface having a curving shape, such as the side surface of a pipe.

In the lattice structure, the diagonal member main body connection part and the reinforcement connection part are preferably formed of an integrally continuous member.

In this aspect, the diagonal member main body connection part and the reinforcement connection part are formed of an integrally continuous member. Therefore, the welding for welding these members can be continuously performed, and accordingly, the operability of the welding operation is improvable. Furthermore, such continuous welding suppresses remaining of an unwelded portion which has been left unwelded, and hence the welding quality is improvable.

In the lattice structure, the first main member may have an insertion part having at least one of a groove and a hole in which a portion of the interposition member is inserted, and the interposition member may be fixedly attached to the first main member in a state where the portion of the interposition member is inserted in the insertion part.

In this aspect, the interposition member is fixedly attachable to the first main member in the state where at least the portion of the interposition member is inserted in the insertion part. This configuration facilitates a positioning operation of deciding relative positions between the first main member and the interposition member in the fixing and attaching operation, and accordingly improve accuracy of the relative positions and further improve the operability of the fixing and attaching operation.

A provided working machine includes: a base body; an upper stewing body slewably mounted on the base body; and a boom rotatably attached to the upper stewing body and having the lattice structure described above and the another lattice structure adjacent to the lattice structure. Each of the connectors of the lattice structure is connected to a corresponding connector of the another lattice structure with a pin. The first specific direction in which the first reinforcement part extends is perpendicular to an axial direction of the pin.

In the working machine, the first specific direction in which the reinforcement part extends is perpendicular to the axial direction of the pin, and therefore the reinforcement part can effectively improve the buckling strength. Specifically, a mechanism that the buckling deformation is likely to occur in the coupling unit of the lattice structure and therearound will be described below. When the boom receives a compressive load in the longitudinal direction thereof, a specific main member of the lattice structure rotates about the pin relative to a corresponding main member of the another lattice structure in the coupling unit for coupling the lattice structure and the another structure to each other. This may cause the buckling deformation. In the aspect, the reinforcement part connects the nearest diagonal member, and the main member or the connector with each other in a posture with the first specific direction being perpendicular to the axial direction of the pin. The reinforcement part arranged in the aforementioned manner can effectively suppress such deformation of the main member of the lattice structure as to rotate about the pin relative to the main member of the another lattice structure when the boom receives the compressive load. Consequently, the buckling deformation is effectively suppressed.

The invention claimed is:

1. A lattice structure constituting a portion of a working machine and detachably couplable to another lattice structure adjacent to the lattice structure, the lattice structure comprising:

a plurality of main members extending along a longitudinal direction of the lattice structure and arranged at intervals in a direction perpendicular to the longitudinal direction;

a plurality of diagonal members each extending so as to be inclined with respect to the longitudinal direction, each of the diagonal members connecting two main members among the plurality of main members with each other;

a plurality of connectors respectively connected to ends of the main members in the longitudinal direction thereof; and at least one reinforcement part, wherein the main members include a first main member and a second main member, the connectors include a first connector connected to an end of the first main member and a second connector connected to an end of the second main member, the diagonal members include a plurality of first diagonal members connecting the first main member and the second main member with each other, the first diagonal members including a first nearest diagonal member located nearest to the first connector, and the at least one reinforcement part includes a first reinforcement part extending from the first nearest diagonal member to the second main member or the second connector in a first specific direction for connecting the first nearest diagonal member, and the second main member or the second connector with each other, the lattice structure further includes a sub-reinforcement part for connecting the first main member and the first nearest diagonal member with each other, the first reinforcement part constitutes a portion of a continuous member continuously extending from the first main member to the second main member or the second connector in the first specific direction, the portion including an end of the continuous member that is connected to the second main member or the second connector, the sub-reinforcement part constitutes another portion of the continuous member, the another portion including another end of the continuous member that is connected to the first main member, and the first nearest diagonal member includes:

an intermediate section included in the continuous member and located between the first reinforcement part and the sub-reinforcement part;

a first member connected to the intermediate section and extending from the intermediate section to the first main member or the first connector; and a second member connected to the intermediate section and extending from the intermediate section to the second main member.

2. The lattice structure according to claim 1, wherein the first nearest diagonal member has one end connected to the first connector and another end connected to the second main member so that the first nearest diagonal member connects the first main member and the second main member with each other.

3. The lattice structure according to claim 1, wherein the first specific direction is perpendicular to the longitudinal direction of the lattice structure.

4. The lattice structure according to claim 1, wherein the main members further include a third main member and a fourth main member, the first main member and the second main member are respectively disposed, when the lattice structure is viewed in the longitudinal direction thereof, at positions corresponding to two adjacent vertices among four vertices of a quadrangular shape, and the third main member and the fourth main member are disposed at positions corresponding to remaining two vertices among the four vertices, the connectors further include a third connector connected to an end of the third main member and a fourth connector connected to an end of the fourth main member, the diagonal members include a plurality of second diagonal members connecting the third main member and the fourth main member with each other, the second diagonal members including a second nearest diagonal member located nearest to the third connector, and the at least one reinforcement part further includes a second reinforcement part extending from the second nearest diagonal member to the fourth main member or the fourth connector in a second specific direction for connecting the second nearest diagonal member, and the fourth main member or the fourth connector with each other.

5. The lattice structure according to claim 4, wherein the second nearest diagonal member has one end connected to the third connector and another end connected to the fourth main member so that the second nearest diagonal member connects the third main member and the fourth main member with each other.

6. The lattice structure according to claim 4, wherein the second specific direction is perpendicular to the longitudinal direction of the lattice structure.

7. The lattice structure according to claim 1, wherein the sub-reinforcement part is arranged at such a position as to overlap the first reinforcement part when the sub-reinforcement part is viewed in the first specific direction.

8. The lattice structure according to claim 7, wherein the sub-reinforcement part extends from the first main member to the first nearest diagonal member in a direction parallel to the first specific direction.

9. The lattice structure according to claim 1, wherein the first nearest diagonal member is a continuous member continuously extending from the first main member or the first connector to the second main member, the first reinforcement part has one end and another end in the first specific direction, the one end being connected to the first nearest diagonal member and the another end being connected to the second main member or the second connector, and the sub-reinforcement part has one end connected to the first main member and another end connected to the first nearest diagonal member.

10. The lattice structure according to claim 9, wherein the sub-reinforcement part is made of at least a plate-like member, a shaped steel member, or a member having a box shape.

11. The lattice structure according to claim 1, wherein the first member is arranged at such a position as to overlap the second member when the first member is viewed in a longitudinal direction of the second member.

12. The lattice structure according to claim 11, wherein a longitudinal direction of the first member is parallel to the longitudinal direction of the second member.

13. The lattice structure according to claim 1, wherein the first member is made of at least a plate-like member, a shaped steel member, or a member having a box shape.

14. A lattice structure constituting a portion of a working machine and detachably couplable to another lattice structure adjacent to the lattice structure, the lattice structure comprising:

a plurality of main members extending along a longitudinal direction of the lattice structure and arranged at intervals in a direction perpendicular to the longitudinal direction;

a plurality of diagonal members each extending so as to be inclined with respect to the longitudinal direction, each of the diagonal members connecting two main members among the plurality of main members with each other;

a plurality of connectors respectively connected to ends of the main members in the longitudinal direction thereof; and at least one reinforcement part, wherein the main members include a first main member and a second main member, the connectors include a first connector connected to an end of the first main member and a second connector connected to an end of the second main member, the diagonal members include a plurality of first diagonal members connecting the first main member and the second main member with each other, the first diagonal members including a first nearest diagonal member located nearest to the first connector, and the at least one reinforcement part includes a first reinforcement part extending from the first nearest diagonal member to the second main member or the second connector in a first specific direction for connecting the first nearest diagonal member, and the second main member or the second connector with each other, wherein the lattice structure further comprises a sub-reinforcement part for connecting the first main member and the first nearest diagonal member with each other, the first nearest diagonal member is a continuous member continuously extending from the first main member or the first connector to the second main member, the first reinforcement part constitutes a portion of a reinforcement continuous member continuously extending from the first main member to the second main member or the second connector in the first specific direction, the portion of the reinforcement continuous member extending from the first nearest diagonal member to the second main member or the second connector, the sub-reinforcement part constitutes another portion of the reinforcement continuous member, the another portion of the reinforcement continuous member extending from the first main member to the first nearest diagonal member, one member of the reinforcement continuous member and the first nearest diagonal member has a through hole penetrating the one member in a direction intersecting a longitudinal direction of the one member, and the other member of the reinforcement continuous member and the first nearest diagonal member is inserted in the through hole and arranged to intersect the one member.

15. A working machine comprising:

a base body;

an upper slewing body slewably mounted on the base body; and a boom rotatably attached to the upper slewing body and having the lattice structure according to claim 1 and the another lattice structure adjacent to the lattice structure, wherein each of the connectors of the lattice structure is connected to a corresponding connector of the another lattice structure with a pin, and the first specific direction in which the first reinforcement part extends is perpendicular to an axial direction of the pin.

* * * * *